US010588432B2

(12) United States Patent
Nishio

(10) Patent No.: US 10,588,432 B2
(45) Date of Patent: Mar. 17, 2020

(54) CHECKOUT DEVICE

(71) Applicant: NEC CORPORATION, Tokyo (JP)

(72) Inventor: Jun Nishio, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 20 days.

(21) Appl. No.: 15/771,771

(22) PCT Filed: Aug. 18, 2016

(86) PCT No.: PCT/JP2016/074060
§ 371 (c)(1),
(2) Date: Apr. 27, 2018

(87) PCT Pub. No.: WO2017/073140
PCT Pub. Date: May 4, 2017

(65) Prior Publication Data
US 2018/0332980 A1    Nov. 22, 2018

(30) Foreign Application Priority Data
Oct. 30, 2015   (JP) .................................. 2015-215148

(51) Int. Cl.
*A47F 9/04*   (2006.01)
*G07D 11/22*   (2019.01)
*G07G 1/12*   (2006.01)
*G06Q 20/18*   (2012.01)
*G07G 1/00*   (2006.01)

(52) U.S. Cl.
CPC ................ *A47F 9/046* (2013.01); *A47F 9/04* (2013.01); *G06Q 20/18* (2013.01); *G07D 11/22* (2019.01); *G07G 1/0018* (2013.01); *G07G 1/12* (2013.01); *A47F 9/047* (2013.01)

(58) Field of Classification Search
CPC ............................. G06Q 20/20; G07G 1/0036
USPC ........................................ 235/383, 375, 487
See application file for complete search history.

(56) References Cited

U.S. PATENT DOCUMENTS 6,038,130 A   3/2000   Boeck et al.
6,428,126 B1   8/2002   Poulter et al.
(Continued)

FOREIGN PATENT DOCUMENTS

JP    1980-124077 U1   9/1980
JP    H05-160586 A   6/1993
(Continued)

OTHER PUBLICATIONS

International Search Report for PCT/JP2016/074060 dated Nov. 22, 2016 [PCT/ISA/210].
(Continued)

*Primary Examiner* — Edwyn Labaze
(74) *Attorney, Agent, or Firm* — Sughrue Mion, PLLC

(57) ABSTRACT

A checkout device includes: a first checkout machine that includes a first coin checkout machine and a first banknote checkout machine; and a second checkout machine that includes a second coin checkout machine and a second banknote checkout machine. The first checkout machine and the second checkout machine at least partially overlap each other when viewed from a direction perpendicular to an installation surface of the first checkout machine and the second checkout machine.

20 Claims, 63 Drawing Sheets

(56) References Cited

U.S. PATENT DOCUMENTS

| | | | | |
|---|---|---|---|---|
| 2004/0069848 | A1* | 4/2004 | Persky | A47F 9/048 |
| | | | | 235/383 |
| 2007/0016481 | A1 | 1/2007 | Morrison | |
| 2008/0041489 | A1 | 2/2008 | Tatsuno | |
| 2013/0228104 | A1* | 9/2013 | Susaki | E05G 1/005 |
| | | | | 109/23 |
| 2017/0345263 | A1* | 11/2017 | Gotanda | G07G 1/0036 |

FOREIGN PATENT DOCUMENTS

| | | |
|---|---|---|
| JP | H05-73870 U | 10/1993 |
| JP | 2000-510648 A | 8/2000 |
| JP | 2002-164679 A | 6/2002 |
| JP | 2003-133767 A | 5/2003 |
| JP | 2004-234574 A | 8/2004 |
| JP | 2004-307032 A | 11/2004 |
| JP | 2007-293795 A | 11/2007 |
| JP | 3149698 U | 4/2009 |
| JP | 2010-140142 A | 6/2010 |
| JP | 2012-164282 A | 8/2012 |
| JP | 2013-218437 A | 10/2013 |
| JP | 2014-52714 A | 3/2014 |
| JP | 5811295 B1 | 11/2015 |
| WO | 2005/073935 A1 | 8/2005 |

OTHER PUBLICATIONS

Notice of Reasons for Refusal dated Aug. 6, 2019 issued by the Japanese Patent Office in counterpart application No. 2015-215148.

\* cited by examiner

CHECKOUT DEVICE

CROSS REFERENCE TO RELATED APPLICATIONS

This application is a National Stage of International Application No. PCT/JP2016/074060 filed Aug. 18, 2016, claiming priority based on Japanese Patent Application No. 2015-215148 filed Oct. 30, 2015, the entire disclosure of which is incorporated herein by reference.

TECHNICAL FIELD

The present invention relates to a checkout device.

BACKGROUND ART

It is common to use a cash register installed in the store in order to perform checkout of goods (hereinafter referred to as purchased goods) which a customer shopping at a store (hereinafter referred to as a purchaser) purchases.

In recent years, in some selling formats, a store clerk performs registration processing of purchased goods by using a goods registration device and a purchaser performs checkout of the registered purchased goods by using a so-called semi-self-register (See Patent Document 1).

Patent Documents 2 and 3 disclose money change apparatus.

RELATED DOCUMENT

Patent Document

[Patent Document 1] Japanese Laid-open Patent Publication No. 2013-218437
[Patent Document 2] Japanese Laid-open Patent Publication No. 2010-140142
[Patent Document 3] Japanese Laid-open Patent Publication No. 2012-164282

SUMMARY OF THE INVENTION

Incidentally, in order to smoothly perform the checkout for a large number of purchasers, it is desirable to install as many checkout devices, for example, semi-self-registers or cash registers as possible in a shop, for allowing checkout as much as possible in parallel.

A limited space in the store, however, limits the number of installable checkout devices.

An object of the present invention is to provide a checkout device allowing for more checkout in parallel in a limited installation space.

The present invention provides a checkout device including: a first checkout machine including a first coin checkout machine and a first banknote checkout machine; and a second checkout machine including a second coin checkout machine and a second banknote checkout machine, wherein the first checkout machine and the second checkout machine at least partially overlap each other when viewed from a direction perpendicular to an installation surface of the first checkout machine and the second checkout machine.

According to the present invention, more checkout can be performed in parallel in a limited installation space.

Also, a checkout device to allow for more checkout in parallel in a limited installation space can be assembled with ease.

BRIEF DESCRIPTION OF THE DRAWINGS

The above-described object and other objects, features, and advantages will become more apparent from preferred embodiments which will be described below, and the accompanying drawings attached thereto.

DESCRIPTION OF EMBODIMENTS

Figure 1:
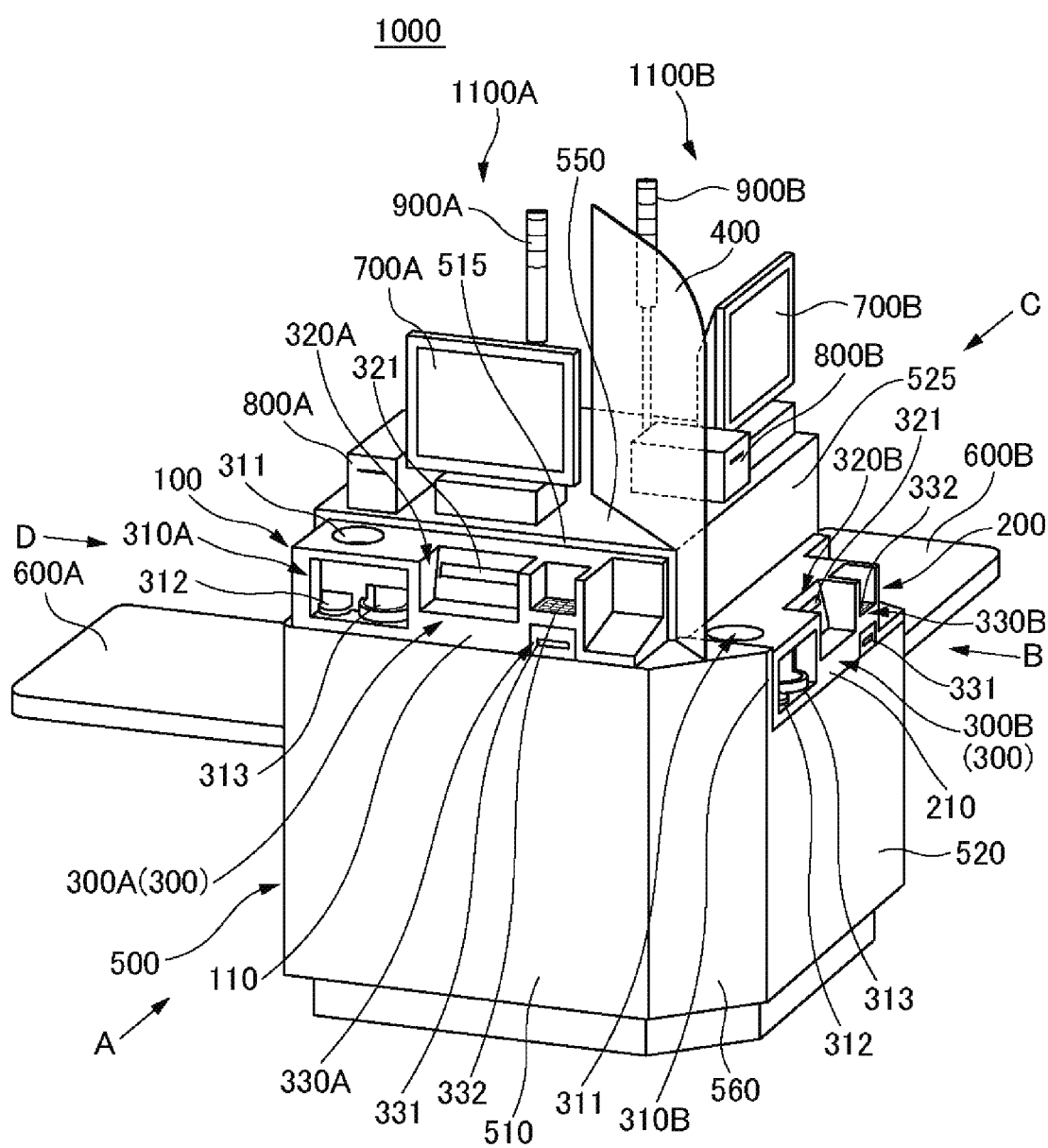
FIG. 1 is a perspective view of a checkout device according to a first embodiment.

Hereinafter, embodiments of the present invention will be described using the drawings. In all the drawings, the same constituent elements are denoted by the same reference numerals, and description thereof will not be repeated.

First Embodiment

FIG. 1 is a perspective view of a checkout device 1000 according to a first embodiment.

Figure 2:
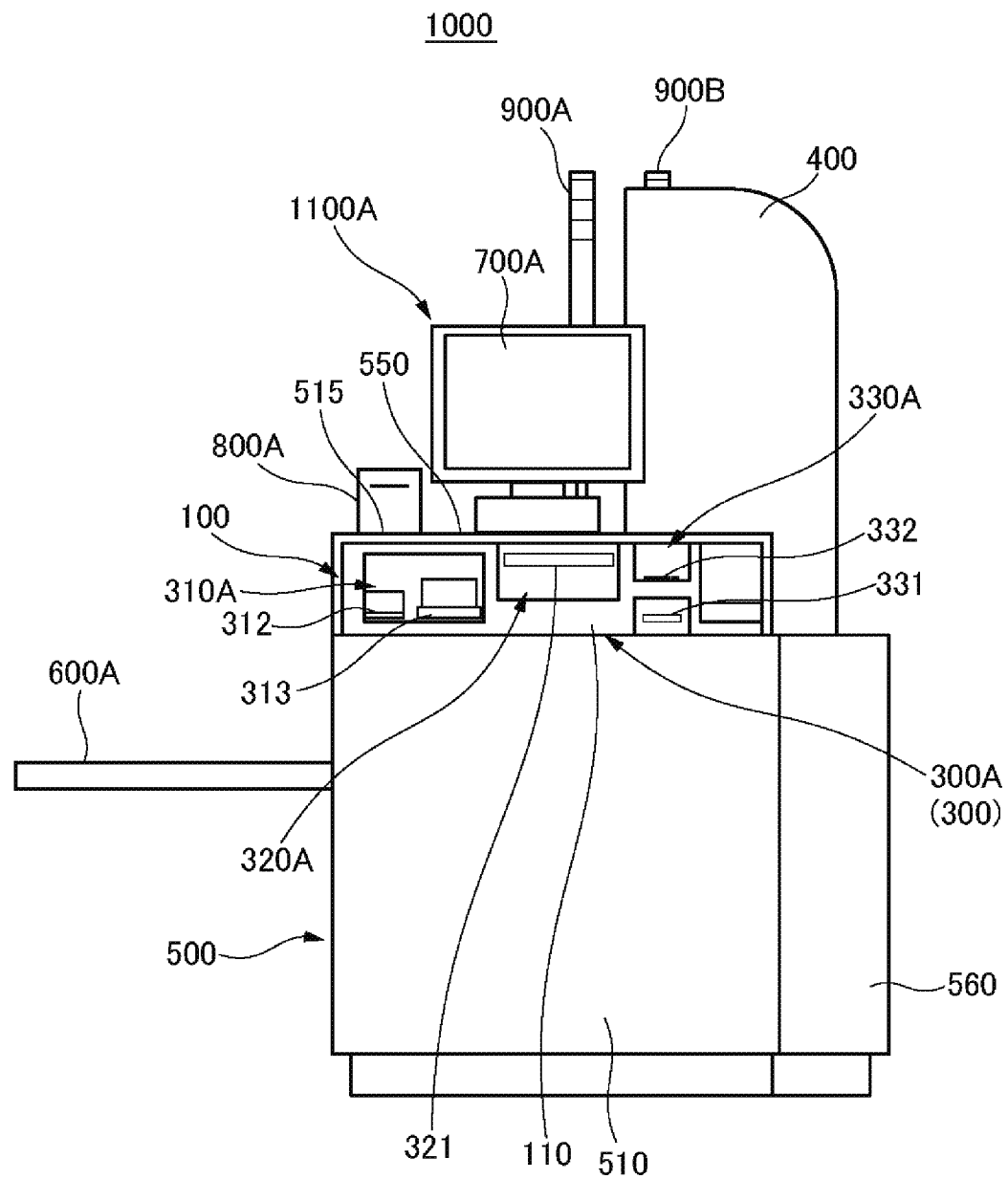
FIG. 2 is a side view of the checkout device as viewed from a direction of an arrow A of FIG. 1.

FIG. 2 is a side view of the checkout device 1000 as viewed from a direction of an arrow A of FIG. 1.

Figure 3:
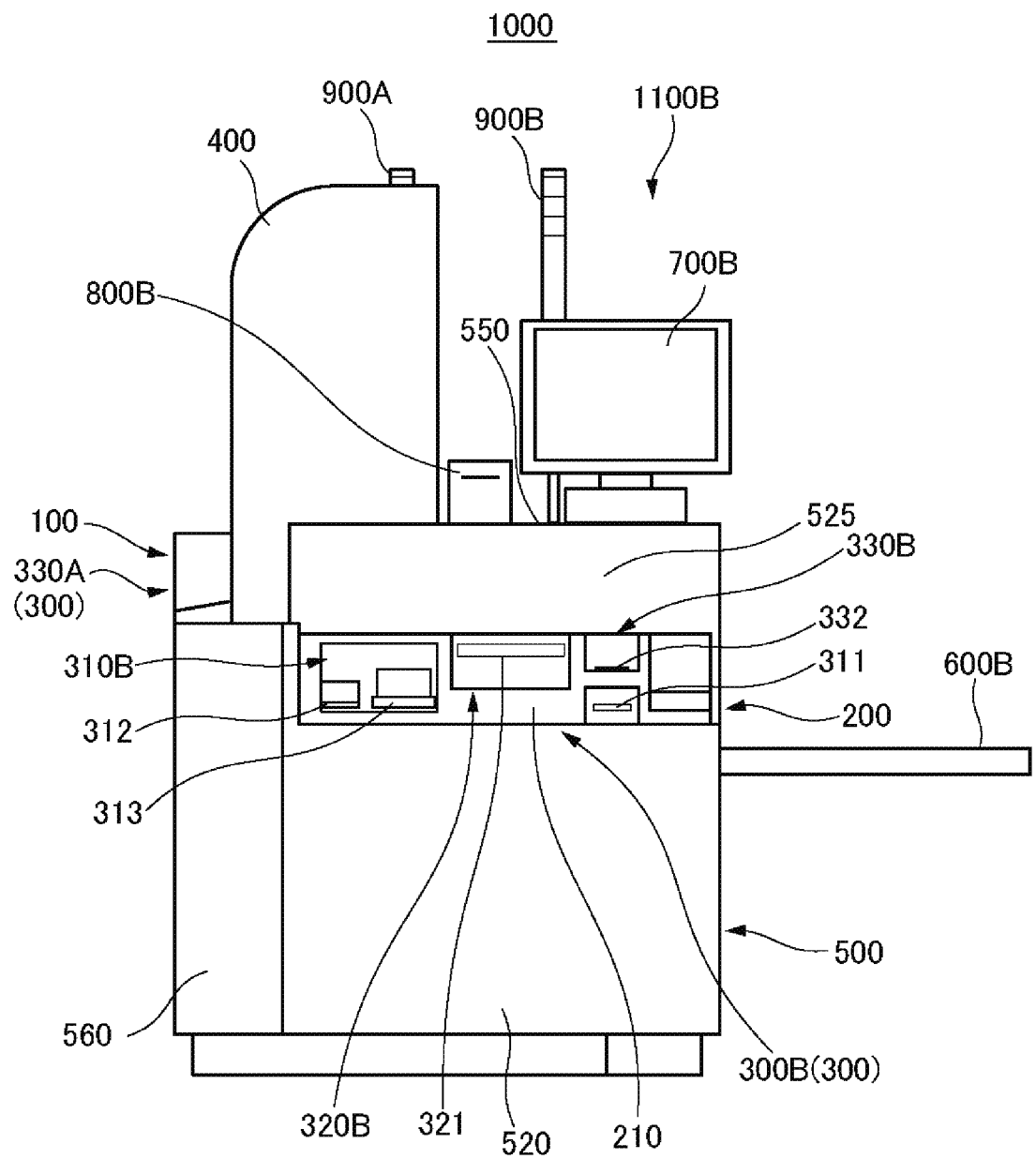
FIG. 3 is a side view of the checkout device as viewed from a direction of an arrow B of FIG. 1.

FIG. 3 is a side view of the checkout device 1000 as viewed from a direction of an arrow B of FIG. 1.

Figure 4:
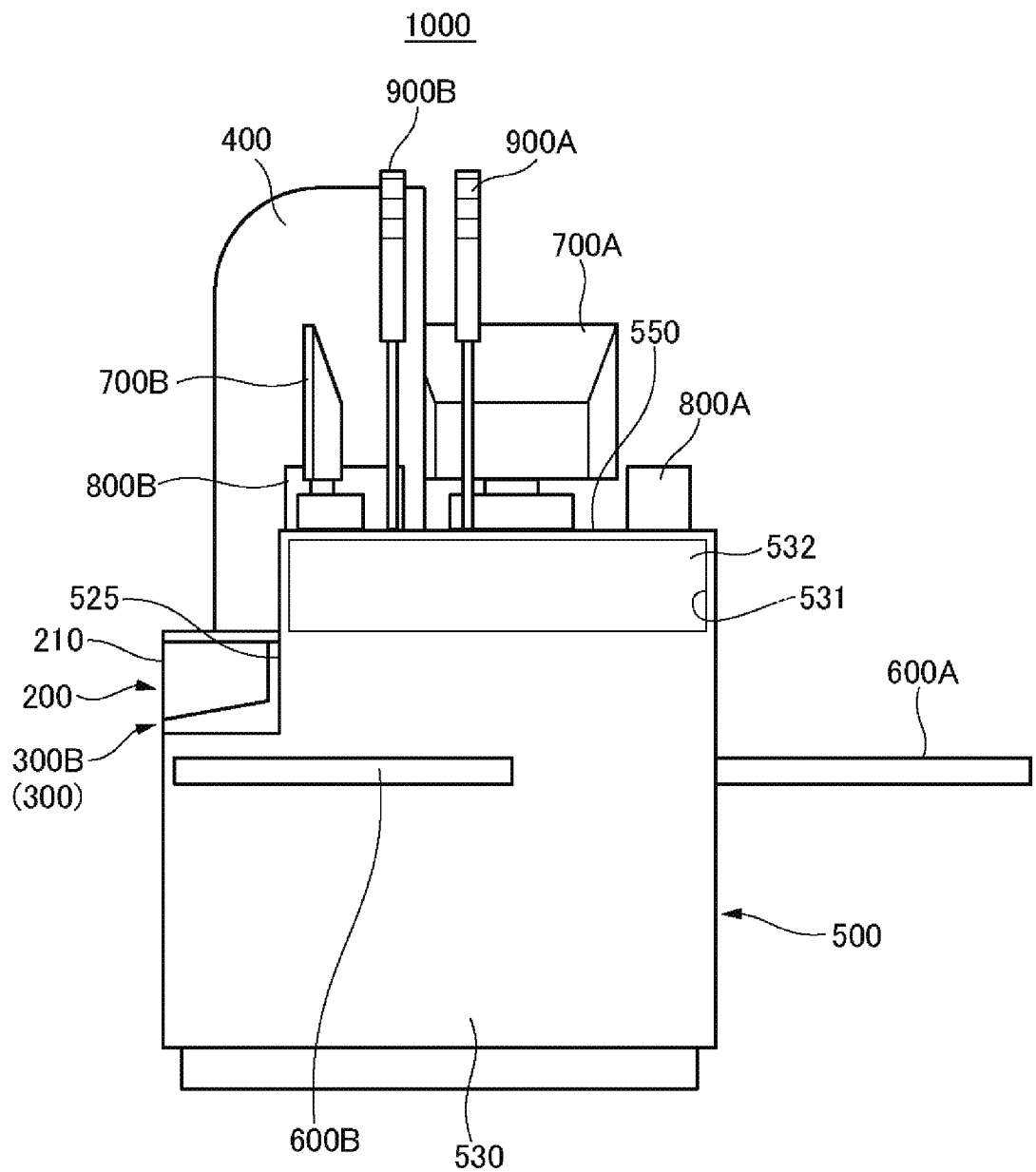
FIG. 4 is a side view of the checkout device as viewed from a direction of an arrow C of FIG. 1.

FIG. 4 is a side view of the checkout device 1000 as viewed from a direction of an arrow C of FIG. 1.

Figure 5:
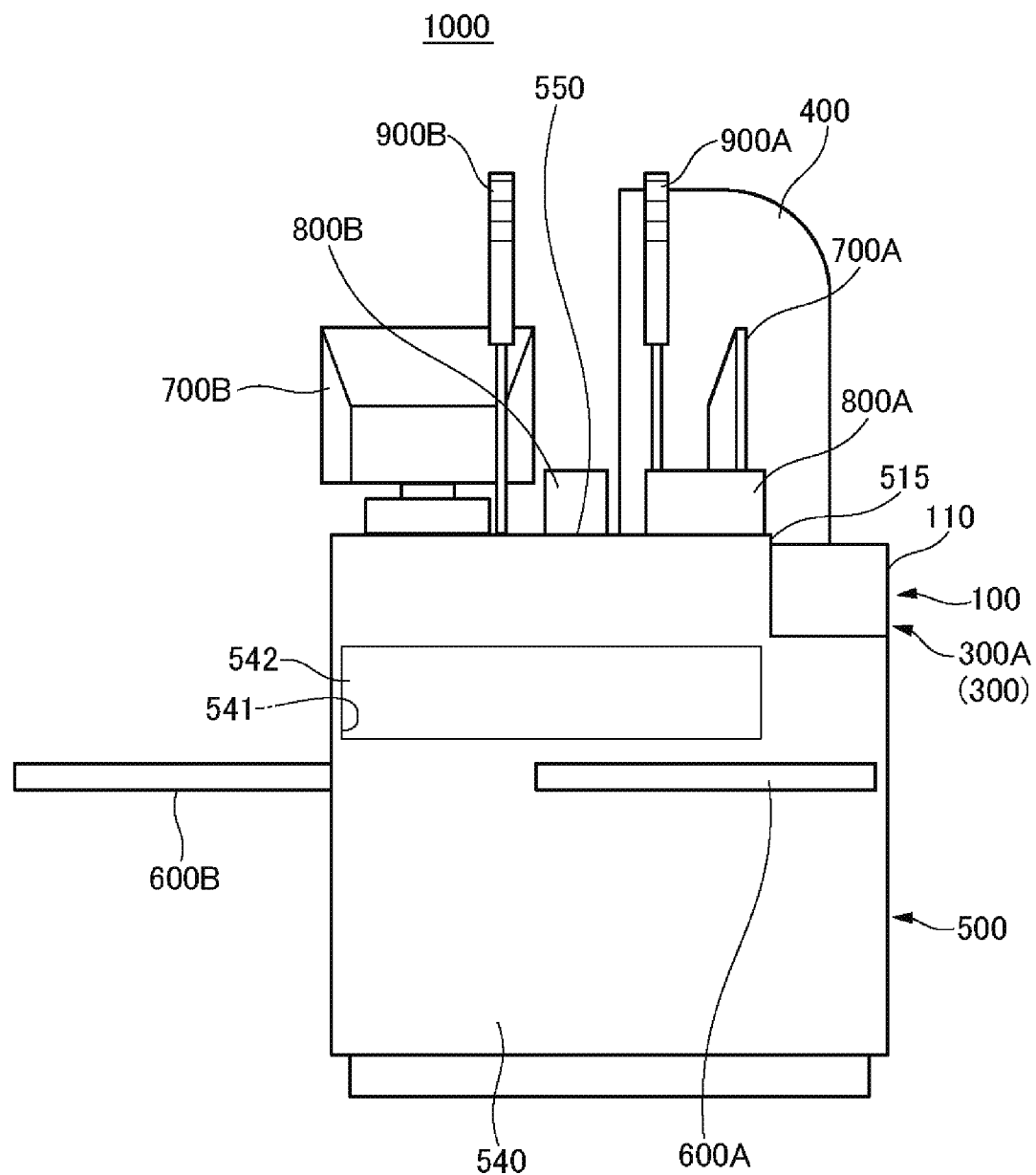
FIG. 5 is a side view of the checkout device as viewed from a direction of an arrow D of FIG. 1.

FIG. 5 is a side view of the checkout device 1000 as viewed from a direction of an arrow D of FIG. 1.

Figure 6:
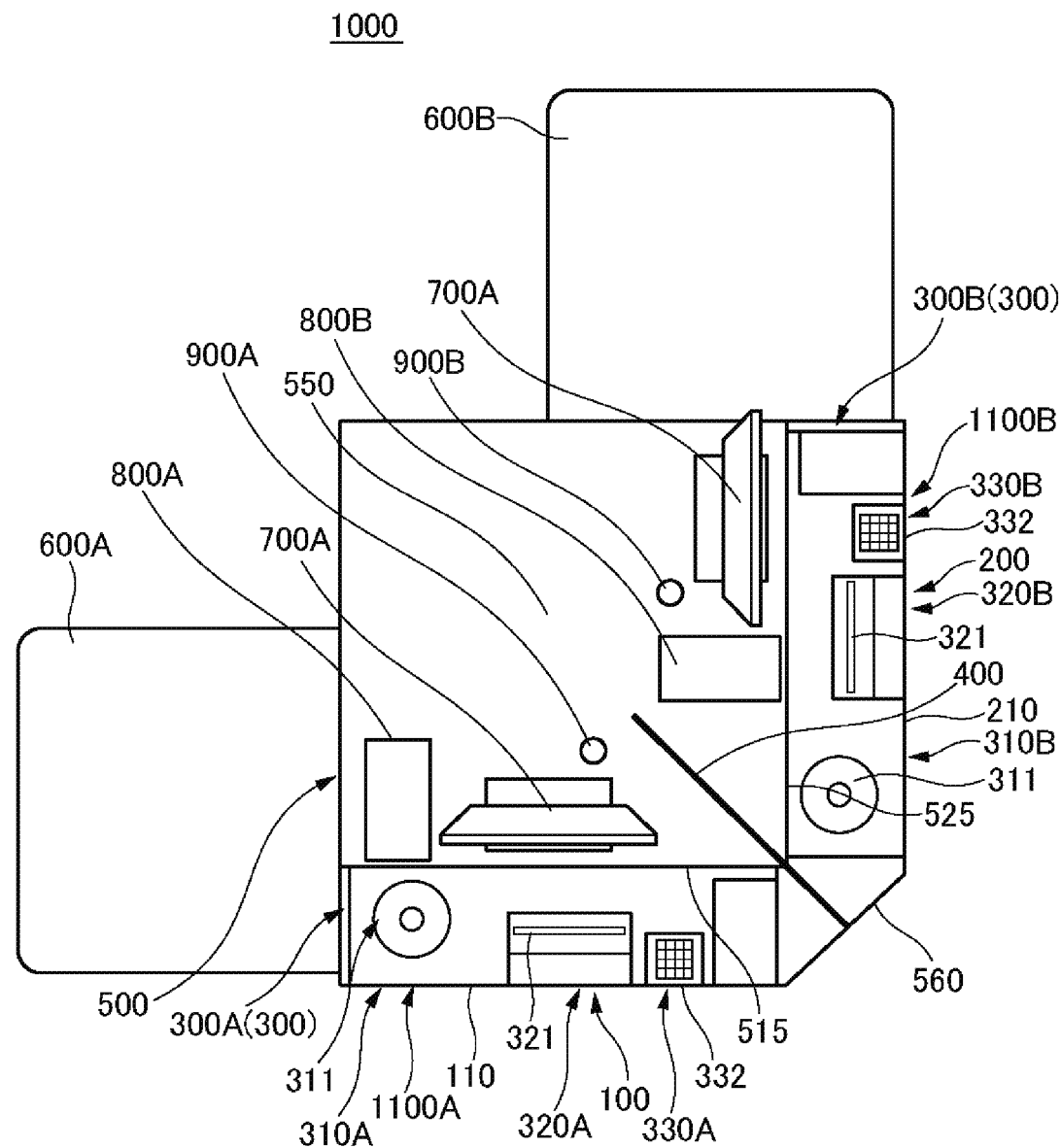
FIG. 6 is a plan view of the checkout device according to the first embodiment.

FIG. 6 is a plan view of the checkout device 1000 according to the first embodiment.

Figure 7:
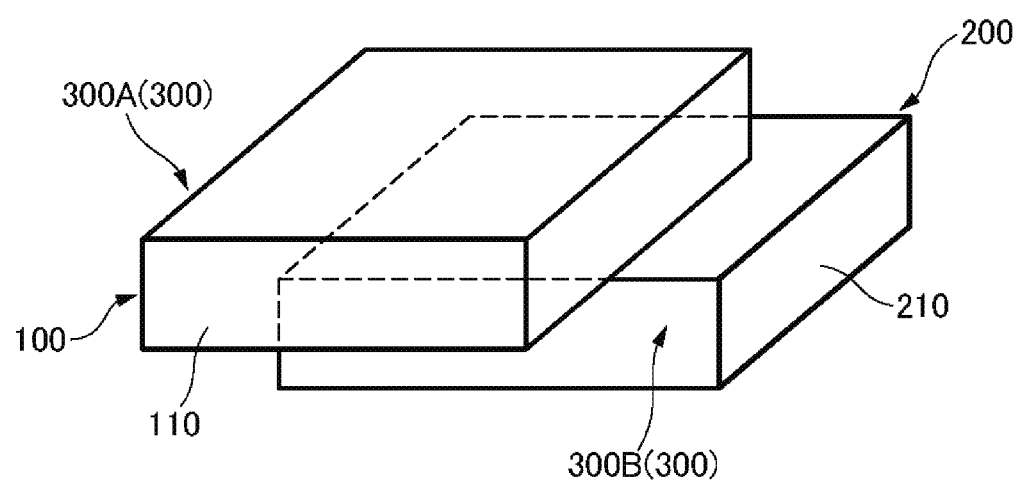
FIG. 7 is a schematic perspective view showing the disposition of a first checkout machine and a second checkout machine in the checkout device according to the first embodiment.

FIG. 7 is a schematic perspective view showing the disposition of a first checkout machine 100 and a second checkout machine 200 in the checkout device 1000 according to the first embodiment.

Figure 8:
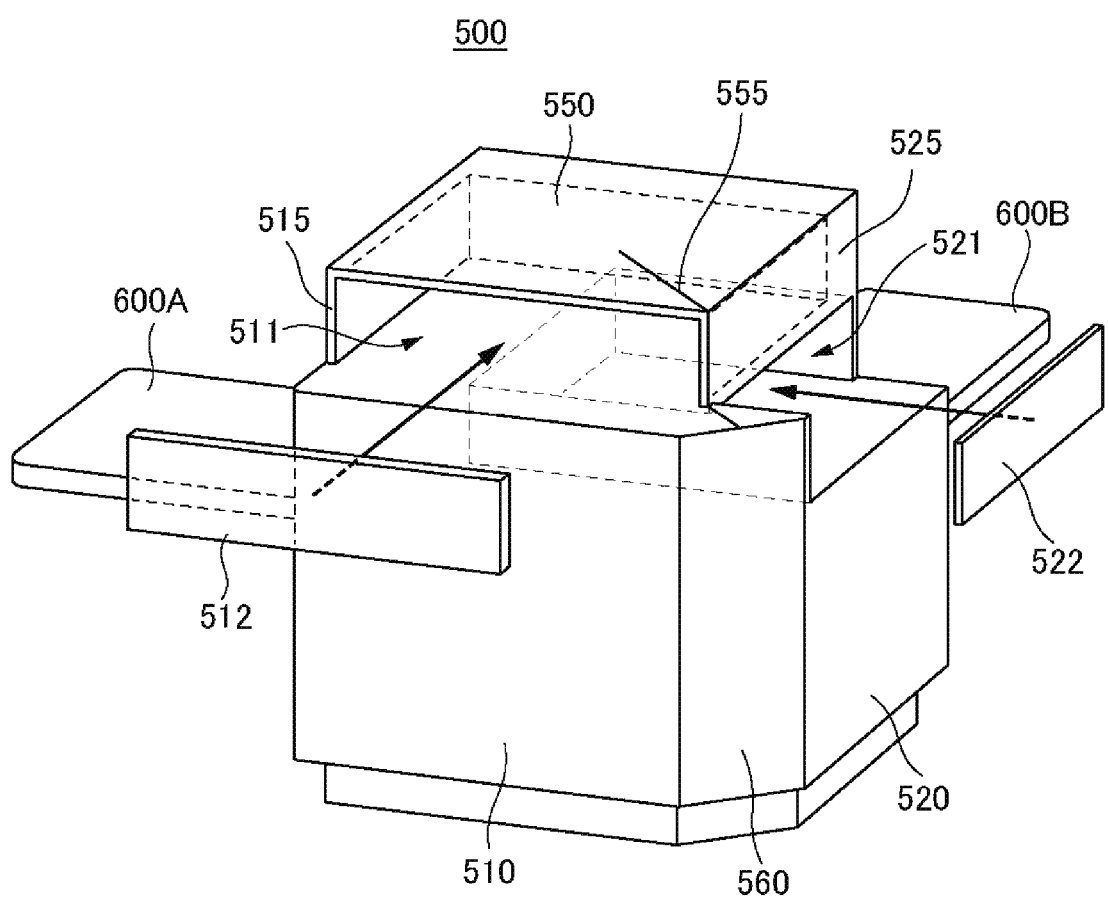
FIG. 8 is a perspective view of a base for a checkout device according to the first embodiment.

FIG. 8 is a perspective view of a base 500 for a checkout device according to the first embodiment.

Figure 9:
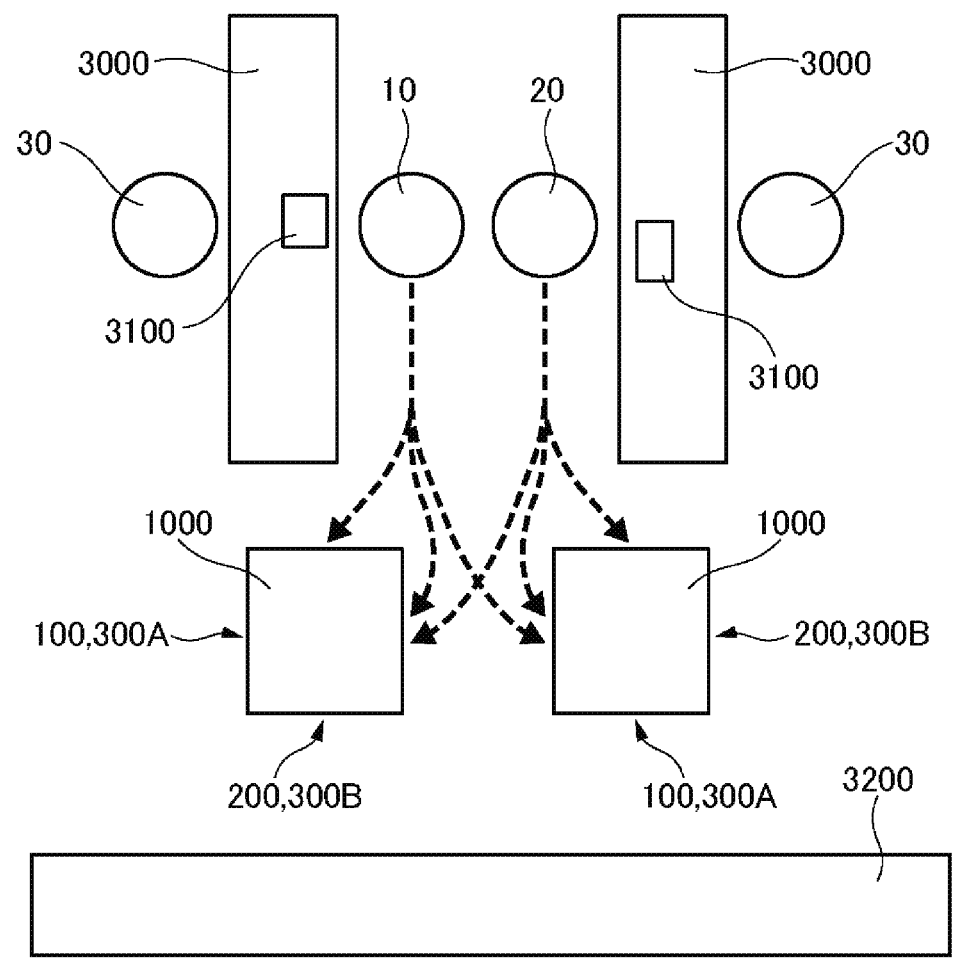
FIG. 9 is a schematic plan view for describing an example of use of the checkout device according to the first embodiment.

FIG. 9 is a schematic plan view for describing an example of use of the checkout device 1000 according to the first embodiment.

The checkout device 1000 (checkout unit assembly) according to this embodiment includes the first checkout machine (first checkout unit) 100 and the second checkout machine (second checkout unit) 200, each having a user interface portion 300 at one side portion.

The first checkout machine 100 is disposed above the second checkout machine 200 such that the first checkout machine 100 and the second checkout machine 200 overlap when seen in a plan view. In other words, the first checkout machine 100 and the second checkout machine 200 are offset from each other and the first checkout machine 100 is superimposed on the second checkout machine 200.

The user interface portion 300 of the first checkout machine 100 (hereinafter sometimes referred to as a first user interface portion 300A) and the user interface portion 300 of the second checkout machine 200 (hereinafter sometimes referred to as a second user interface portion 300B) are disposed on different side surfaces of the checkout device 1000.

The checkout device 1000 has, for example, the base 500 on which the first checkout machine 100 and the second checkout machine 200 are mounted.

The base 500 may be a casing or may be a shelf. In this embodiment, the base 500 is a casing.

Each side surface of the base 500 is also each side surface of the checkout device 1000.

In this embodiment, the first user interface portion 300A is disposed on a first side surface 510 of the base 500, and the second user interface portion 300B is disposed on a second side surface 520 of the base 500.

Accordingly, a first user to use the first checkout machine 100 can perform checkout by using the first user interface portion 300A in front of the first side face 510 of the base 500. In parallel, a second user to use the second checkout machine 200 can perform checkout by using the second user interface portion 300B in front of the second side face 520 of the base 500.

That is, a single checkout device 1000 allows parallel execution of the checkout of the first user and the checkout of the second user.

Accordingly, a plurality of checkout can be performed smoothly.

A detailed explanation is as follows.

The checkout device 1000 is, for example, a semi-self-register (a semi-self-register device) for a purchaser to perform the checkout of the purchased goods of the purchaser, or a cash register (a register device) for a store clerk to perform the checkout of the purchased goods of a purchaser.

If the checkout device 1000 is a semi-self-register, each of the first checkout machine 100 and the second checkout machine 200 is a checkout machine (an automatic checkout machine) for a purchaser to perform the checkout of the purchased goods of the purchaser. The checkout machine is referred to also as a checkout unit or a money change unit.

If, on the other hand, the checkout device 1000 is a cash register, each of the first checkout machine 100 and the second checkout machine 200 is a drawer for a store clerk to perform the checkout of the purchased goods of a purchaser.

In this embodiment, the following explanation will be described as the checkout device 1000 being a semi-self-register.

The user interface portion 300 is a portion where a user using each of the first checkout machine 100 and the second checkout machine 200 for checkout performs various processing such as cash injecting, change receipt, insertion of a payment card (a credit card, a debit card, and so on), and input of a personal identification number of a card.

As shown in FIGS. 1 to 5, the base 500 has, for example, four side surfaces; the first side surface 510, the second side surface 520, a third side surface 530, and a fourth side surface 540.

The first side surface 510 and the second side surface 520 are orthogonal to each other.

The third side surface 530 is a side surface opposite to the first side surface 510.

The fourth side surface 540 is a side surface opposite to the second side surface 520. Accordingly, the fourth side surface 540 is orthogonal to the first side surface 510.

More specifically, the side surface of the base 500 further has a chamfered surface 560 formed by chamfering a corner portion between the first side surface 510 and the second side surface 520. The chamfered surface 560 is disposed, for example, at an angle of 45 degrees with respect to the first side surface 510 and the second side surface 520.

Each of the side surfaces 510, 520, 530, and 540 and the chamfered surface 560 stands vertically, for example.

For this reason, the base 500 is formed, for example, in a pentagonal shape, in a plan view, with oblique cut on one corner of rectangle.

The base 500 has an upper surface 550. As an example, the upper surface 550 is formed horizontally and flatly.

The first user interface portion 300A, which is the user interface portion 300 of the first checkout machine 100, is disposed on the first side surface 510.

On the other hand, the second user interface portion 300B, which is the user interface portion 300 of the second checkout machine 200, is disposed on the second side surface 520.

That is, in this embodiment, the first user interface portion 300A and the second user interface portion 300B are respectively disposed on the first side surface 510 and the second side surface 520 which are orthogonal to each other.

More specifically, for example, a side surface 110 of the first checkout machine 100 at the first user interface portion 300A side and the first side surface 510 of the base 500 that is a side surface on which the first user interface portion 300A of the first checkout machine 100 is disposed are flush with each other.

Similarly, for example, a side surface 210 of the second checkout machine 200 at the second user interface portion 300B side and the second side surface 520 of the base 500 that is a side surface on which the second user interface portion 300B of the second checkout machine 200 is disposed are flush with each other.

This results in a neat appearance of the checkout device 1000 at the first side surface 510 side and the second side surface 520 side, and enables to prevent a person, a cart, and others moving in the store from colliding with the first checkout machine 100 and the second checkout machine 200.

Here, a portion of the first side surface 510 on which the first checkout machine 100 is disposed and a portion thereof above the portion (hereinafter referred to as a first upper side surface 515) are located deeper (toward the third side surface 530) than another portion (a lower portion) of the first side surface 510.

For this reason, the upper surface of the first user interface portion 300A is exposed to the upper surface side of the checkout device 1000. That is, a coin receiving opening 311 of the second user interface portion 300B is exposed to the upper surface side of the checkout device 1000.

Similarly, a portion of the second side surface 520 on which the second checkout machine 200 is disposed and a portion thereof above the portion (hereinafter referred to as a second upper side surface 525) are located deeper (toward the fourth side surface 540) than another portion (a lower portion) of the second side surface 520.

For this reason, the upper surface of the second user interface portion 300B is exposed to the upper surface side of the checkout device 1000. That is, a coin receiving opening 311 of the second user interface portion 300B is exposed to the upper surface side of the checkout device 1000.

The first checkout machine 100 has a coin checkout machine (coin change device) 310A and a banknote checkout machine (banknote change device) 320A. The coin checkout machine 310A is a first coin checkout machine, and the banknote checkout machine 320A is a first banknote checkout machine.

Similarly, the second checkout machine 200 has a coin checkout machine (coin change device) 310B and a banknote checkout machine (banknote change device) 320B. The coin checkout machine 310B is a second coin checkout machine, and the banknote checkout machine 320B is a second banknote checkout machine.

Each of the coin checkout machine 310A and the coin checkout machine 310B has the coin receiving opening 311 to accept a coin to be injected for payment, a coin rejecting opening 312 to discharge coins injected into the coin receiving opening 311 and not discriminated in denomination due to scratch, deformation, a recognition error, and so on, and a coin dispensing opening 313 to discharge change of coin.

Each of the banknote checkout machine 320A and the banknote checkout machine 320B has a banknote receiving and dispensing opening 321 to accept an injected banknote and discharge change of banknote (also referred to as a change banknote).

The coin checkout machine 310A and the banknote checkout machine 320A are disposed side by side.

The coin checkout machine 310A and the banknote checkout machine 320A being disposed side by side means that the coin checkout machine 310A and the banknote checkout machine 320A are disposed at positions overlapping each other (at least partly overlapping each other) in a height direction.

More preferably, the upper surfaces of the coin checkout machine 310A and the banknote checkout machine 320A are disposed at the same level with each other, or the lower surfaces of the coin checkout machine 310A and the banknote checkout machine 320A are disposed at the same level with each other.

In this embodiment, the upper surfaces of the coin checkout machine 310A and the banknote checkout machine 320A are disposed at the same level with each other. However, the lower surfaces of the coin checkout machine 310A and the banknote checkout machine 320A are disposed at different levels, and specifically, for example, the lower surface of the banknote checkout machine 320A is disposed higher than the lower surface of the coin checkout machine 310A.

It is preferable that the coin checkout machine 310A and the banknote checkout machine 320A are disposed adjacent to each other in a lateral direction.

Specifically, for example, when the first checkout machine 100 is viewed in the direction of the arrow A of FIG. 1, the banknote checkout machine 320A is disposed on the right side of the coin checkout machine 310A.

Similarly, the coin checkout machine 310B and the banknote checkout machine 320B are disposed side by side.

That is, the coin checkout machine 310B and the banknote checkout machine 320B are disposed at positions overlapping each other in the height direction.

More preferably, the upper surfaces of the coin checkout machine 310B and the banknote checkout machine 320B are disposed at the same level with each other, or the lower surfaces of the coin checkout machine 310B and the banknote checkout machine 320B are disposed at the same level with each other.

In this embodiment, the upper surfaces of the coin checkout machine 310B and the banknote checkout machine 320B are disposed at the same level with each other. However, the lower surfaces of the coin checkout machine 310B and the banknote checkout machine 320B are disposed at different levels, and specifically, for example, the lower surface of the banknote checkout machine 320B is disposed higher than the lower surface of the coin checkout machine 310B.

It is preferable that the coin checkout machine 310B and the banknote checkout machine 320B are disposed adjacent to each other in a lateral direction.

Specifically, for example, when the second checkout machine 200 is viewed in the direction of the arrow B of FIG. 1, the banknote checkout machine 320B is disposed on the right side of the coin checkout machine 310B.

The first checkout machine 100 further has a first card payment processor part 330A for payment using a card such as a credit card or a debit card.

Similarly, the second checkout machine 200 further has a second card payment processor part 330B for payment using a card such as a credit card or a debit card.

Each of the first card payment processor part 330A and the second card payment processor part 330B has a card insertion slot 331 to insert a card, and an input operation part 332 such as a numeric keypad accepting an input operation of a personal identification number, for example.

It is preferable that the first card payment processor part 330A is disposed side by side with the coin checkout machine 310A and the banknote checkout machine 320A.

Specifically, for example, when the first checkout machine 100 is viewed in the direction of the arrow A of FIG. 1, the first card payment processor part 330A is disposed on the right side of the banknote checkout machine 320A, as shown in FIG. 2.

Similarly, it is preferable that the second card payment processor part 330B is disposed side by side with the coin checkout machine 310B and the banknote checkout machine 320B.

Specifically, for example, when the second checkout machine 200 is viewed in the direction of the arrow B of FIG. 1, the second card payment processor part 330B is disposed on the right side of the banknote checkout machine 320B, as shown in FIG. 3.

Here, the first user interface portion 300A includes the coin receiving opening 311, the coin rejecting opening 312, and the coin dispensing opening 313 of the coin checkout machine 310A, the banknote receiving and dispensing opening 321 of the banknote checkout machine 320A, and the card insertion slot 331 and the input operation part 332 of the first card payment processor part 330A. That is, each of these configurations is disposed on the first side surface 510 of the base 500 (or disposed on the first side surface 510 side).

Similarly, the second user interface portion 300B includes the coin receiving opening 311, the coin rejecting opening 312, and the coin dispensing opening 313 of the coin checkout machine 310B, the banknote receiving and dispensing opening 321 of the banknote checkout machine 320B, and the card insertion slot 331 and the input operation part 332 of the second card payment processor part 330B. That is, each of these configurations is disposed on the second side surface 520 of the base 500 (or disposed on the second side surface 520 side).

Each coin receiving opening 311 is disposed on the upper surface of each of the first user interface portion 300A and the second user interface portion 300B and is open upward.

Each coin rejecting opening 312 is disposed on the front side (the side of one side surface) of each of the first user interface portion 300A and the second user interface portion 300B below each of the coin receiving openings 311.

Each coin dispensing opening 313 is disposed next to (on the right side of), for example, each coin rejecting opening 312 on the front side (the side of one side surface) of each of the first user interface portion 300A and the second user interface portion 300B.

Each banknote receiving and dispensing opening 321 is disposed on the front side (the side of one side surface) of each of the first user interface portion 300A and the second user interface portion 300B.

Each card insertion slot 331 is disposed on the front side (the side of one side surface) of each of the first user interface portion 300A and the second user interface portion 300B. Each input operation part 332 is disposed facing upward above each card insertion slot 331, for example.

The checkout device 1000 further has a first display 700A for the first user to use the first checkout machine 100, and a second display 700B for the second user to use the second checkout machine 200. The first display 700A and the second display 700B are mounted on the base 500.

More specifically, for example, the first display 700A is placed on the upper surface 550 at the first side surface 510 side area, and the second display 700B is placed on the upper surface 550 at the second side surface 520 side area.

The first display 700A is disposed such that, for example, a display screen thereof is parallel to the first side surface 510.

The second display 700B is disposed such that, for example, a display screen thereof is parallel to the second side surface 520.

The upper surface 550 is horizontal, and therefore, the first display 700A and the second display 700B are disposed at the same level with each other.

The first display 700A and the second display 700B perform various displays.

The first display 700A and the second display 700B can be, for example, touch panels. In this case, the first user and the second user can give an instruction on the start of the checkout, select a checkout method (for example, whether to make payment with cash, a credit card, or a debit card), or call a store clerk out, for example, through a touch operation on the first display 700A and the second display 700B.

The checkout device 1000 further has a first receipt printer 800A for the first user to use the first checkout machine 100, and a second receipt printer 800B for the second user to use the second checkout machine 200.

The first receipt printer 800A prints and outputs a receipt when the first user has finished the payment.

Similarly, the second receipt printer 800B prints and outputs a receipt when the second user has finished the payment.

The first receipt printer 800A is placed, for example, on the upper surface 550 at the first side surface 510 side area, and more specifically, for example, the first receipt printer 800A is disposed next to (on, for example, the left side of) the first display 700A when the checkout device 1000 is viewed in the direction of the arrow A of FIG. 1.

Similarly, the second receipt printer 800B is placed, for example, on the upper surface 550 at the second side surface 520 side area, and more specifically, for example, the second receipt printer 800B is disposed next to (on, for example, the left side of) the second display 700B when the checkout device 1000 is viewed in the direction of the arrow B of FIG. 1.

The checkout device 1000 further has a first calling lamp part 900A for the first user to use the first checkout machine 100, and a second calling lamp part 900B for the second user to use the second checkout machine 200.

The configuration of each of the first calling lamp part 900A and the second calling lamp part 900B is not particularly limited. However, as an example, each of the first calling lamp part 900A and the second calling lamp part 900B has a columnar shape standing on the base 500 (standing on the upper surface 550, for example) and has a light emitting display part such as an LED lamp at an upper end portion thereof.

For example, the first calling lamp part 900A stands on the upper surface 550 at the first side surface 510 side area, and the second calling lamp part 900B stands on the upper surface 550 at the second side surface 520 side area.

The light emitting display part of the first calling lamp part 900A emits light, for example, when an error related to the checkout by the first user (for example, jam of a coin or a banknote, lack of change, paper jam of a receipt) occurs, or when the first user operates the first display 700A as a touch panel to call a store clerk out.

Similarly, the light emitting display part of the second calling lamp part 900B emits light, for example, when an error related to the checkout by the second user occurs, or when the second user operates the second display 700B as a touch panel to call a store clerk out.

The first display 700A, the first receipt printer 800A, and the first calling lamp part 900A are disposed at positions above the first checkout machine 100.

On the other hand, the second display 700B, the second receipt printer 800B, and the second calling lamp part 900B are disposed at positions above the first checkout machine 100 and above the second checkout machine 200.

The checkout device 1000 further has a blindfold board 400. The blindfold board 400 screens (visually screens) a region where the first user interface portion 300A of the first checkout machine 100 is disposed and a region where the second user interface portion 300B of the second checkout machine 200 is disposed from one another.

For this reason, the first user and the second user can perform the checkout without paying attention to each other's eyes. In particular, it is not necessary to concern with other's eyes when inputting a personal identification number for the checkout using a credit card, for example.

More specifically, for example, the blindfold board 400 partitions an area 1100A where the first display 700A, the first receipt printer 800A, and the first calling lamp part 900A are disposed, and an area 1100B where the second display 700B, the second receipt printer 800B and the second calling lamp part 900B are disposed (See FIG. 6).

The blindfold board 400, for example, stands upwardly (for example, vertically standing) from the upper surface of the base 500. It is preferable that the blindfold board 400 extends from the corner portion between the first upper side surface 515 and the second upper side surface 525 toward the chamfered surface 560 side, as shown in FIG. 1.

The blindfold board 400 may be an opaque plate member or may be a translucent or transparent plate member. However, when the blindfold board 400 is transparent, it is preferable that it is colored.

As described above, in this embodiment, the first side surface 510 of the base 500 that is the side surface on which the first user interface portion 300A of the first checkout machine 100 is disposed and the second side surface 520 of the base 500 that is the side surface on which the second user interface portion 300B of the second checkout machine 200 is disposed are orthogonal to each other.

In this case, it is preferable that the blindfold board 400 is oriented to intersect both the first side surface 510 and the second side surface 520, as shown in FIGS. 1 and 6.

The blindfold board 400 is preferably disposed at an angle of 30 degrees or more and 60 degrees or less with respect to the first side surface 510 and further preferably disposed at an angle of 45 degrees with respect to both the first side surface 510 and the second side surface 520.

The checkout device 1000 further has a first loading table 600A for the first user to use the first user interface portion 300A of the first checkout machine 100 and a second loading table 600B for the second user to use the second user interface portion 300B of the second checkout machine 200. The first loading table 600A and the second loading table 600B are provided to the base 500.

Each of the first loading table 600A and the second loading table 600B is formed, for example, in a plate shape, and one end portion thereof is fixed to the side surface of the base 500, whereby the upper surface thereof is horizontally disposed and the other end side protrudes outward from the side surface of the base 500.

More specifically, for example, one end portion of the first loading table 600A is fixed to the third side surface 530 and the other end side protrudes to the opposite of the second side surface 520 relative to the third side surface 530.

On the other hand, for example, one end portion of the second loading table 600B is fixed to the fourth side surface 540 and the other end side protrudes to the opposite of the first side surface 510 relative to the fourth side surface 540.

The planar shape of each of the first loading table 600A and the second loading table 600B is not particularly limited. However, it is preferable that the planar shape is a rectangular shape (for example, a rectangular shape having rounded corners).

Baggage such as a shopping basket can be placed on each of the first loading table 600A and the second loading table 600B.

In this embodiment, the first loading table 600A and the second loading table 600B are disposed, for example, at the same level with each other.

Here, as shown in FIG. 4, the third side surface 530 has a first opening 531 formed thereon that communicates with a placement region of the first checkout machine 100 inside the base 500, and a first lid part 532 provided thereto that is removably attached to the third side surface 530 and closes the first opening 531.

Cables (not shown) are drawn out from the back side of the first checkout machine 100, thereby to perform work such as wiring of the cables through the first opening 531 with the first lid part 532 being removed from the third side surface 530 to open the first opening 531. For example, the cables of the first checkout machine 100 can be drawn onto the upper surface 550.

Similarly, as shown in FIG. 5, the fourth side surface 540 has a second opening 541 formed thereon that communicates with a placement region of the second checkout machine 200 inside the base 500, and a second lid part 542 provided thereto that is removably attached to the fourth side surface 540 and closes the second opening 541.

Cables (not shown) are drawn out from the back side of the second checkout machine 200, and thereby to perform work such as wiring of the cables through the second opening 541 with the second lid part 542 being removed from the fourth side surface 540 to open the second opening 541. For example, the cables of the second checkout machine 200 can be drawn onto the upper surface 550.

More specifically, for example, the first opening 531 of the third side surface 530 is formed above the second loading table 600B (FIG. 4). This can prevent the second loading table 600B from interfering with various work through the first opening 531.

Similarly, for example, the second opening 541 of the fourth side surface 540 is formed above the first loading table 600A (FIG. 5). This can prevent the first loading table 600A from interfering with various work through the second opening 541.

It is preferable that the first checkout machine 100 and the second checkout machine 200 are the same with respect to one another. That is, it is preferable that the first checkout machine 100 and the second checkout machine 200 have the same function with respect to one another and are formed in the same shape and dimensions.

As shown in FIG. 7, each of the first checkout machine 100 and the second checkout machine 200 is formed in a flat rectangular parallelepiped shape, for example.

The first checkout machine 100 and the second checkout machine 200 are oriented such that the side surface 110 of the first checkout machine 100 and the side surface 210 of the second checkout machine 200 are orthogonal to each other.

For example, the first user interface portion 300A, which is located at one side portion of the first checkout machine 100, strays (protrudes) from the space above the second checkout machine 200 toward the first side surface 510 (that is, toward the side surface 110).

Similarly, the second user interface portion 300B, which is located at one side portion of the second checkout machine 200, strays (protrudes) from the space below the first checkout machine 100 toward the second side surface 520 (that is, toward the side surface 210).

Next, the base 500 for a checkout device according to this embodiment will be described using FIG. 8.

The base 500 has the first side surface 510, the second side surface 520, the third side surface 530, the fourth side surface 540, the upper surface 550, the chamfered surface 560, the first upper side surface 515, and the second upper side surface 525 described above.

The first checkout machine 100 and the second checkout machine 200 can be mounted on the base 500.

Each of a plurality of side surfaces of the base 500 has an insertion hole formed thereon to insert each of the first checkout machine 100 and the second checkout machine 200. That is, an insertion hole 511 is formed on the first side surface 510, and an insertion hole 521 is formed on the second side surface 520.

For example, the back side of the first checkout machine 100 is horizontally inserted into the insertion hole 511 and the first checkout machine 100 is pushed to a predetermined depth, thereby to mount the first checkout machine 100 on the base 500, as shown in FIG. 1.

Similarly, the back side of the second checkout machine 200 is horizontally inserted into the insertion hole 521 and the second checkout machine 200 is pushed to a predetermined depth, thereby to mount the second checkout machine 200 on the base 500, as shown in FIG. 1.

As the first checkout machine 100 is inserted into the insertion hole 511 of the first side surface 510 and the second checkout machine 200 is inserted into the insertion hole 521 of the second side surface 520, the first checkout machine 100 and the second checkout machine 200 overlap when seen in a plan view, the first checkout machine 100 is disposed above the second checkout machine 200, and the first user interface portion 300A of the first checkout machine 100 and the second user interface portion 300B of the second checkout machine 200 are disposed on the different side surfaces (for example, the first side surface 510 and the second side surface 520 which are orthogonal to each other) of the base 500 (See FIG. 1).

The first checkout machine 100 and the second checkout machine 200 are removable from the base 500.

Accordingly, the first checkout machine 100 and the second checkout machine 200 are separated from the base 500 to transport the first checkout machine 100, the second checkout machine 200 and the base 500 to the installation place of the checkout device 1000, thereby reducing a load of transportation work.

For example, business operators originally owning the first checkout machine 100 and the second checkout machine 200 can assemble the checkout device 1000, if only the base 500 is sold to them, by effectively utilizing the first checkout machine 100 and the second checkout machine 200 originally owned by the business operators.

The checkout device 1000 can be assembled by mounting the first checkout machine 100 and the second checkout machine 200 on the base 500 and mounting the first display 700A, the second display 700B, the first receipt printer 800A, the second receipt printer 800B, the first calling lamp part 900A, the second calling lamp part 900B, the blindfold board 400, and others on the base 500.

For example, a slit 555 for fixing the blindfold board 400 by inserting a lower end portion of the blindfold board 400 therein may be formed on, for example, the upper surface 550 of the base 500.

An insertion and fixing hole (not shown) for inserting a lower end portion of each of the first calling lamp part 900A and the second calling lamp part 900B in order to raise each of the first calling lamp part 900A and the second calling lamp part 900B may be formed on the upper surface 550 of the base 500.

FIG. 8 shows a state where the first loading table 600A and the second loading table 600B are fixed to the base 500. However, the first loading table 600A and the second loading table 600B may be removable from the base 500. Thus, the first loading table 600A and the second loading table 600B can be removed from the base 500 when, for example, the base 500 is transported, thereby suppressing bulkiness in the transportation, for example.

The base 500 has, for example, an insertion hole lid part 512 and an insertion hole lid part 522.

The insertion hole lid part 512 is removably attached to the first upper side surface 515 of the first side surface 510 and is capable of closing the insertion hole 511.

Similarly, the insertion hole lid part 522 is removably attached to the second upper side surface 525 of the second side surface 520 and is capable of closing the insertion hole 521.

The work of mounting the first checkout machine 100 and the second checkout machine 200 on the base 500 is performed with the insertion hole lid part 512 and the insertion hole lid part 522 being removed from the base 500.

On the other hand, when the base 500 is stored or transported, the insertion hole lid part 512 and the insertion hole lid part 522 are mounted on the base 500, thereby enabling prevention of infiltration of foreign matter such as dust into the insertion hole 511 and the insertion hole 521.

Next, an example of use of the checkout device 1000 will be described using FIG. 9.

In the example shown in FIG. 9, two goods registration tables 3000 are disposed in parallel with each other in a selling area of a store, and store clerks 10 and 20 perform the customer service work between the goods registration tables 3000.

A goods registration device 3100 for the store clerk to perform registration processing of purchased goods of a purchaser is placed on each of the goods registration tables 3000.

Each of the goods registration tables 3000 is long in one direction, and the checkout device 1000 is disposed at one end side of each goods registration table 3000 in a longitudinal direction thereof.

A packing table 3200 for the purchaser to pack the purchased goods is disposed opposite to a region where the two goods registration tables 3000 is located, relative to a region where the two checkout devices 1000 is located.

Identification numbers are assigned to the first checkout machine 100 and the second checkout machine 200 of each of the checkout devices 1000.

Here, the identification numbers of the first checkout machine 100 and the second checkout machine 200 of the checkout device 1000 on the left side in FIG. 9 are No. 1 and No. 2, respectively, and the identification numbers of the first checkout machine 100 and the second checkout machine 200 of the checkout device 1000 on the right side in FIG. 9 are No. 3 and No. 4, respectively.

The identification number of each of these four checkout machines is displayed, for example, on a sign plate (not shown) provided to stand at a corresponding position on the upper surface 550 of the corresponding checkout device 1000, thereby to facilitate easy recognition by the purchaser.

The store clerk 10 registers the purchased goods by handling the goods registration device 3100 on one goods registration table 3000, and the store clerk 20 registers the purchased goods by handling the goods registration device 3100 on another goods registration table 3000.

If the store clerk 10 finishes the registration of the purchased goods of a purchaser 30, the store clerk 10 transmits goods registration information of the purchaser 30 to an available checkout machine (for example, the first checkout machine 100 having the identification number of No. 1) and tells the identification number of the checkout machine (for example, No. 1) to the purchaser 30.

At this time, the store clerk 10 carries, for example, a shopping basket (not shown) containing the purchased goods of the purchaser 30, to the loading table corresponding to the checkout machine (for example, the first loading table 600A).

Thereafter, the purchaser 30 performs checkout at the checkout machine having the identification number told by the store clerk 10.

The checkout is started, for example, with a touch operation of the purchaser 30 on a "checkout start button" displayed on the first display 700A as a touch panel.

Subsequently, for example, a selection screen for payment method is displayed on the first display 700A, allowing to select payment with cash, payment with a credit card, payment with a debit card, and so on.

If the purchaser 30 selects the payment with cash, the coin checkout machine 310A and the banknote checkout machine 320A goes into a wait state of receiving cash.

Subsequently, if the purchaser 30 injects cash into at least one of the coin receiving opening 311 and the banknote receiving and dispensing opening 321, the first checkout machine 100 executes counting processing of the injected cash and displays the counted amount and a "amount confirmation button" on the first display 700A.

Subsequently, if the purchaser 30 performs a touch operation on the "amount confirmation button", the first checkout machine 100 executes calculation processing of change and pays out change to the coin dispensing opening 313 and the banknote receiving and dispensing opening 321.

The first checkout machine 100 also causes the first receipt printer 800A to execute receipt printing processing, and in response to this, the first receipt printer 800A prints and outputs a receipt.

Thereafter, the purchaser 30 carries the shopping basket containing the purchased goods to the packing table 3200 and packs the purchased goods.

Here, as shown by the traffic line of the store clerk 10 indicated by the broken line in FIG. 9, the store clerk 10 can smoothly move to a location accessible to advise how to handle the checkout device 1000 to a purchaser using the first checkout machine 100 of the checkout device 1000 on the left side, a purchaser using the second checkout machine 200 of the checkout device 1000 on the left side, and a purchaser using the first checkout machine 100 of the checkout device 1000 on the right side.

Similarly, the store clerk 20 can smoothly move to a location accessible to advise how to handle the checkout device 1000 to a purchaser using the second checkout machine 200 of the checkout device 1000 on the left side, a purchaser using the first checkout machine 100 of the checkout device 1000 on the right side, and a purchaser using the second checkout machine 200 of the checkout device 1000 on the right side.

According to the first embodiment as described above, the first checkout machine 100 is disposed above the second checkout machine 200 such that the first checkout machine 100 and the second checkout machine 200 overlap when seen in a plan view, thereby allowing to save an equipment space for two parallel checkout processes.

This allows for more checkout in parallel in a limited installation space (planar space) in the store.

Here, the first user interface portion 300A of the first checkout machine 100 and the second user interface portion 300B of the second checkout machine 200 are disposed on different side surfaces of the checkout device 1000 (for example, different side surfaces of the base 500), thereby allowing to suppress interference between the first user using the first user interface portion 300A and the second user using the second user interface portion 300B. This allows smooth checkout by the first user and the second user while preserving their privacy.

If the first checkout machine 100 has the coin checkout machine 310A and the banknote checkout machine 320A and the second checkout machine 200 has the coin checkout machine 310B and the banknote checkout machine 320B, the first checkout machine 100 and the second checkout machine 200 become bulky.

In such a case, the first checkout machine 100 is disposed above the second checkout machine 200 such that the first checkout machine 100 and the second checkout machine 200 overlap when seen in a plan view, thereby to particularly enhance the effect of reducing the installation space (planar space) of two checkout machines; the first checkout machine 100 and the second checkout machine 200.

The coin checkout machine 310A and the banknote checkout machine 320A are disposed side by side, thereby allowing for an operation on the coin checkout machine 310A and an operation on the banknote checkout machine 320A at the same level, thus facilitating the checkout.

Similarly, the coin checkout machine 310B and the banknote checkout machine 320B are disposed side by side, thereby allowing for an operation on the coin checkout machine 310B and an operation on the banknote checkout machine 320B at the same level, thus facilitating the checkout.

The checkout device 1000 has the blindfold board 400 screening a region where the first user interface portion 300A of the first checkout machine 100 is disposed and a region where the second user interface portion 300B of the second checkout machine 200 is disposed from one another. Therefore, the first user and the second user can perform the checkout without paying attention to each other's eyes. In particular, it is not necessary to concern with other's eyes when inputting a personal identification number for the checkout using a credit card, for example.

In this embodiment, the first side surface 510 of the base 500 that is the side surface on which the first user interface portion 300A of the first checkout machine 100 is disposed and the second side surface 520 of the base 500 that is the side surface on which the second user interface portion 300B of the second checkout machine 200 is disposed are orthogonal to each other. In this case, the blindfold board 400 is oriented to intersect both the first side surface 510 and the second side surface 520, thereby allowing to effectively screen the area where the first user interface portion 300A is disposed and the area where the second user interface portion 300B is disposed from one another by a single blindfold board 400.

The side surface 110 of the first checkout machine 100 at the user interface portion 300A side and the first side surface 510 of the base 500 that is the side surface on which the user interface portion 300A of the first checkout machine 100 is disposed are flush with each other. This results in a neat appearance of the first side surface 510 side in the checkout device 1000, and enables to prevent a person, a cart, and others moving in the store from colliding with the first checkout machine 100.

Similarly, the side surface 210 of the second checkout machine 200 at the first user interface portion 300A side and the second side surface 520 of the base 500 that is the side surface on which the second user interface portion 300B of the second checkout machine 200 is disposed are flush with each other. This results in a neat appearance of the second side surface 520 side in the checkout device 1000, and enables to prevent a person, a cart, and others moving in the store from colliding with the second checkout machine 200.

The first loading table 600A for the first user to use the first user interface portion 300A of the first checkout machine 100 and the second loading table 600B for the second user to use the second user interface portion 300B of the second checkout machine 200 are provided to the base 500. This allows the first user and the second user to perform the checkout while placing their baggage on respective dedicated loading tables, thereby enabling prevention of switching the baggage, for example.

If the first loading table 600A and the second loading table 600B are disposed at the same level with each other, a work load to place handled baggage or baggage placed on a floor onto each loading table can level out between each user.

It is also preferable that the first loading table 600A corresponding to the first user interface portion 300A disposed at a higher level is disposed higher than the second loading table 600B corresponding to the second user interface portion 300B disposed at a lower level. In such a case, the distance between each user interface portion 300 and each of the loading tables 600A and 600B becomes short, thereby facilitating each user's monitoring of the baggage on each of the loading stages 600A and 600B even when each user interface portion 300 is handled.

The first display 700A for the first user to use the first checkout machine 100 and the second display 700B for the second user to use the second checkout machine 200 are mounted on the base 500, thereby enabling the first user and the second user to perform the checkout by using the respective dedicated displays.

If the first display 700A and the second display 700B are disposed at the same level with each other, the posture (standing posture) when viewing the first display 700A and the posture (standing posture) when viewing the second display 700B can be made to be equal to each other.

According to the base 500 of this embodiment, the checkout device 1000 can be constructed (assembled) with ease by inserting the first checkout machine 100 and the second checkout machine 200 into the insertion holes 511 and 521 respectively formed in a plurality of side surfaces. That is, it is possible to easily construct the checkout device 1000 which allows for more checkout in parallel in a limited installation space.

The base 500 has the plurality of insertion hole lid parts 512 and 522 that are each removably attached to a plurality of side surfaces of the base 500 and are capable of closing the insertion holes 511 and 521. The insertion holes 511 and 521 can be closed by the insertion hole lid parts 512 and 522 when, for example, the base 500 is stored or transported, thereby enabling prevention of infiltration of foreign matter such as dust into the insertion holes 511 and 521.

Second Embodiment

Figure 10:
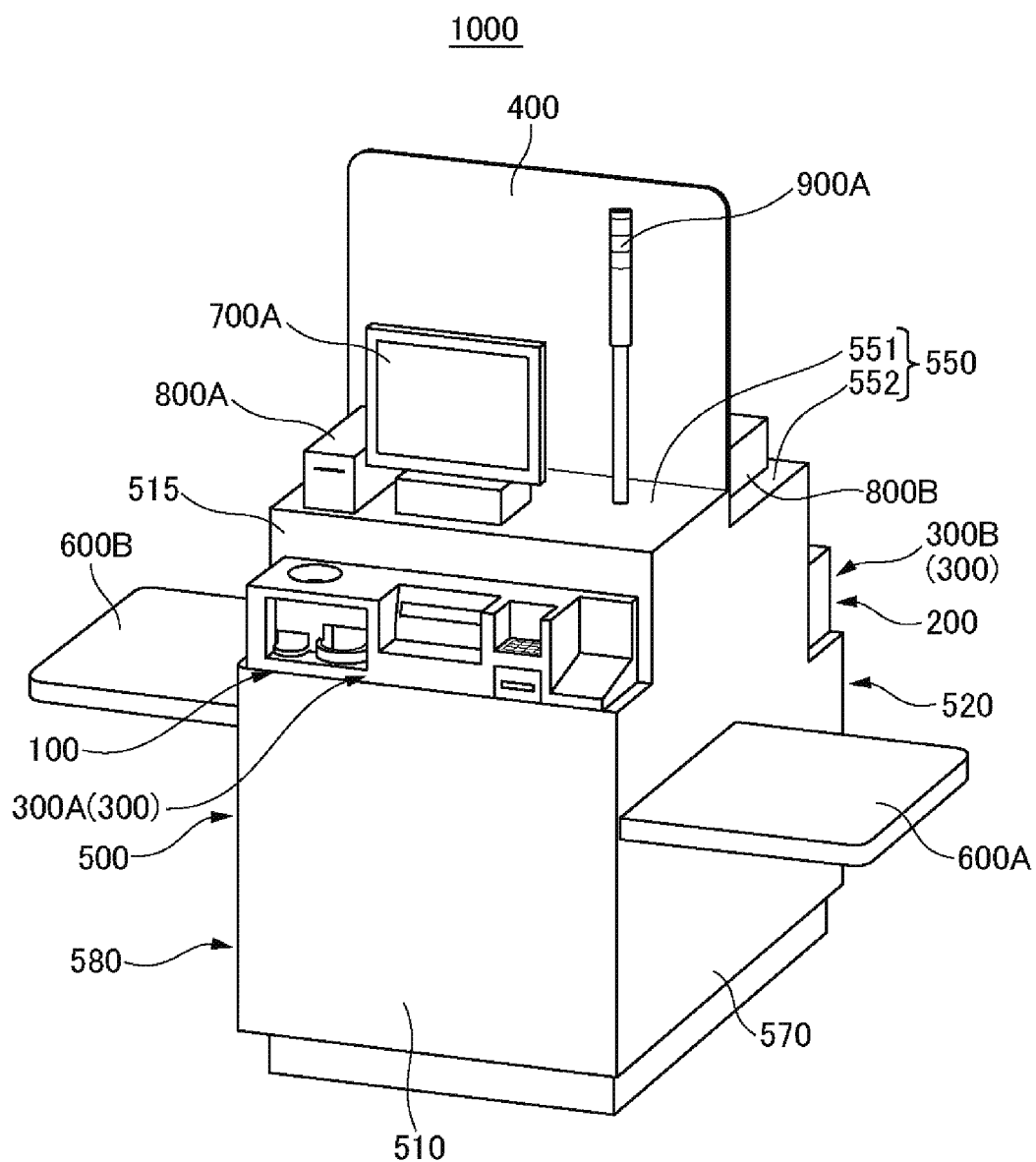
FIG. 10 is a perspective view of a checkout device according to a second embodiment as viewed from the front side.

FIG. 10 is a perspective view of the checkout device 1000 according to a second embodiment as viewed from the front side.

Figure 11:
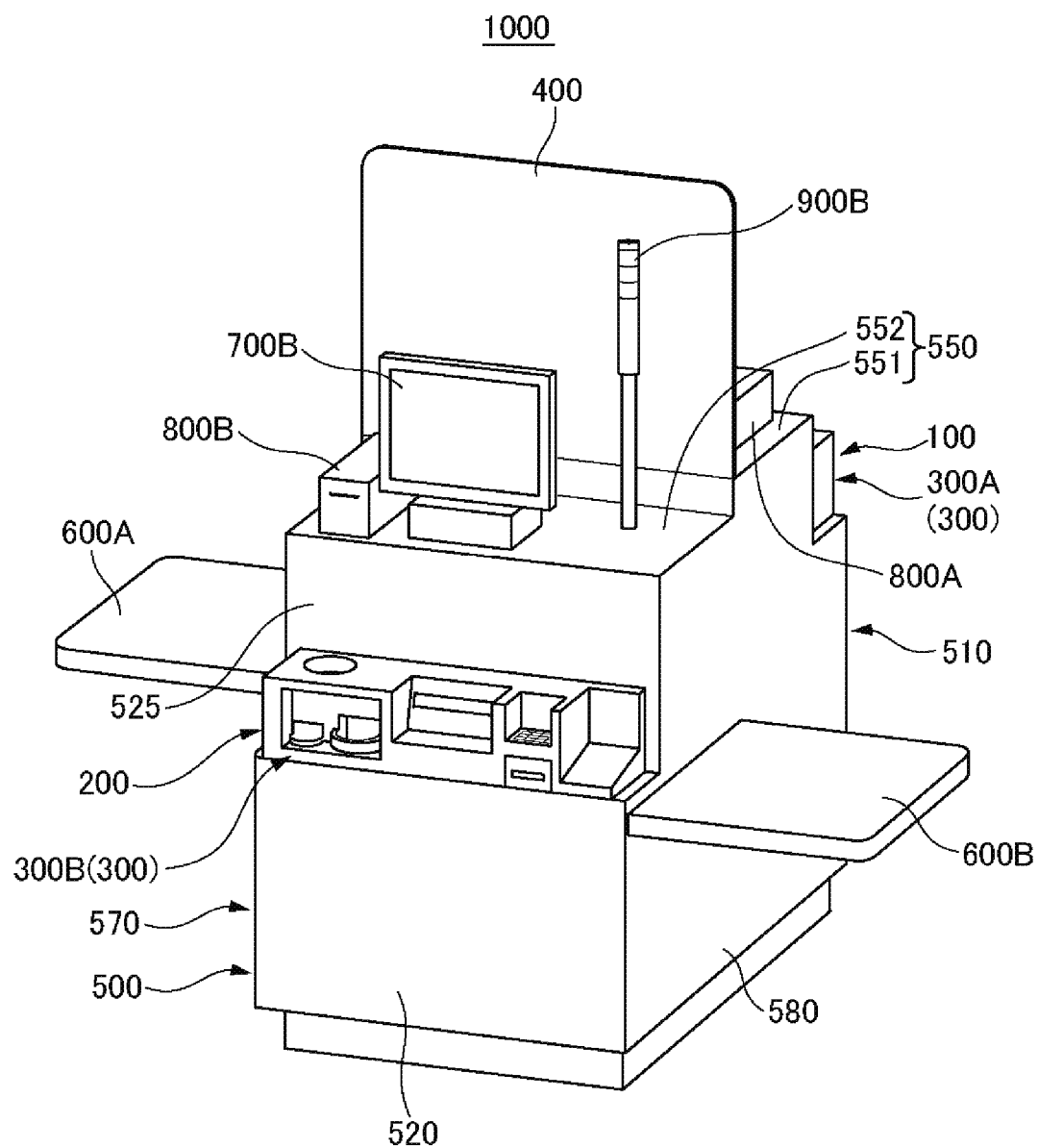
FIG. 11 is a perspective view of the checkout device according to the second embodiment as viewed from the back side.

FIG. 11 is a perspective view of the checkout device 1000 according to the second embodiment as viewed from the back side.

Figure 12:
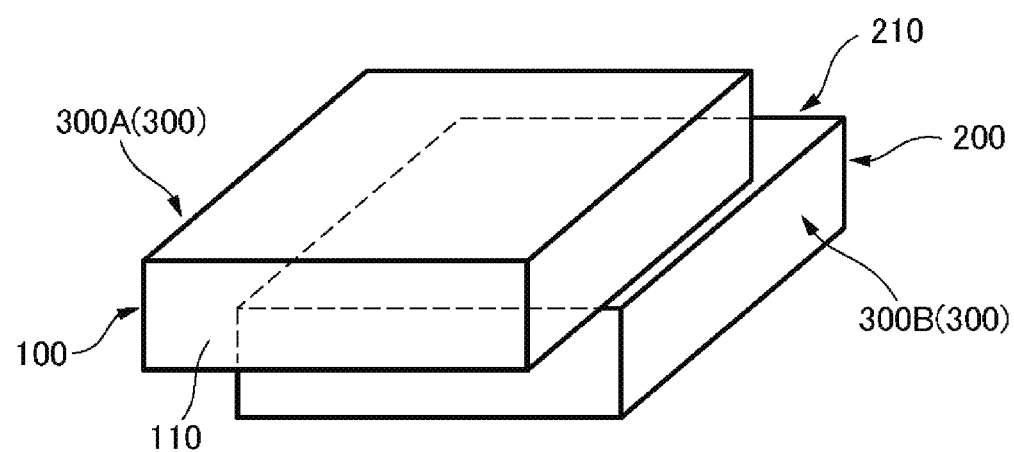
FIG. 12 is a schematic perspective view showing the disposition of the first checkout machine and the second checkout machine in the checkout device according to the second embodiment.

FIG. 12 is a schematic perspective view showing the disposition of the first checkout machine 100 and the second checkout machine 200 in the checkout device 1000 according to the second embodiment.

Figure 13:
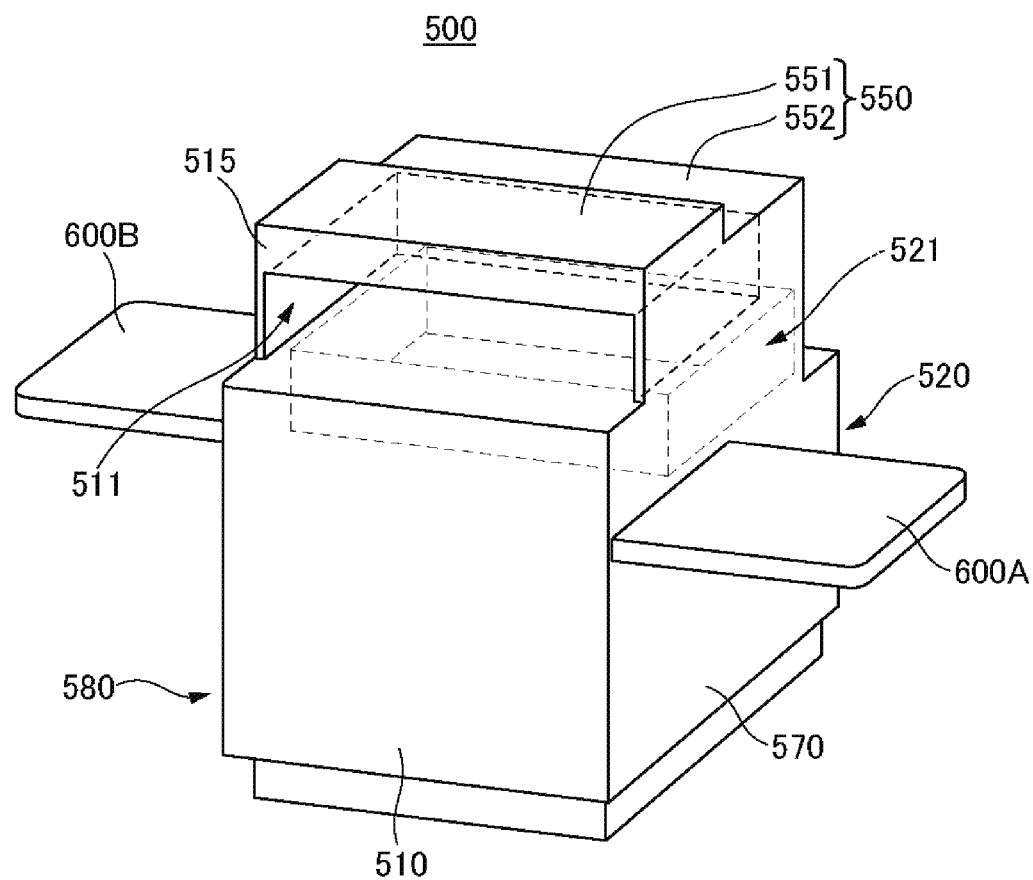
FIG. 13 is a perspective view of a base for a checkout device according to the second embodiment.

FIG. 13 is a perspective view of the base 500 for a checkout device according to the second embodiment.

The checkout device 1000 according to the second embodiment is different from the checkout device 1000 according to the first embodiment in respects which will be described below and is configured to be equal to the checkout device 1000 according to the first embodiment in the other respects.

In the first embodiment described above, an example in which the first user interface portion 300A and the second user interface portion 300B are respectively disposed on the first side surface 510 and the second side surface 520 which are orthogonal to each other has be described.

In contrast, in this embodiment, as shown in FIGS. 10 and 11, the first user interface portion 300A and the second user interface portion 300B are respectively disposed on the first side surface 510 and the second side surface 520 which are opposite to each other.

In this embodiment, the base 500 is formed, for example, in a rectangular shape when seen in a plan view and has the first side surface 510 and the second side surface 520 which are opposite to each other, and a pair of side surfaces 570 and 580 located between the first side surface 510 and the second side surface 520.

The side surface 570 and the side surface 580 are made to be opposite to each other, for example.

In this embodiment, the upper surface 550 includes a high step part 551 and a low step part 552 disposed at a lower step than the high step part 551. The high step part 551 is a half of the upper surface 550 at the first side surface 510 side, and the low step part 552 is a half of the upper surface 550 at the second side surface 520 side.

The first display 700A, the first receipt printer 800A, and the first calling lamp part 900A are disposed at the high step part 551, and the second display 700B, the second receipt printer 800B, and the second calling lamp part 900B are disposed at the low step part 552.

Therefore, the first display 700A is disposed higher than the second display 700B.

The blindfold board 400 is disposed at the boundary between the high step part 551 and the low step part 552 when seen in a plan view. The blindfold board 400 is disposed, for example, parallel to the first side surface 510 and the second side surface 520.

For example, one end portion of the first loading table 600A is fixed to the side surface 570, and the other end side protrudes to the opposite to the side surface 580 side relative to the side surface 570.

Similarly, for example one end portion of the second loading table 600B is fixed to the side surface 580, and the other end side protrudes to opposite to the side surface 570 side relative to the side surface 580.

As can be seen from the perspective view shown in FIG. 12, the first checkout machine 100 and the second checkout machine 200 are disposed such that the side surface 110 and the side surface 210 are parallel to each other and opposite to each other.

As shown in FIG. 13, also in this embodiment, the insertion hole 511 is formed on the first side surface 510 of the base 500. The insertion hole 521 (not shown) is formed on the second side surface 520.

In this embodiment, an opening direction of the insertion hole 511 and an opening direction of the insertion hole 521 are opposite directions.

Also in this embodiment, the back side of the first checkout machine 100 is horizontally inserted into the insertion hole 511 and the first checkout machine 100 is pushed to a predetermined depth, thereby to mount the first checkout machine 100 on the base 500, as shown in FIG. 10.

Similarly, the back side of the second checkout machine 200 is horizontally inserted into the insertion hole 521 and the second checkout machine 200 is pushed to a predetermined depth, thereby to mount the second checkout machine 200 on the base 500, as shown in FIG. 11.

Also with the second embodiment as described above, the same effects as those of the first embodiment can be obtained.

In this embodiment, although it also depends on the shapes of the first checkout machine 100 and the second checkout machine 200, it is possible to further save a space for the checkout device 1000 (reduce the planar space) than in the first embodiment.

For example, if each of the first checkout machine 100 and the second checkout machine 200 has a rectangular parallelepiped shape long in a depth direction, both end positions of the first checkout machine 100 in the width direction are aligned with both end positions of the second checkout machine 200 in the width direction when seen in a plan view, thereby allowing the width dimension of the planar space occupied by the first checkout machine 100 and the second checkout machine 200 to be the width dimension of a single checkout machine.

Third Embodiment

In the first embodiment described above, an example in which the first opening 531 (FIG. 4) of the third side surface 530 and the second opening 541 (FIG. 5) of the fourth side surface 540 are for work such as wiring of the cables on the back sides of the first checkout machine 100 and the second checkout machine 200 respectively has been described.

However, the first opening 531 and the second opening 541 can also be used as insertion holes to insert the first checkout machine 100 and the second checkout machine 200 respectively.

That is, a plurality of side surfaces of the base 500 includes four side surfaces; the first side surface 510, the second side surface 520 orthogonal to the first side surface 510, the third side surface 530 opposite to the first side surface 510, and the fourth side surface 540 opposite to the second side surface 520, and a insertion hole may be formed on each of the four side surfaces.

In this case, each of the first lid part 532 (FIG. 4) and the second lid part 542 (FIG. 5) can be regarded as an insertion hole lid part.

In this manner, if the insertion hole is formed on each of the four side surfaces of the base 500, the checkout device 1000 can be assembled by inserting the first checkout machine 100 and the second checkout machine 200 into places where the insertion hole lid parts are removed to open the insertion holes.

Accordingly, it is possible to dispose each user interface portion 300 on a favorite side surface among the four side surfaces of the base 500 according to, for example, the circumstances of an installation space in a store or the concept of the layout of the user interface portions 300 of the first checkout machine 100 and the second checkout machine 200 for each store.

In each of the embodiments described above, another checkout machine other than the first checkout machine 100 and the second checkout machine 200 may be disposed between the first checkout machine 100 and the second checkout machine 200 (at the position between the first checkout machine 100 and the second checkout machine 200 in the height direction).

Similarly, another checkout machine may be disposed also higher than the first checkout machine 100 or lower than the second checkout machine 200.

Another checkout machine as referred to herein may be, for example, a checkout machine used for the checkout by the first user using the first checkout machine 100, a checkout machine used for the checkout by the second user using the second checkout machine 200, or a checkout machine used for the checkout by a third user other than the first user and the second user.

As a specific example, for example, the first checkout machine 100 may have one change device of the coin checkout machine 310A and the banknote checkout machine 320A and may not have the other change device, and the other change device may be disposed between the first checkout machine 100 and the second checkout machine 200, above the first checkout machine 100, or below the second checkout machine 200. Similarly, the second checkout machine 200 may have one change device of the coin checkout machine 310B and the banknote checkout machine 320B and may not have the other change device, and the other change device may be disposed between the first checkout machine 100 and the second checkout machine 200, below the second checkout machine 200, or above the first checkout machine 100.

In each of the embodiments described above, an example in which each of the first checkout machine 100 and the second checkout machine 200 has the coin change device, the banknote change device, and the card payment processor part has been described.

However, each of the first checkout machine 100 and the second checkout machine 200 may have other configuration provided that it is possible for a purchaser to perform the checkout of the purchased goods of the purchaser.

For example, each of the first checkout machine 100 and the second checkout machine 200 may have the coin change device and the banknote change device but may not have the card payment processor part, thereby permitting only the cash checkout.

If only cash checkout is permitted, each of the first checkout machine 100 and the second checkout machine 200 may have only one of the coin change device and the banknote change device.

Alternatively, each of the first checkout machine 100 and the second checkout machine 200 may have the card payment processor part but may not have the coin change device and the banknote change device, thereby permitting only the credit card or the debit card checkout, for example.

Alternatively, each of the first checkout machine 100 and the second checkout machine 200 may have an electronic money payment processor part for executing electronic money checkout, thereby permitting electronic money checkout. In this case, each of the first checkout machine 100 and the second checkout machine 200 may have the electronic money payment processor part but may not have the coin change device and the banknote change device or the card payment processor part, thereby permitting only the electronic money checkout.

The user interface portion 300 permitting the electronic money checkout includes a reading device for reading information of a storage medium (for example, an IC card) storing information such as balance of the electronic money. A user performs processing of causing the reading device to read the information stored in the storage medium, by bringing the storage medium into contact with the reading device or holding the storage medium over the reading device.

In each of the embodiments described above, an example in which the checkout device 1000 is a semi-self-register and each of the first checkout machine 100 and the second checkout machine 200 is a checkout machine for a purchaser to perform the checkout of the purchased goods of the purchaser has been mainly describe.

However, as described above, the checkout device 1000 may be a register (a register device) for a store clerk to perform the checkout of the purchased goods of a purchaser. In this case, each of the first checkout machine 100 and the second checkout machine 200 is a drawer for a store clerk to perform the checkout of the purchased goods of a purchaser.

If the first checkout machine 100 and the second checkout machine 200 is a drawer, each of the first checkout machine 100 and the second checkout machine 200 projects toward the front side (the side of the side surface 110 or 210) by store clerk operation, and returns to the original position to be latched by the store clerk pressing the side surface 110 or 210. The user interface portion 300 in this case includes at least the side surface 110 or 210 for the store clerk to press to return the projected first checkout machine 100 and second checkout machine 200 to the original position.

In each of the embodiments described above, an example in which the checkout device 1000 is a semi-self-register has been mainly described. However, the checkout device 1000 may be a full-self-register configured such that a purchaser performs registration processing of purchased goods as well. In this case, for example, a registration device such as a bar code reader, for performing the registration processing of purchased goods, is added to each of the first checkout machine 100 and the second checkout machine 200 as well.

Fourth Embodiment

Figure 14:
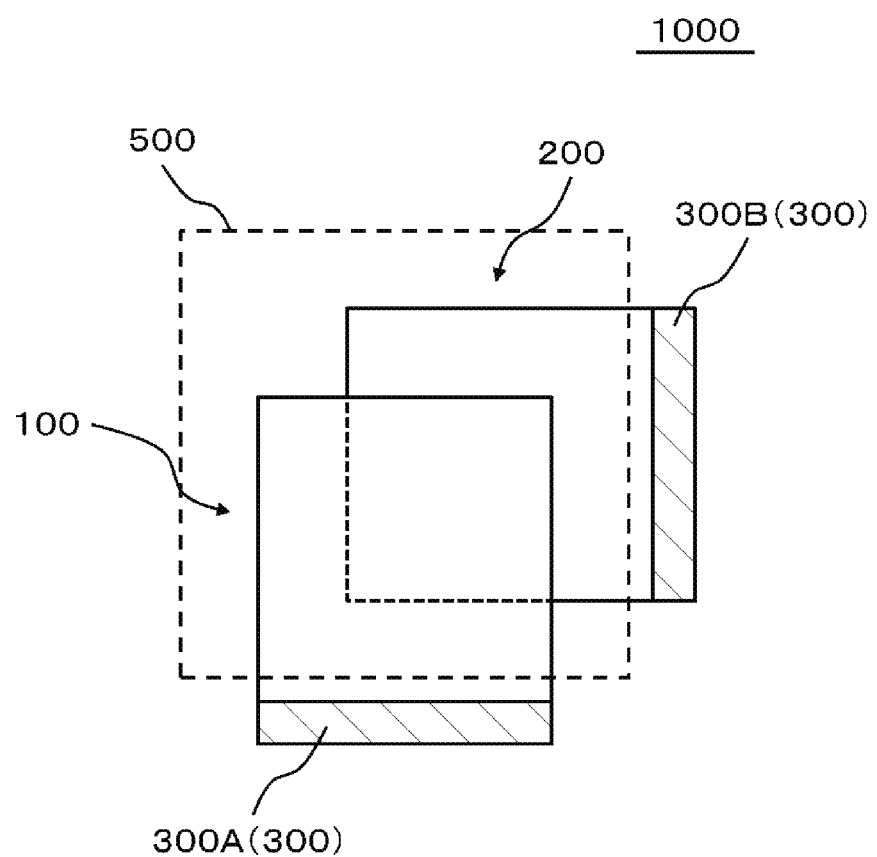
FIG. 14 is a diagram showing an example of a checkout device according to a fourth embodiment.

FIG. 14 is a diagram showing an example of a checkout device 1000 according to a fourth embodiment. This drawing is a diagram showing the first checkout machine 100 and the second checkout machine 200 as viewed from a direction perpendicular to the horizontal plane (more specifically, above the base 500). The direction perpendicular to the horizontal plane is a direction perpendicular to an installation surface of the first checkout machine 100 and the second checkout machine 200. The checkout device 1000 according to this embodiment has the same configuration as the checkout device 1000 according to the first to third embodiments except for the following respects.

In the example shown in this drawing, the first checkout machine 100 is located above the second checkout machine 200. However, the second checkout machine 200 may be located above the first checkout machine 100. Hereinafter, in this embodiment, description will be performed on the assumption that the first checkout machine 100 is located above the second checkout machine 200.

In the example shown in this drawing, at least a part of the first checkout machine 100 overlaps the second checkout machine 200. More specifically, in the example shown in this drawing, a part of the first checkout machine 100 does not overlap the second checkout machine 200 and the remaining part of the first checkout machine 100 overlaps the second checkout machine 200. As described using FIG. 8, the first checkout machine 100 is inserted into the insertion hole 511 of the base 500 in a direction in which the first user interface portion 300A faces the outside of the base 500, and the second checkout machine 200 is inserted into the insertion hole 521 of the base 500 in a direction in which the second user interface portion 300B faces the outside of the base 500. In this way, the first checkout machine 100 and the second checkout machine 200 are mounted on the base 500 (a mounting member).

The difference between the direction in which the first checkout machine 100 (the first user interface portion 300A) faces and the direction in which the second checkout machine 200 (the second user interface portion 300B) faces is not limited to the example shown in this drawing (90°). This difference may be, for example, 30° or more and 150° or less. The first checkout machine 100 (the first user interface portion 300A) and the second checkout machine 200 (the second user interface portion 300B) may face opposite to each other.

Figure 15:
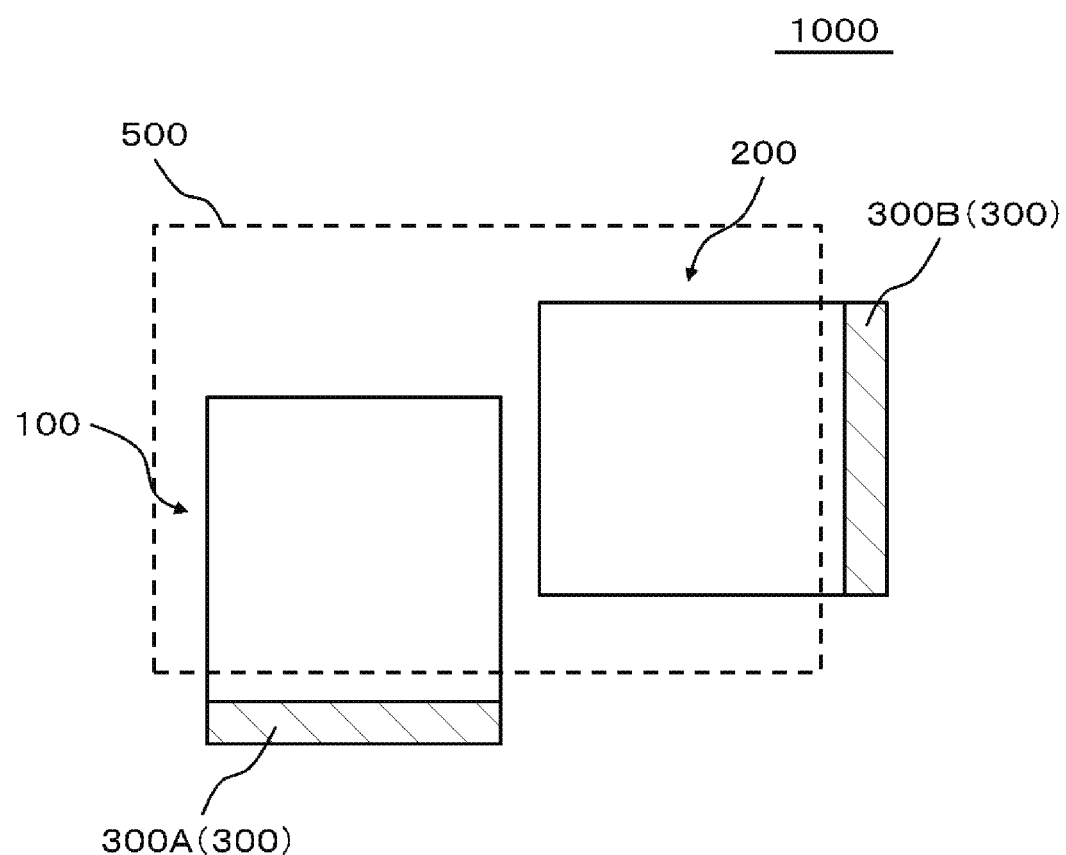
FIG. 15 is a diagram showing a modification example of FIG. 14.

FIG. 15 is a diagram showing a modification example of FIG. 14. This drawing is a diagram showing the first checkout machine 100 and the second checkout machine 200 as viewed from the direction perpendicular to the horizontal plane (more specifically, above the base 500). As shown in this drawing, any part of the first checkout machine 100 may not overlap the second checkout machine 200.

Fifth Embodiment

Figure 16A:
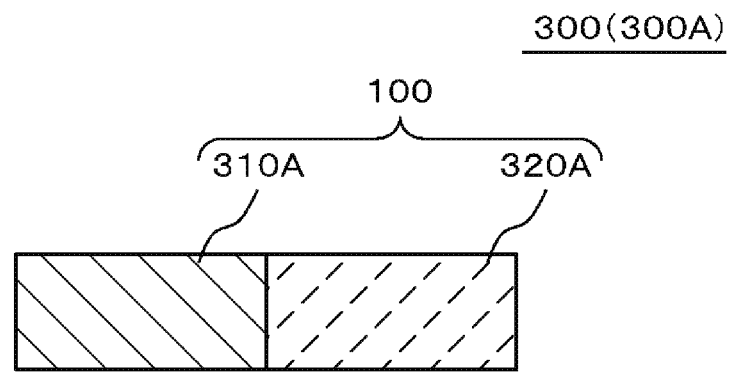
FIGS. 16A and 16B are diagrams showing an example of the details of a configuration of a first checkout machine which is used in a checkout device according to a fifth embodiment.
Figure 16B:
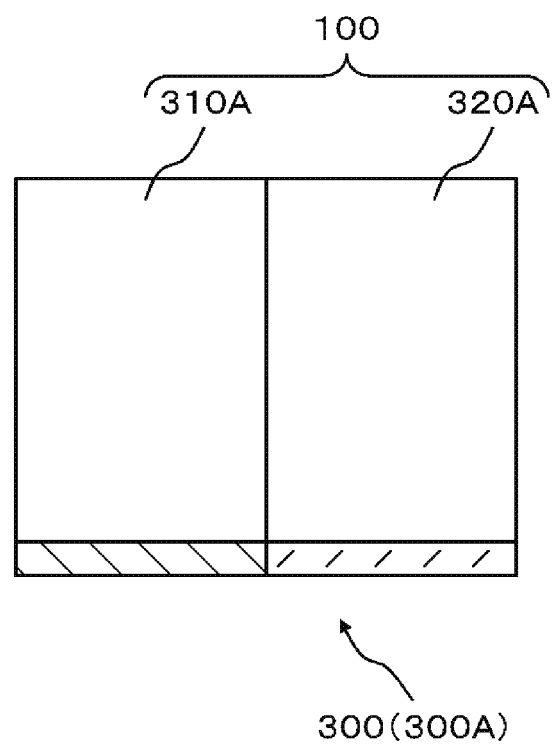

FIGS. 16A and 16B are diagrams showing an example of the details of the configuration of a first checkout machine 100 which is used in a checkout device 1000 according to a fifth embodiment. FIG. 16A is a diagram showing the first checkout machine 100 as viewed from the front of the user interface portion 300. FIG. 16B is a diagram showing the coin checkout machine 310A and the banknote checkout machine 320A as viewed from above the first checkout machine 100. The first checkout machine 100 shown in this drawing includes the coin checkout machine 310A and the coin checkout machine 310B that are adjacent to each other in the horizontal direction, similar to the first checkout machine 100 according to any one of the first to fourth embodiments. In the example shown in this drawing, the upper surface of the coin checkout machine 310A and the upper surface of the banknote checkout machine 320A are aligned with each other, and the lower surface of the coin checkout machine 310A and the lower surface of the banknote checkout machine 320A are aligned with each other.

Figure 17A:
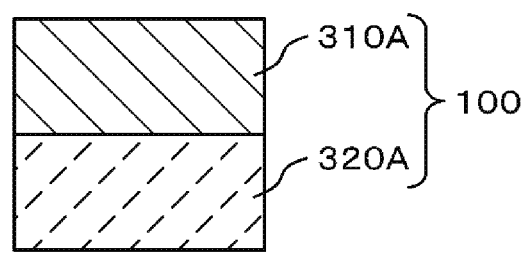
FIGS. 17A and 17B are diagrams showing a first modification example of FIGS. 16A and 16B.
Figure 17B:
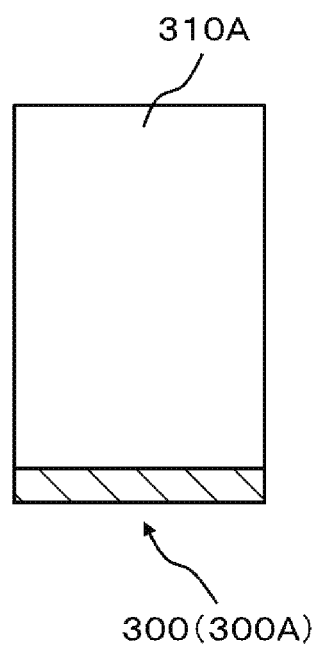

FIGS. 17A and 17B are diagrams showing a first modification example of FIGS. 16A and 16B. In the example shown in this drawing, the coin checkout machine 310A and the banknote checkout machine 320A are adjacent to each other in the direction perpendicular to the horizontal plane (that is, in the vertical direction). More specifically, in the example shown in this drawing, the coin checkout machine 310A is mounted on the upper surface of the banknote checkout machine 320A. The width of the coin checkout machine 310A and the width of the banknote checkout machine 320A are equal to each other. In the width direction of the first checkout machine 100, the center of the coin checkout machine 310A and the center of the banknote checkout machine 320A coincide with each other. In the example shown in this drawing, when viewed from the direction perpendicular to the horizontal plane (that is, in the vertical direction), the entirety of the coin checkout machine 310A overlaps the entirety of the banknote checkout machine 320A.

Figure 18A:
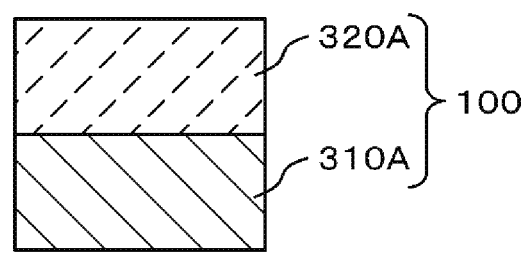
FIGS. 18A and 18B are diagrams showing a second modification example of FIGS. 16A and 16B.
Figure 18B:
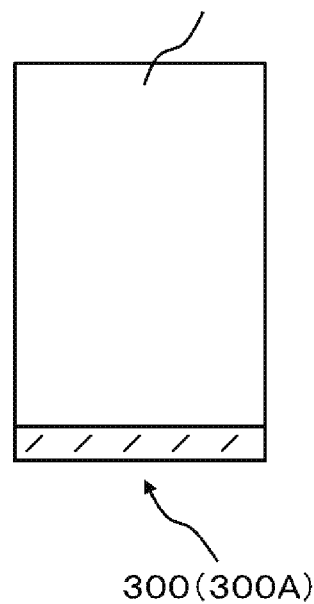

FIGS. 18A and 18B are diagrams showing a second modification example of FIGS. 16A and 16B. As shown in this drawing, the position of the coin checkout machine 310A and the position of the banknote checkout machine 320A may be opposite to those in the example shown in FIGS. 17A and 17B. Specifically, in the example shown in this drawing, the banknote checkout machine 320A is located above the coin checkout machine 310A.

Figure 19A:
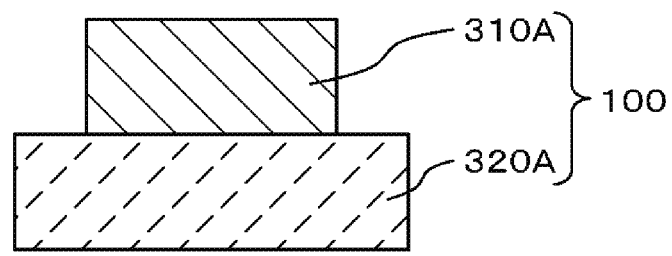
FIGS. 19A and 19B are diagrams showing a third modification example of FIGS. 16A and 16B.
Figure 19B:
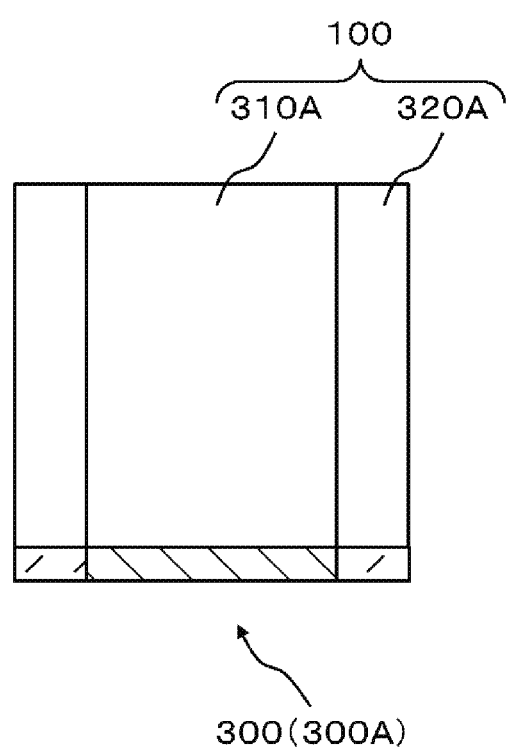

FIGS. 19A and 19B are diagrams showing a third modification example of FIGS. 16A and 16B. The example shown in this drawing is the same as the example shown in FIGS. 17A and 17B, except for the following respects. In the example shown in this drawing, the width of the banknote checkout machine 320A is wider than the width of the coin checkout machine 310A. In the width direction of the first checkout machine 100, the coin checkout machine 310A is located inwardly more than both side surfaces of the banknote checkout machine 320A. In the example shown in this drawing, when viewed from the direction perpendicular to the horizontal plane (that is, in the vertical direction), the entirety of the coin checkout machine 310A overlaps a part of the banknote checkout machine 320A.

Figure 20A:
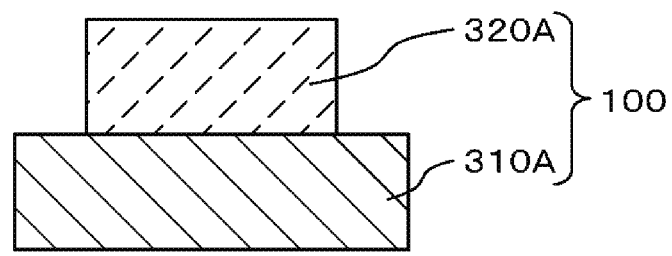
FIGS. 20A and 20B are diagrams showing a fourth modification example of FIGS. 16A and 16B.
Figure 20B:
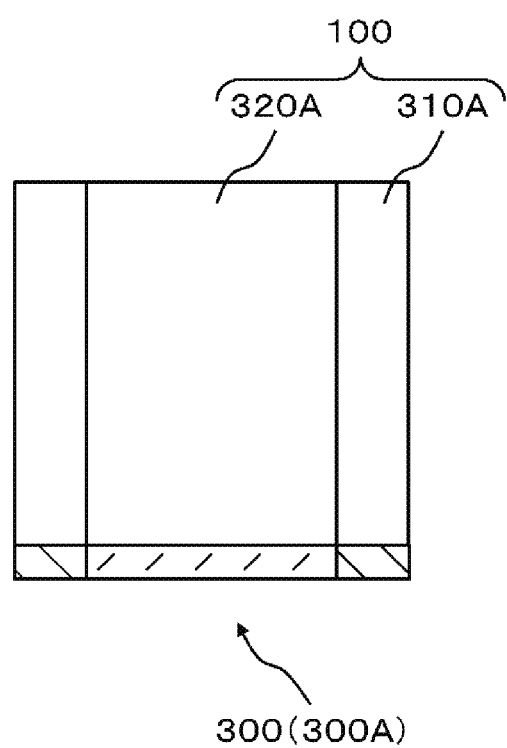

FIGS. 20A and 20B are diagrams showing a fourth modification example of FIGS. 16A and 16B. The example shown in this drawing is the same as the example shown in FIGS. 18A and 18B, except for the following respects. In the example shown in this drawing, the width of the coin checkout machine 310A is wider than the width of the banknote checkout machine 320A. In the width direction of the first checkout machine 100, the banknote checkout machine 320A is located inwardly more than both side surfaces of the coin checkout machine 310A. In the example shown in this drawing, when viewed from the direction perpendicular to the horizontal plane (that is, in the vertical direction), the entirety of the banknote checkout machine 320A overlaps a part of the coin checkout machine 310A.

Figure 21A:
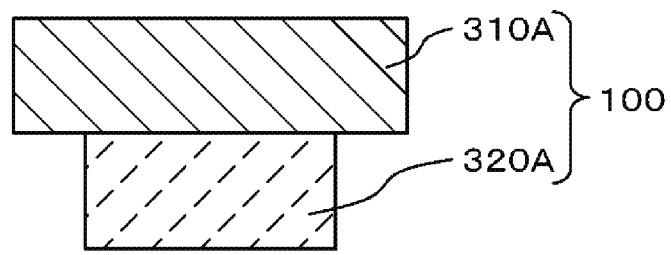
FIGS. 21A and 21B are diagrams showing a fifth modification example of FIGS. 16A and 16B.
Figure 21B:
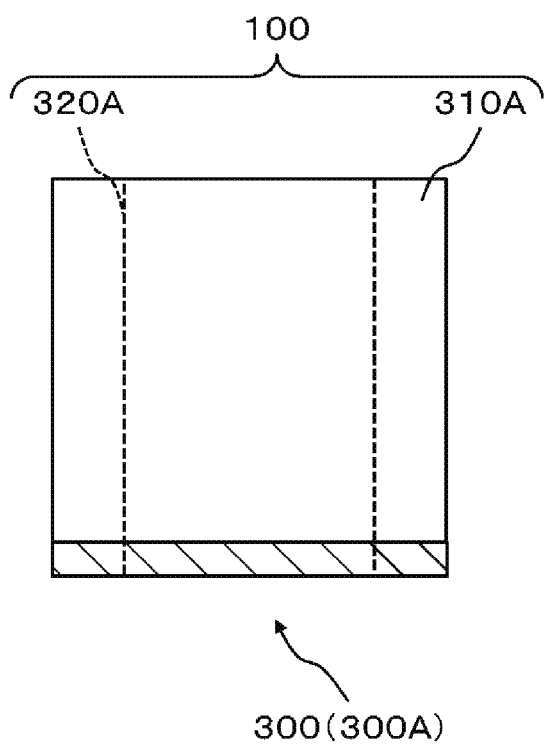

FIGS. 21A and 21B are diagrams showing a fifth modification example of FIGS. 16A and 16B. The example shown in this drawing is the same as the example shown in FIGS. 17A and 17B, except for the following respects. In the example shown in this drawing, the width of the coin checkout machine 310A is wider than the width of the banknote checkout machine 320A. In the width direction of the first checkout machine 100, the banknote checkout machine 320A is located inwardly more than both side surfaces of the coin checkout machine 310A. In the example shown in this drawing, when viewed from the direction perpendicular to the horizontal plane (that is, in the vertical direction), the entirety of the banknote checkout machine 320A overlaps a part of the coin checkout machine 310A.

Figure 22A:
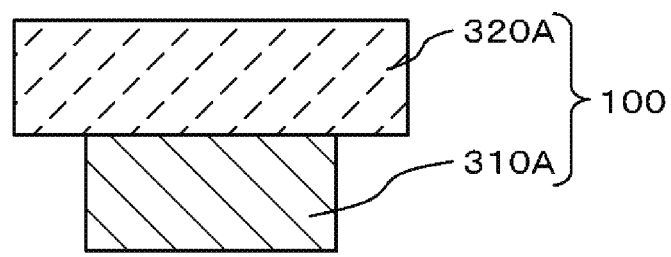
FIGS. 22A and 22B are diagrams showing a sixth modification example of FIGS. 16A and 16B.
Figure 22B:
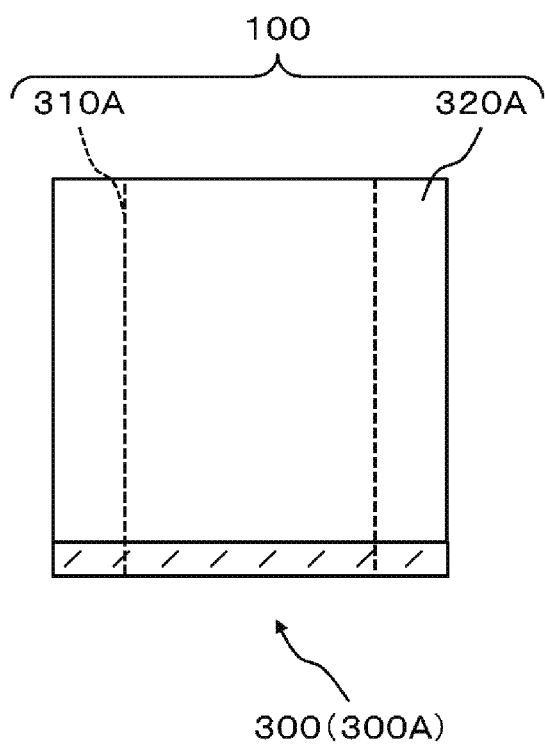

FIGS. 22A and 22B are diagrams showing a sixth modification example of FIGS. 16A and 16B. The example shown in this drawing is the same as the example shown in FIGS. 18A and 18B, except for the following respects. In the example shown in this drawing, the width of the banknote checkout machine 320A is wider than the width of the coin checkout machine 310A. In the width direction of the first checkout machine 100, the coin checkout machine 310A is located inwardly more than both side surfaces of the banknote checkout machine 320A. In the example shown in this drawing, when viewed from the direction perpendicular to the horizontal plane (that is, in the vertical direction), the entirety of the coin checkout machine 310A overlaps a part of the banknote checkout machine 320A.

Figure 23A:
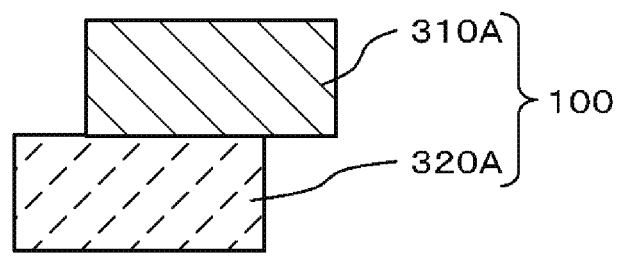
FIGS. 23A and 23B are diagrams showing a seventh modification example of FIGS. 16A and 16B.
Figure 23B:
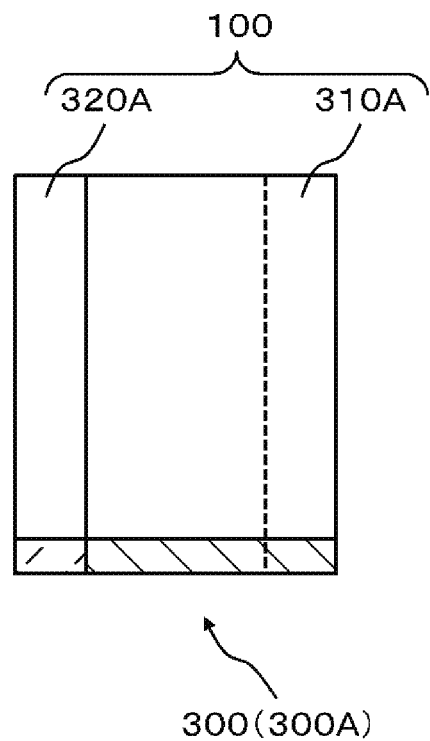

FIGS. 23A and 23B are diagrams showing a seventh modification example of FIGS. 16A and 16B. The example shown in this drawing is the same as the example shown in FIGS. 17A and 17B, except for the following respects. In the example shown in this drawing, in the width direction of the first checkout machine 100, a part of the coin checkout machine 310A is located outside the banknote checkout machine 320A. When viewed from the direction perpendicular to the horizontal plane (that is, in the vertical direction), a part of the coin checkout machine 310A overlaps a part of the banknote checkout machine 320A.

Figure 24A:
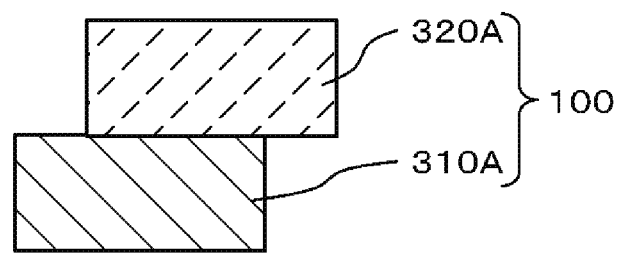
FIGS. 24A and 24B are diagrams showing an eighth modification example of FIGS. 16A and 16B.
Figure 24B:
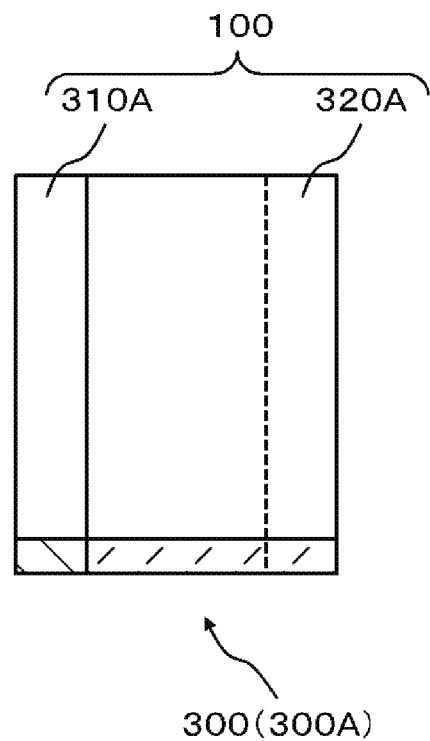

FIGS. 24A and 24B are diagrams showing an eighth modification example of FIGS. 16A and 16B. As shown in this drawing, the position of the coin checkout machine 310A and the position of the banknote checkout machine 320A may be opposite to those in the example shown in FIGS. 23A and 23B. Specifically, in the example shown in this drawing, the banknote checkout machine 320A is located above the coin checkout machine 310A.

Figure 25A:
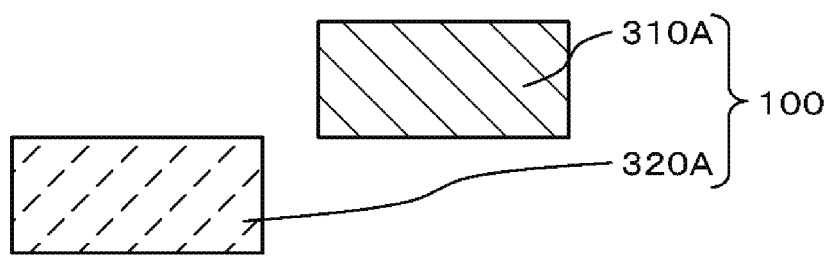
FIGS. 25A and 25B are diagrams showing a ninth modification example of FIGS. 16A and 16B.
Figure 25B:
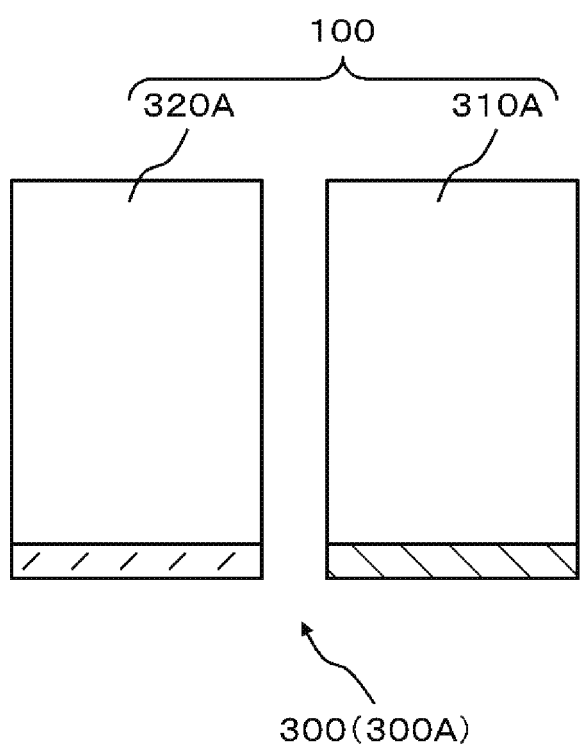

FIGS. 25A and 25B are diagrams showing a ninth modification example of FIGS. 16A and 16B. The example shown in this drawing is the same as the example shown in FIGS. 17A and 17B, except for the following respects. In the example shown in this drawing, in the width direction of the first checkout machine 100, the entirety of the coin checkout machine 310A is located outside the banknote checkout machine 320A. In other words, when viewed from the direction perpendicular to the horizontal plane, any part of the coin checkout machine 310A does not overlap the banknote checkout machine 320A. In the example shown in this drawing, the lower surface of the coin checkout machine 310A and the upper surface of the banknote checkout machine 320A are aligned with each other.

Figure 26A:
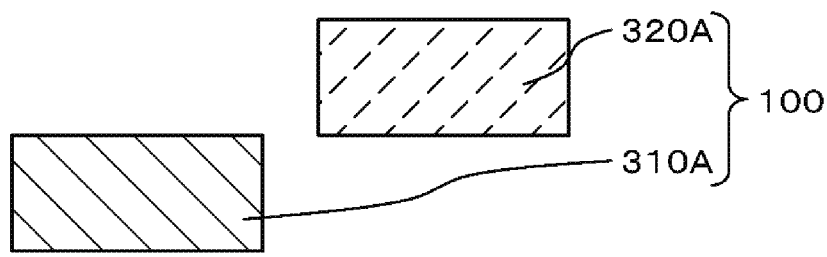
FIGS. 26A and 26B are diagrams showing a tenth modification example of FIGS. 16A and 16B.
Figure 26B:
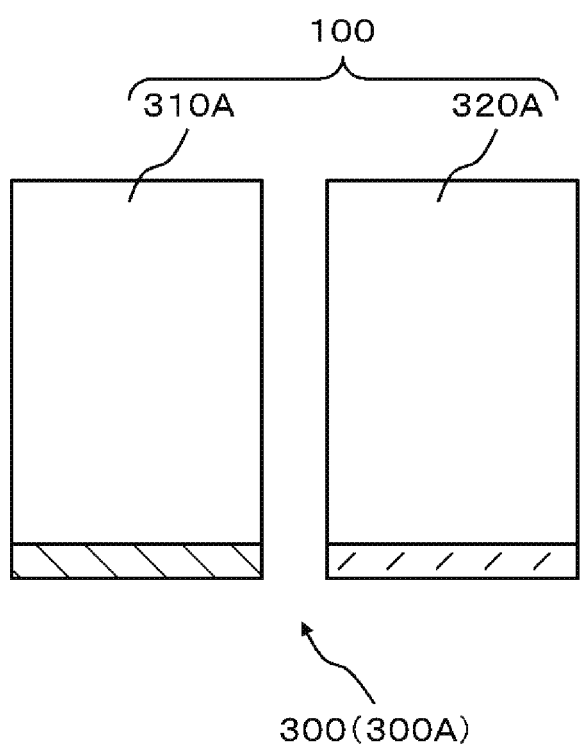

FIGS. 26A and 26B are diagrams showing a tenth modification example of FIGS. 16A and 16B. As shown in this drawing, the position of the coin checkout machine 310A and the position of the banknote checkout machine 320A may be opposite to those in the example shown in FIGS. 25A and 25B. Specifically, in the example shown in this drawing, the lower surface of the banknote checkout machine 320A and the upper surface of the coin checkout machine 310A are aligned with each other.

Figure 27A:
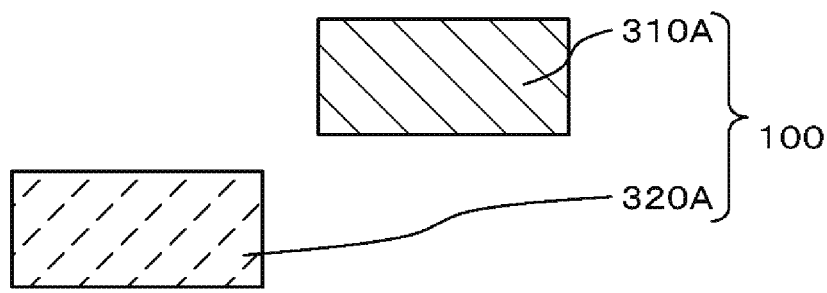
FIGS. 27A and 27B are diagrams showing an eleventh modification example of FIGS. 16A and 16B.
Figure 27B:
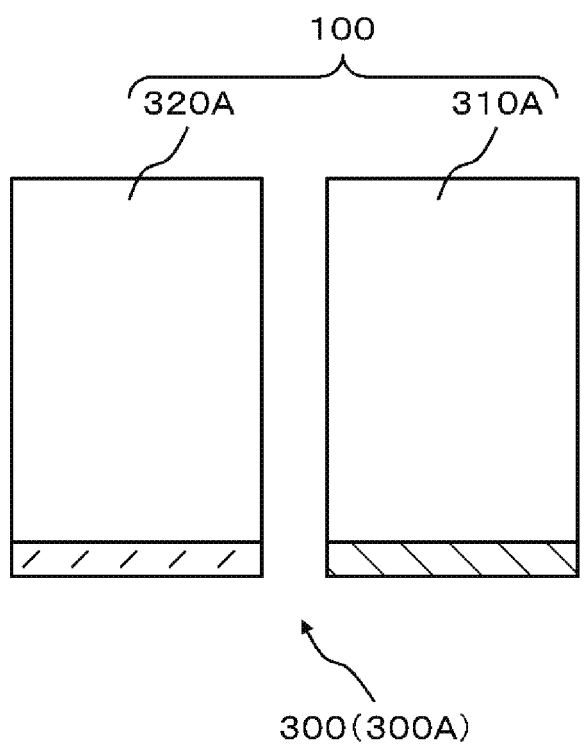

FIGS. 27A and 27B are diagrams showing an eleventh modification example of FIGS. 16A and 16B. The example shown in this drawing is the same as the example shown in FIGS. 25A and 25B, except for the following respects. In the example shown in this drawing, in the direction perpendicular to the horizontal plane, the lower surface of the coin checkout machine 310A and the upper surface of the banknote checkout machine 320A are spaced apart from each other. More specifically, in the direction perpendicular to the horizontal plane, the lower surface of the coin checkout machine 310A is located higher than the upper surface of the banknote checkout machine 320A.

Figure 28A:
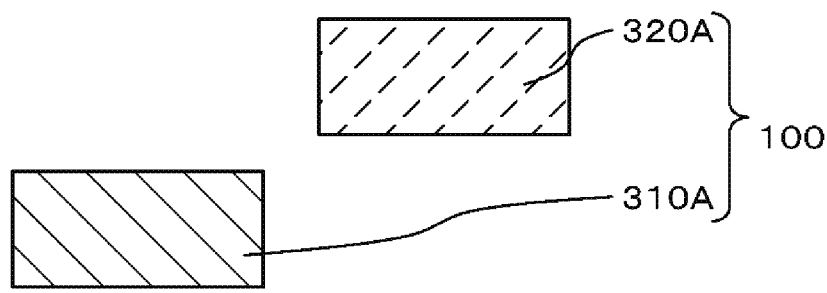
FIGS. 28A and 28B are diagrams showing a twelfth modification example of FIGS. 16A and 16B.
Figure 28B:
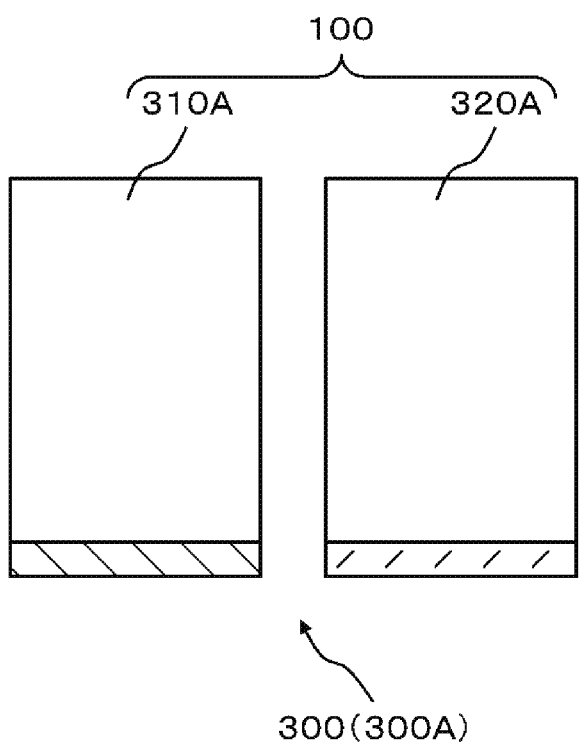

FIGS. 28A and 28B are diagrams showing a twelfth modification example of FIGS. 16A and 16B. As shown in this drawing, the position of the coin checkout machine 310A and the position of the banknote checkout machine 320A may be opposite to those in the example shown in FIGS. 27A and 27B. Specifically, in the example shown in this drawing, in the direction perpendicular to the horizontal plane, the lower surface of the banknote checkout machine 320A is located higher than the upper surface of the coin checkout machine 310A.

Figure 29A:
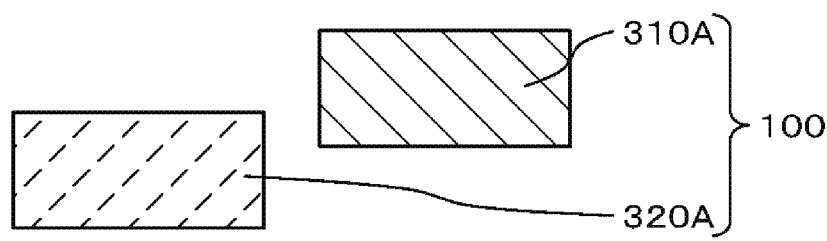
FIGS. 29A and 29B are diagrams showing a thirteenth modification example of FIGS. 16A and 16B.
Figure 29B:
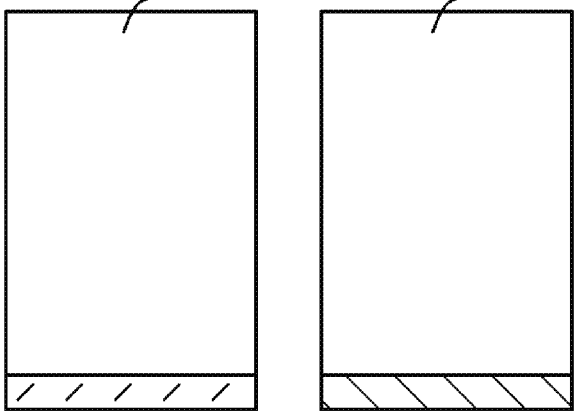

FIGS. 29A and 29B are diagrams showing a thirteenth modification example of FIGS. 16A and 16B. The example shown in this drawing is the same as the example shown in FIGS. 25A and 25B, except for the following respects. In the example shown in this drawing, in the direction perpendicular to the horizontal plane, the lower surface of the coin checkout machine 310A is located lower than the upper surface of the banknote checkout machine 320A and higher than the lower surface of the banknote checkout machine 320A.

Figure 30A:
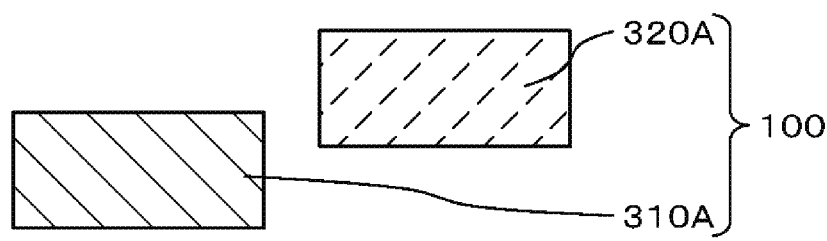
FIGS. 30A and 30B are diagrams showing a fourteenth modification example of FIGS. 16A and 16B.
Figure 30B:
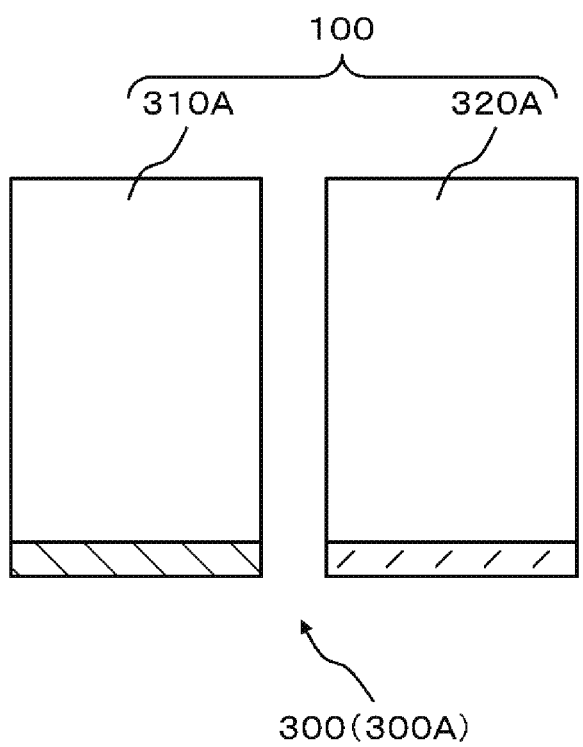

FIGS. 30A and 30B are diagrams showing a fourteenth modification example of FIGS. 16A and 16B. As shown in this drawing, the position of the coin checkout machine 310A and the position of the banknote checkout machine 320A may be opposite to those in the example shown in FIGS. 29A and 29B. Specifically, in the example shown in this drawing, in the direction perpendicular to the horizontal plane, the lower surface of the banknote checkout machine 320A is located lower than the upper surface of the coin checkout machine 310A and higher than the lower surface of the coin checkout machine 310A.

In this embodiment, also the configuration of the second checkout machine 200 may be any of the examples shown in FIGS. 16A and 16B to FIGS. 30A and 30B. The configuration of the first checkout machine 100 and the configuration of the second checkout machine 200 may be the same or may be different from each other. In a case where the configuration of the first checkout machine 100 and the configuration of the second checkout machine 200 are the same, both the configuration of the first checkout machine 100 and the configuration of the second checkout machine 200 are the example shown in FIGS. 16A and 16B, for example. On the other hand, in a case where the configuration of the first checkout machine 100 and the configuration of the second checkout machine 200 are different from each other, the configuration of the first checkout machine 100 is the example shown in FIGS. 16A and 16B, for example, and the configuration of the second checkout machine 200 is the example shown in FIGS. 30A and 30B, for example.

Sixth Embodiment

Figure 31:
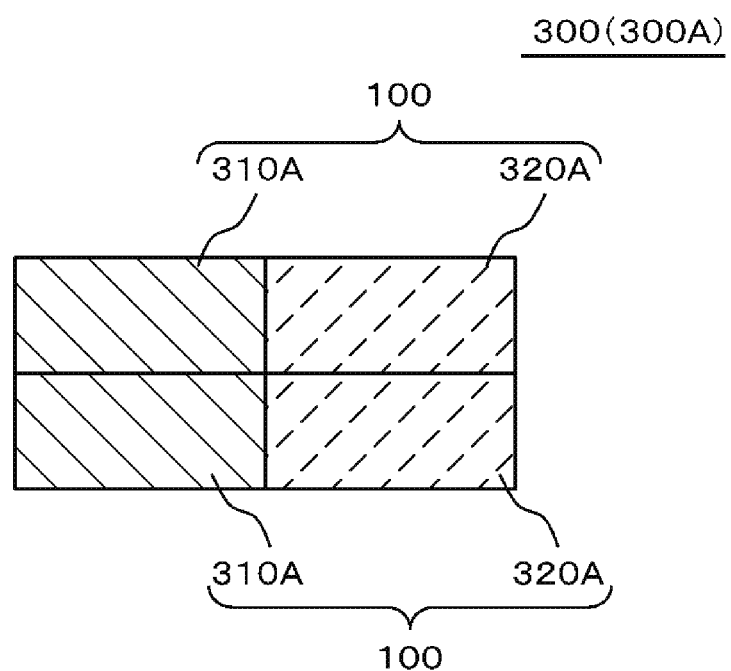
FIG. 31 is a diagram showing a first example of a configuration of a first checkout machine which is used in a checkout device according to a sixth embodiment.

FIG. 31 is a diagram showing a first example of the configuration of a first checkout machine 100 which is used in a checkout device 1000 according to a sixth embodiment. This drawing is a diagram showing the first checkout machine 100 as viewed from the front of the user interface portion 300. The first checkout machine 100 shown in this drawing has the same configuration as the first checkout machine 100 according to any one of the first to fifth embodiments except for the following respects.

In the example shown in this drawing, one of the first checkout machines 100 is stacked on the other of the first checkout machines 100. Each of the first checkout machines 100 is the first checkout machine 100 shown in FIGS. 16A and 16B, for example. In the example shown in this drawing, in any of the first checkout machines 100, the coin checkout machine 310A is located on the same side (specifically, on the left side when viewed from the front of the user interface portion 300) with respect to the banknote checkout machine 320A.

Figure 32:
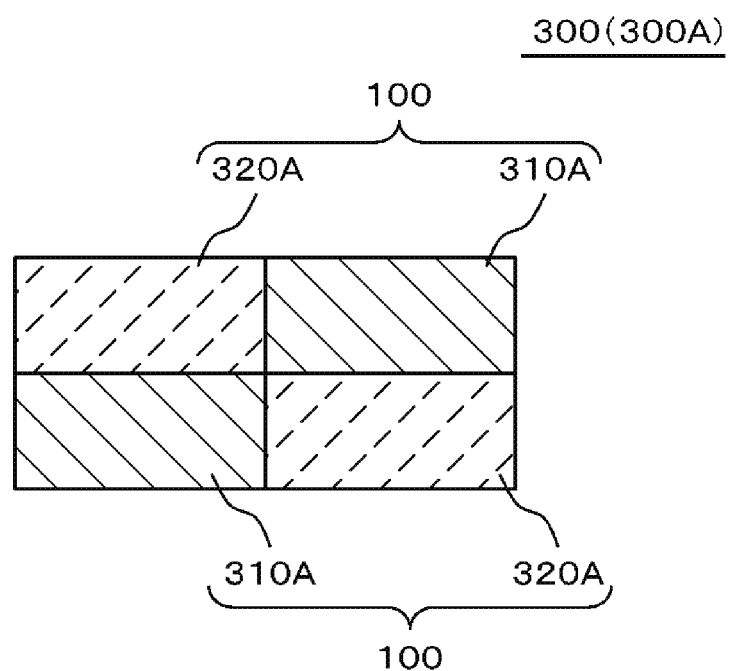
FIG. 32 is a diagram showing a second example of the configuration of the first checkout machine.

FIG. 32 is a diagram showing a second example of the configuration of the first checkout machine 100. The example shown in this drawing is the same as the example shown in FIG. 31, except for the following respects. Also in the example shown in this drawing, one of the first checkout machines 100 is stacked on the other of the first checkout machines 100. In the example shown in this drawing, when viewed from the front of the user interface portion 300, in one of the first checkout machines 100, the coin checkout machine 310A is located on the left side of the banknote checkout machine 320A, and in the other of the first checkout machines 100, the coin checkout machine 310A is located on the right side of the banknote checkout machine 320A.

Figure 33:
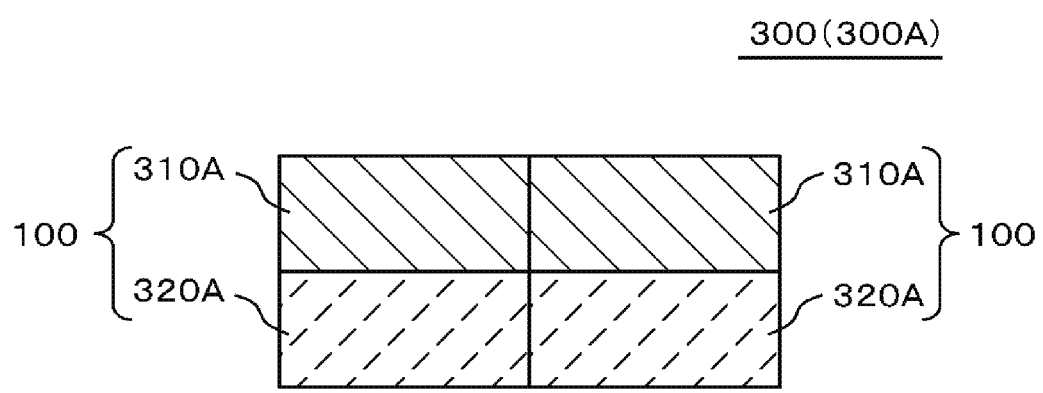
FIG. 33 is a diagram showing a third example of the configuration of the first checkout machine.

FIG. 33 is a diagram showing a third example of the configuration of the first checkout machine 100. The example shown in this drawing is the same as the example shown in FIG. 31, except for the following respects. In the example shown in this drawing, two first checkout machines 100 are adjacent to each other in the horizontal direction. In the example shown in this drawing, in any of the first checkout machines 100, the coin checkout machine 310A is located on the upper side of the banknote checkout machine 320A. Each of the first checkout machines 100 is the first checkout machine 100 shown in FIGS. 17A and 17B, for example.

Figure 34:
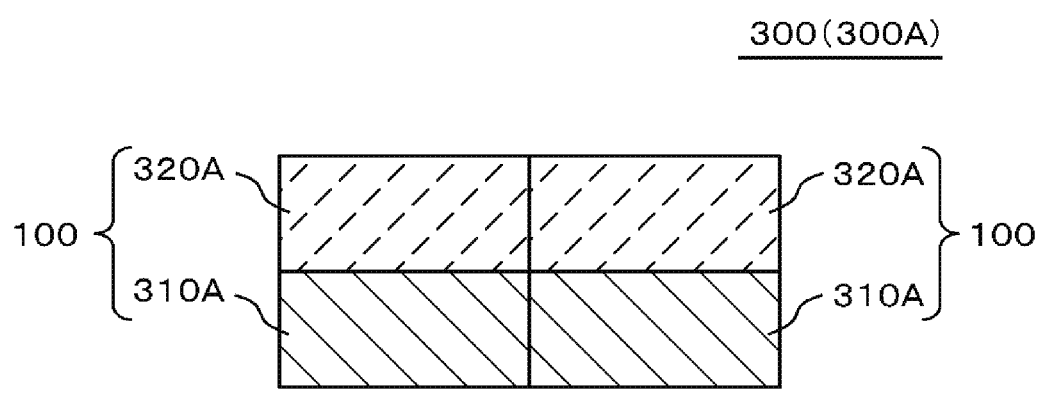
FIG. 34 is a diagram showing a fourth example of the configuration of the first checkout machine.

FIG. 34 is a diagram showing a fourth example of the configuration of the first checkout machine 100. The example shown in this drawing is the same as the example shown in FIG. 31, except for the following respects. In the example shown in this drawing, two first checkout machines 100 are adjacent to each other in the horizontal direction. In the example shown in this drawing, in any of the first checkout machines 100, the coin checkout machine 310A is located on the lower side of the banknote checkout machine 320A. Each of the first checkout machines 100 is the first checkout machine 100 shown in FIGS. 17A and 17B, for example.

Figure 35:
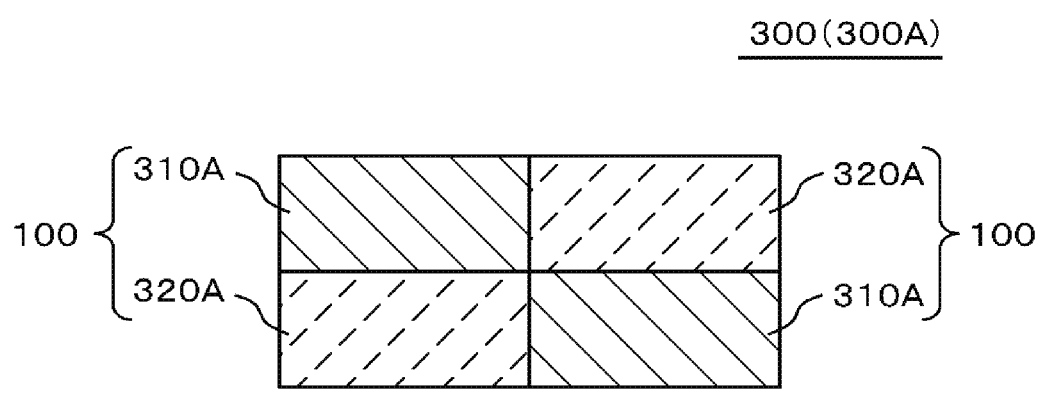
FIG. 35 is a diagram showing a fifth example of the configuration of the first checkout machine.

FIG. 35 is a diagram showing a fifth example of the configuration of the first checkout machine 100. The example shown in this drawing is the same as the example shown in FIG. 31, except for the following respects. In the example shown in this drawing, two first checkout machines 100 are adjacent to each other in the horizontal direction. In the example shown in this drawing, in one of the first checkout machines 100, the coin checkout machine 310A is mounted on the upper surface of the banknote checkout machine 320A, and in the other of the first checkout machines 100, the banknote checkout machine 320A is mounted on the upper surface of the coin checkout machine 310A.

Figure 36:
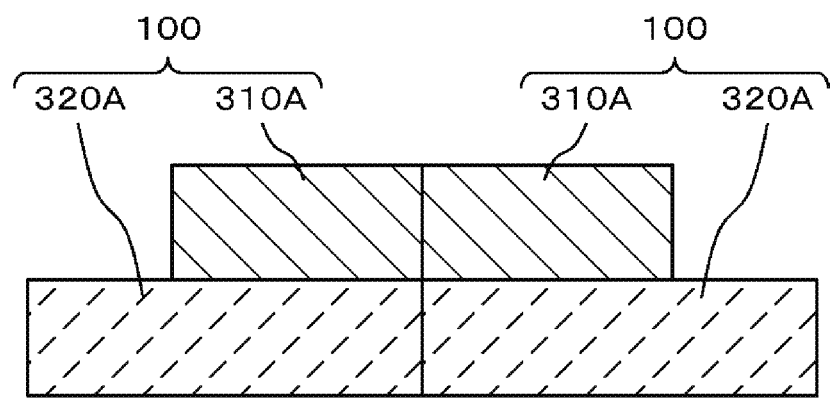
FIG. 36 is a diagram showing a sixth example of the configuration of the first checkout machine.

FIG. 36 is a diagram showing a sixth example of the configuration of the first checkout machine 100. The example shown in this drawing is the same as the example shown in FIG. 31, except for the following respects. In the example shown in this drawing, two first checkout machines 100 are adjacent to each other in the horizontal direction. In any of the first checkout machines 100, the width of the coin checkout machine 310A is narrower than the width of the banknote checkout machine 320A.

One of the side surfaces of the coin checkout machine 310A is aligned with one of the side surfaces of the banknote checkout machine 320A. The two first checkout machines 100 are arranged such that these side surfaces face each other.

Figure 37:
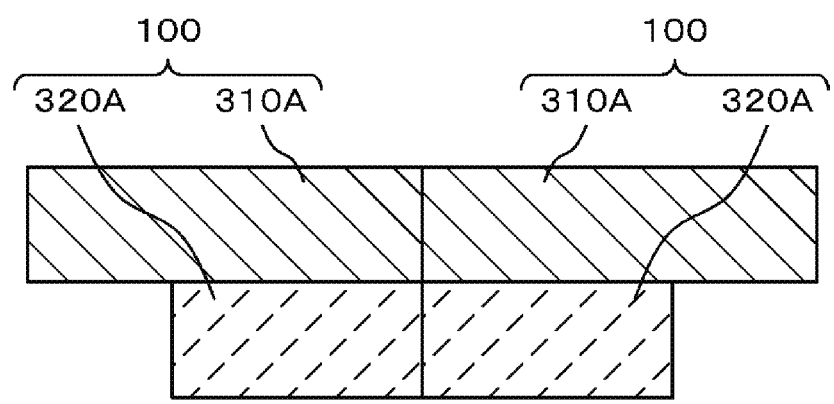
FIG. 37 is a diagram showing a seventh example of the configuration of the first checkout machine.

FIG. 37 is a diagram showing a seventh example of the configuration of the first checkout machine 100. The example shown in this drawing is the same as the example shown in FIG. 31, except for the following respects. In the example shown in this drawing, two first checkout machines 100 are adjacent to each other in the horizontal direction. In any of the first checkout machines 100, the width of the coin checkout machine 310A is wider than the width of the banknote checkout machine 320A.

One of the side surfaces of the coin checkout machine 310A is aligned with one of the side surfaces of the banknote checkout machine 320A. The two first checkout machines 100 are arranged such that these side surfaces face each other.

Figure 38:
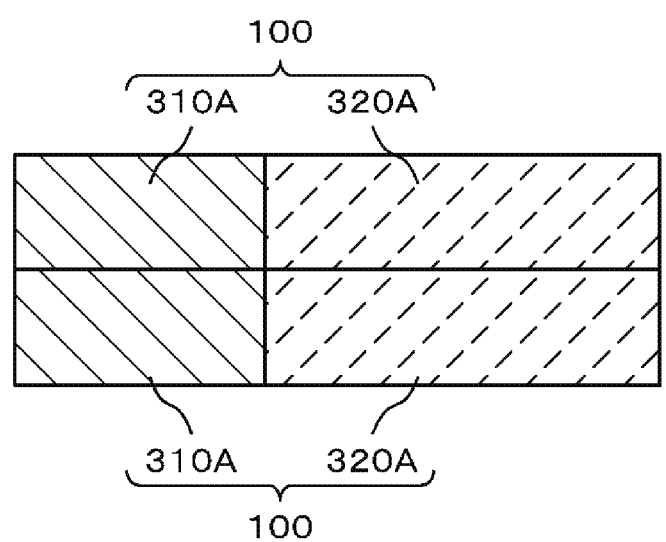
FIG. 38 is a diagram showing an eighth example of the configuration of the first checkout machine.

FIG. 38 is a diagram showing an eighth example of the configuration of the first checkout machine 100. The example shown in this drawing is the same as the example shown in FIG. 31, except for the following respects. In the example shown in this drawing, one of the first checkout machines 100 is stacked on the other of the first checkout machines 100. In any of the first checkout machines 100, the width of the coin checkout machine 310A is narrower than the width of the banknote checkout machine 320A.

Figure 39:
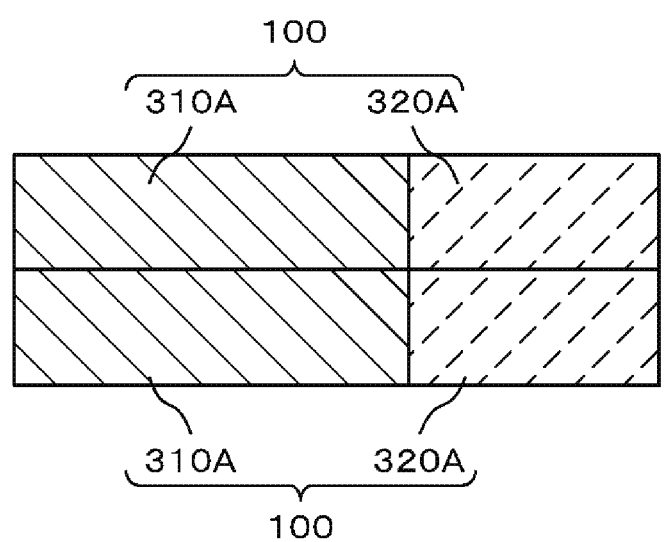
FIG. 39 is a diagram showing a ninth example of the configuration of the first checkout machine.

FIG. 39 is a diagram showing a ninth example of the configuration of the first checkout machine 100. The example shown in this drawing is the same as the example shown in FIG. 31, except for the following respects. In the example shown in this drawing, one of the first checkout machines 100 is stacked on the other of the first checkout machines 100. In any of the first checkout machines 100, the width of the coin checkout machine 310A is wider than the width of the banknote checkout machine 320A.

Figure 40:
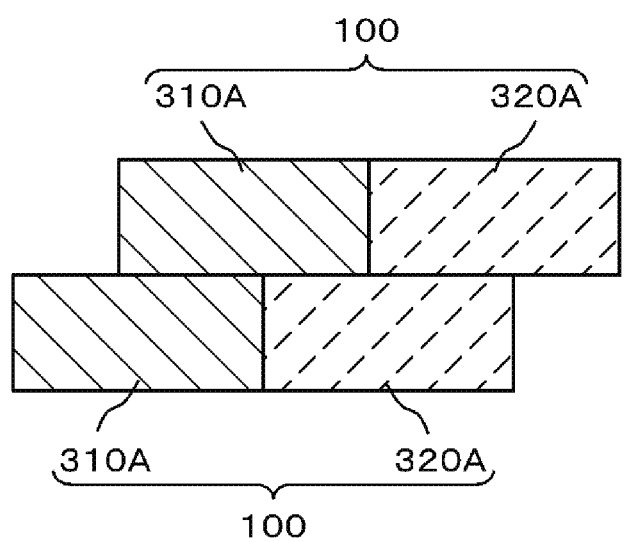
FIG. 40 is a diagram showing a tenth example of the configuration of the first checkout machine.

FIG. 40 is a diagram showing a tenth example of the configuration of the first checkout machine 100. The example shown in this drawing is the same as the example shown in FIG. 31, except for the following respects. In the example shown in this drawing, one of the first checkout machines 100 is stacked on the other of the first checkout machines 100. The center of one of the first checkout machines 100 is offset from the center of the other of the first checkout machines 100.

Figure 41:
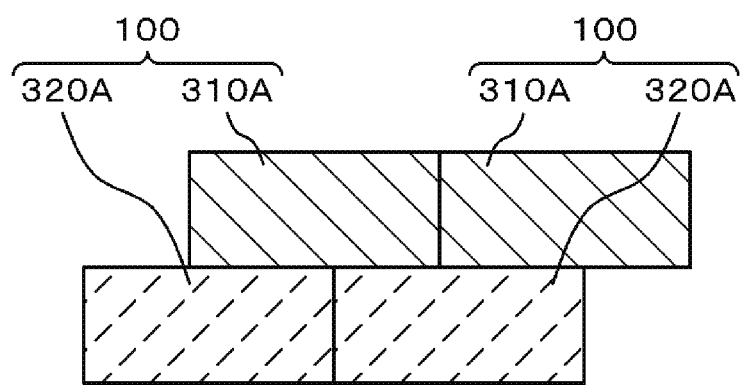
FIG. 41 is a diagram showing an eleventh example of the configuration of the first checkout machine.

FIG. 41 is a diagram showing an eleventh example of the configuration of the first checkout machine 100. The example shown in this drawing is the same as the example shown in FIG. 31, except for the following respects. In the example shown in this drawing, in any of the first checkout machines 100, the center of the coin checkout machine 310A is offset in the same direction from the center of the banknote checkout machine 320A. In the example shown in this drawing, these first checkout machines 100 are adjacent to each other in the horizontal direction. Each of the first checkout machines 100 is the first checkout machine 100 shown in FIGS. 23A and 23B, for example.

Figure 42:
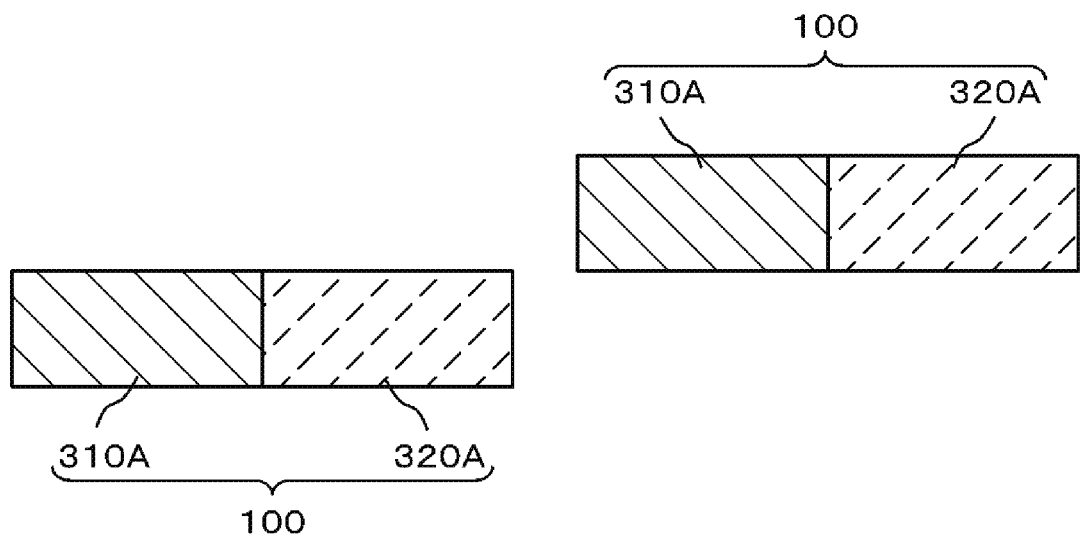
FIG. 42 is a diagram showing a twelfth example of the configuration of the first checkout machine.

FIG. 42 is a diagram showing a twelfth example of the configuration of the first checkout machine 100. The example shown in this drawing is the same as the example shown in FIG. 31, except for the following respects. In the example shown in this drawing, the entirety of one of the first checkout machines 100 is located outside the other of the first checkout machines 100. In the direction perpendicular to the horizontal plane, the lower surface of one of the first checkout machines 100 may be located equal to or lower than the upper surface of the other of the first checkout machines 100 and equal to or higher than the lower surface of the other of the first checkout machines 100, or may be located higher than the upper surface of the other of the first checkout machines 100.

Figure 43:
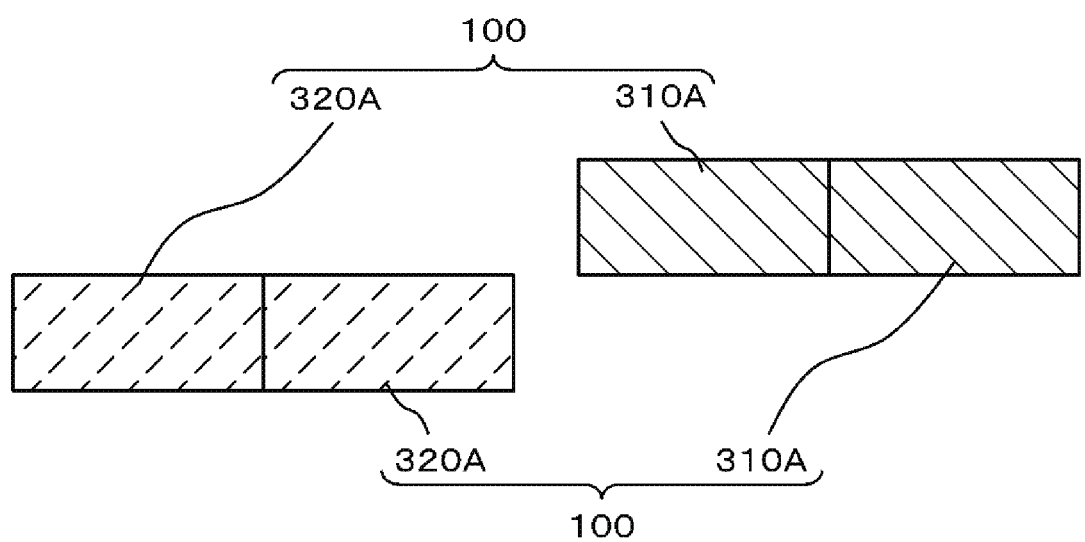
FIG. 43 is a diagram showing a thirteenth example of the configuration of the first checkout machine.

FIG. 43 is a diagram showing a thirteenth example of the configuration of the first checkout machine 100. The example shown in this drawing is the same as the example shown in FIG. 31, except for the following respects. In the example shown in this drawing, in the one of the first checkout machines 100, the entirety of the coin checkout machine 310A is disposed outside the banknote checkout machine 320A. Similarly, also in the other of the first checkout machines 100, the entirety of the coin checkout machine 310A is disposed outside the banknote checkout machine 320A. The banknote checkout machine 320A of one of the first checkout machines 100, the banknote checkout machine 320A of the other of the first checkout machines 100, the coin checkout machine 310A of one of the first checkout machines 100, and the banknote checkout machine 320A of the other of the first checkout machines 100 are arranged in this order.

In this embodiment, also the configuration of the second checkout machine 200 may be any of the examples shown in FIGS. 31 to 43. The configuration of the first checkout machine 100 and the configuration of the second checkout machine 200 may be the same or may be different from each other. In a case where the configuration of the first checkout machine 100 and the configuration of the second checkout machine 200 are the same, both the configuration of the first checkout machine 100 and the configuration of the second checkout machine 200 are the example shown in FIG. 31, for example. On the other hand, in a case where the configuration of the first checkout machine 100 and the configuration of the second checkout machine 200 are different from each other, the configuration of the first checkout machine 100 is the example shown in FIG. 31, for example, and the configuration of the second checkout machine 200 is the example shown in FIG. 43, for example.

Seventh Embodiment

Figure 44:
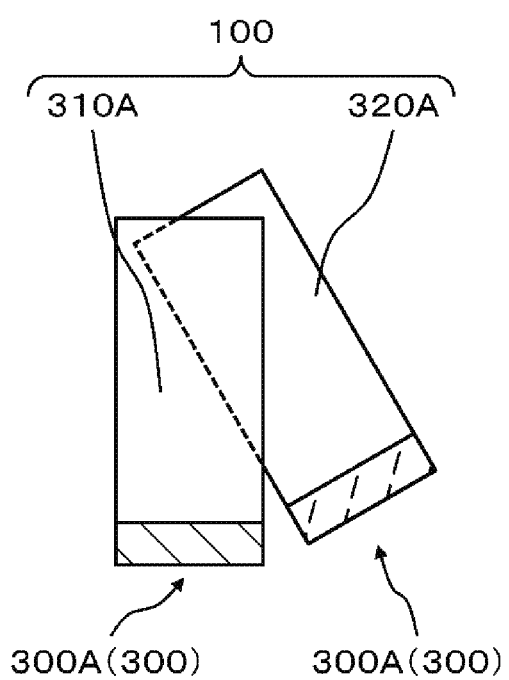
FIG. 44 is a diagram showing an example of the details of a configuration of a first checkout machine which is used in a checkout device according to a seventh embodiment.

FIG. 44 is a diagram showing an example of the details of a configuration of a first checkout machine 100 which is used in a checkout device 1000 according to a seventh embodiment. This drawing is a diagram showing the coin checkout machine 310A and the banknote checkout machine 320A as viewed above the first checkout machine 100. As shown in this drawing, the coin checkout machine 310A and the banknote checkout machine 320A may face in different directions. The difference between the direction in which the coin checkout machine 310A faces and the direction in which the banknote checkout machine 320A faces is not limited to the example shown in this drawing and may be, for example, 30° or more and 150° or less (more specifically, for example, 90°) or may be 180°.

Eighth Embodiment

Figure 45:
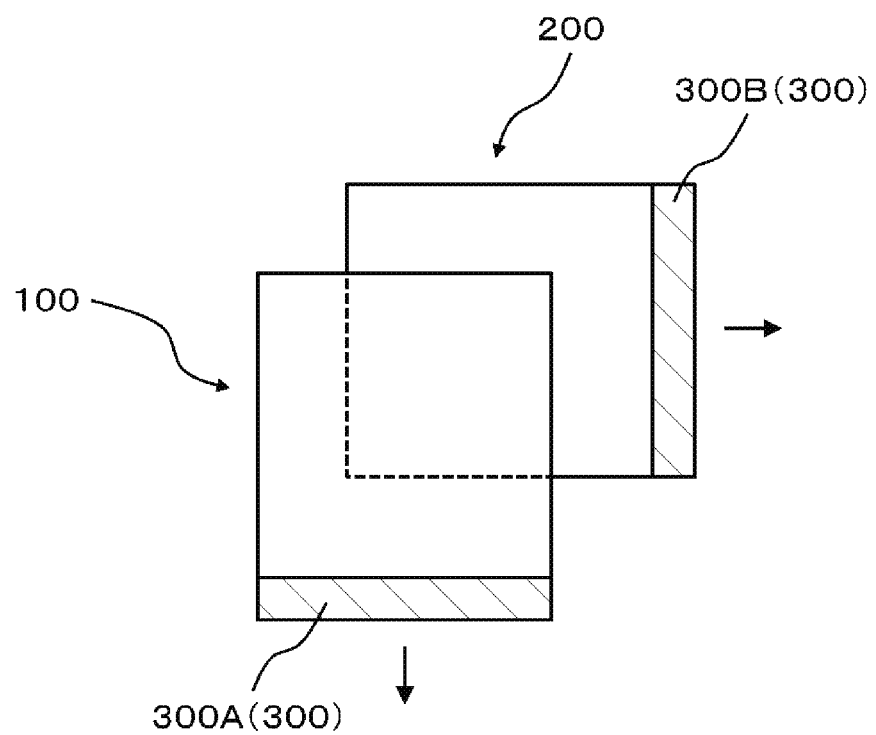
FIG. 45 is a diagram showing an example of the disposition of a first checkout machine and a second checkout machine which are used in a checkout device according to an eighth embodiment.

FIG. 45 is a diagram showing an example of the disposition of a first checkout machine 100 and a second checkout machine 200 which are used in a checkout device 1000 according to an eighth embodiment. This drawing is a diagram showing the first checkout machine 100 and the second checkout machine 200 as viewed from above the checkout device 1000. In the example shown in this drawing, in a similar way as in the first embodiment, the difference between the direction in which the first checkout machine 100 faces and the direction in which the second checkout machine 200 faces is 90°.

In the example shown in this drawing, when viewed from the direction perpendicular to the horizontal plane, the coin receiving opening 311 (the first coin receiving opening) (FIG. 1) of the first checkout machine 100 and the coin receiving opening 311 (FIG. 1) (the second coin receiving opening) of the second checkout machine 200 are arranged offset from each other. The banknote receiving and dispensing opening 321 (the first banknote receiving opening) (FIG. 1) of the first checkout machine 100 and the banknote receiving and dispensing opening 321 (FIG. 1) (the second banknote receiving opening) of the second checkout machine 200 are arranged offset from each other. Both a coin and a banknote may be able to be inserted into the coin receiving opening 311. Similarly, both a coin and a banknote may be able to be inserted into the banknote receiving and dispensing opening 321.

Figure 46:
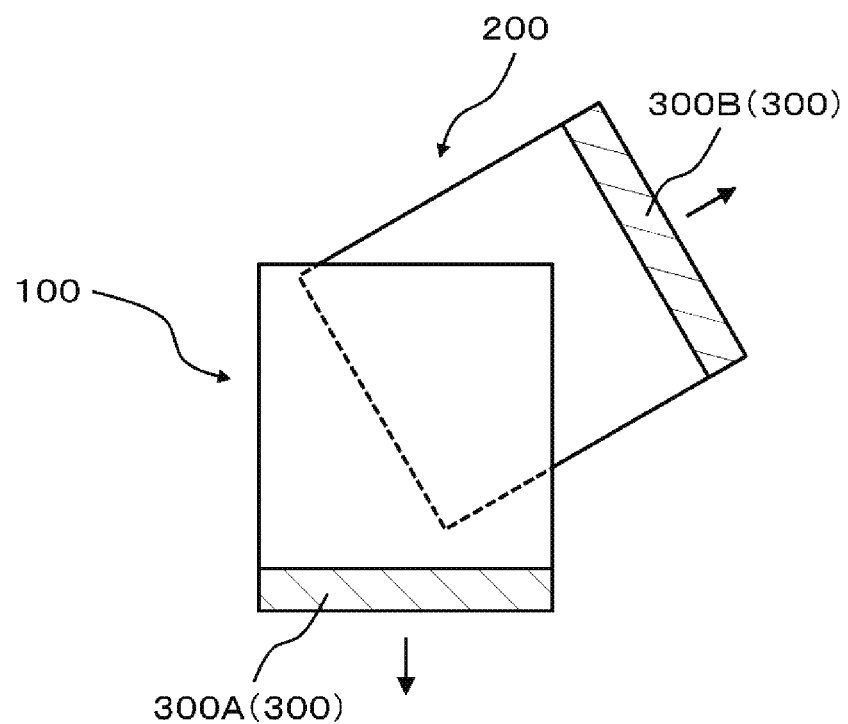
FIG. 46 is a diagram showing a first modification example of FIG. 45.

FIG. 46 is a diagram showing a first modification example of FIG. 45. As shown in this drawing, the difference between the direction in which the first checkout machine 100 faces and the direction in which the second checkout machine 200 faces may be 120°. Also in the example shown in this drawing, when viewed from the direction perpendicular to the horizontal plane, the coin receiving opening 311 (the first coin receiving opening) (FIG. 1) of the first checkout machine 100 and the coin receiving opening 311 (FIG. 1) (the second coin receiving opening) of the second checkout machine 200 are arranged offset from each other. The banknote receiving and dispensing opening 321 (the first banknote receiving opening) (FIG. 1) of the first checkout machine 100 and the banknote receiving and dispensing opening 321 (FIG. 1) (the second banknote receiving opening) of the second checkout machine 200 are arranged offset from each other.

Figure 47:
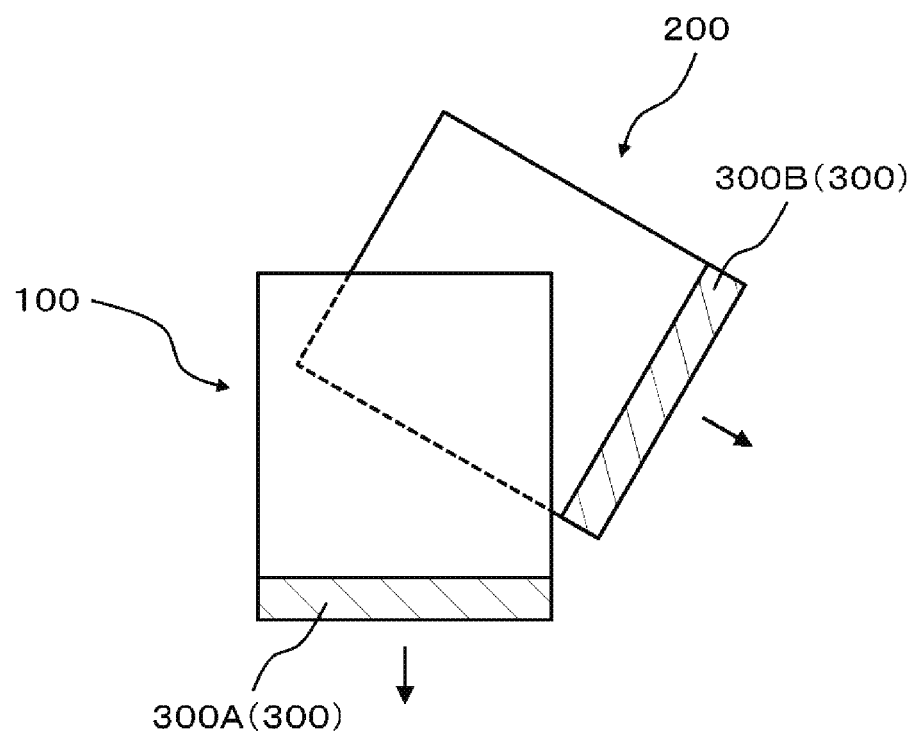
FIG. 47 is a diagram showing a second modification example of FIG. 45.

FIG. 47 is a diagram showing a second modification example of FIG. 45. As shown in this drawing, the difference between the direction in which the first checkout machine 100 faces and the direction in which the second checkout machine 200 faces may be 60°. Also in the example shown in this drawing, when viewed from the direction perpendicular to the horizontal plane, the coin receiving opening 311 (the first coin receiving opening) (FIG. 1) of the first checkout machine 100 and the coin receiving opening 311 (FIG. 1) (the second coin receiving opening) of the second checkout machine 200 are arranged offset from each other. The banknote receiving and dispensing opening 321 (the first banknote receiving opening) (FIG. 1) of the first checkout machine 100 and the banknote receiving and dispensing opening 321 (FIG. 1) (the second banknote receiving opening) of the second checkout machine 200 are arranged offset from each other.

The difference between the direction in which the first checkout machine 100 faces and the direction in which the second checkout machine 200 faces is not limited to the examples shown in FIGS. 45 to 47. For example, the difference between the direction in which the first checkout machine 100 faces and the direction in which the second checkout machine 200 faces may be 30° or more and 150° or less. The first checkout machine 100 and the second checkout machine 200 may face opposite sides to each other.

Ninth Embodiment

Figure 48:
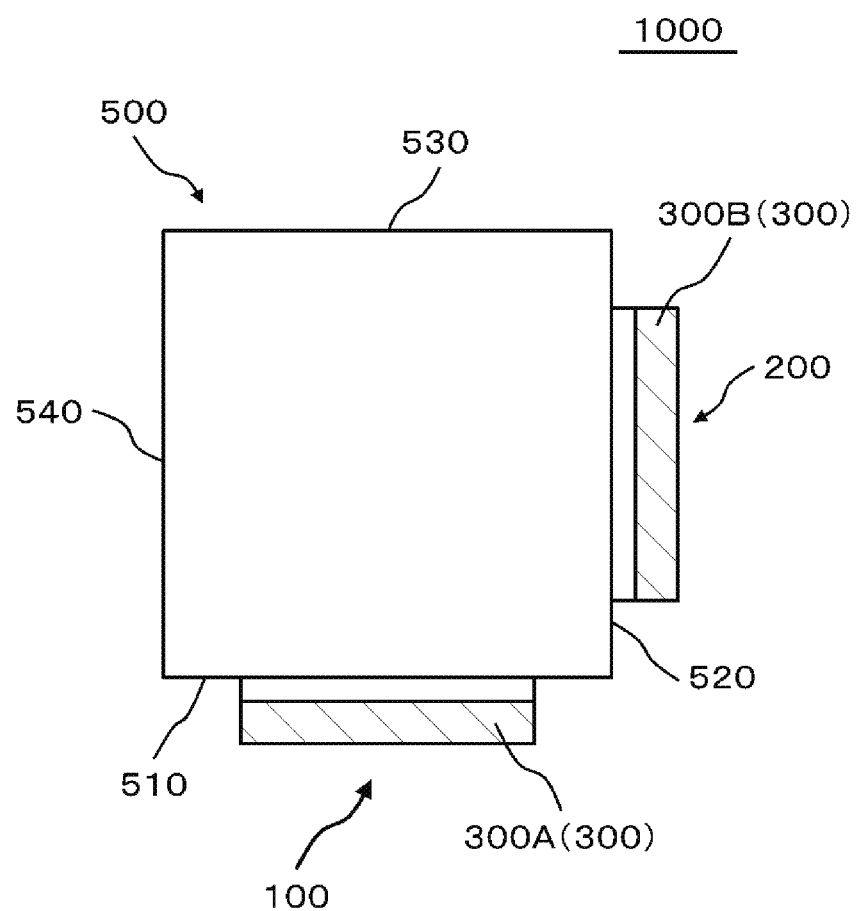
FIG. 48 is a diagram showing a configuration of a checkout device according to a ninth embodiment.

FIG. 48 is a diagram showing the configuration of a checkout device 1000 according to a ninth embodiment. This drawing is a diagram showing the base 500 as viewed above the checkout device 1000. In the example shown in this drawing, in a similar way as in the first embodiment, the base 500 has the first side surface 510, the second side surface 520, the third side surface 530, and the fourth side surface 540. More specifically, when viewed from the direction perpendicular to the horizontal plane (that is, in the vertical direction), the shape of the base 500 is a quadrangle. The first side surface 510, the second side surface 520, the third side surface 530, and the fourth side surface 540 are arranged in this order in the circumferential direction of the base 500. The first checkout machine 100 is provided on the first side surface 510, and the second checkout machine 200 is provided on the second side surface 520.

Figure 49:
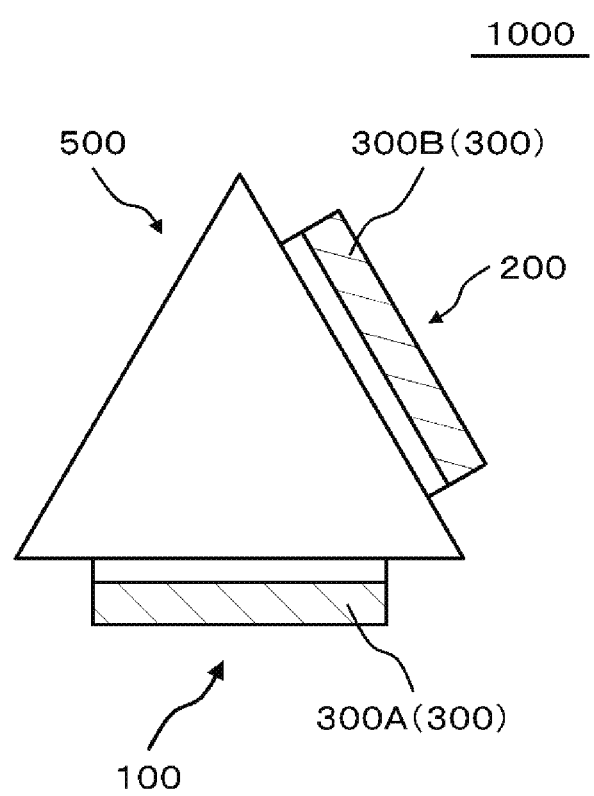
FIG. 49 is a diagram showing a first modification example of FIG. 48.

FIG. 49 is a diagram showing a first modification example of FIG. 48. In the example shown in this drawing, the base 500 has three side surfaces which face in different directions. More specifically, when viewed from the direction perpendicular to the horizontal plane (that is, in the vertical direction), the shape of the base 500 is a triangle. In the example shown in this drawing, the first checkout machine 100 is provided on one of the side surfaces, and the second checkout machine 200 is provided on another of the side surfaces.

Figure 50:
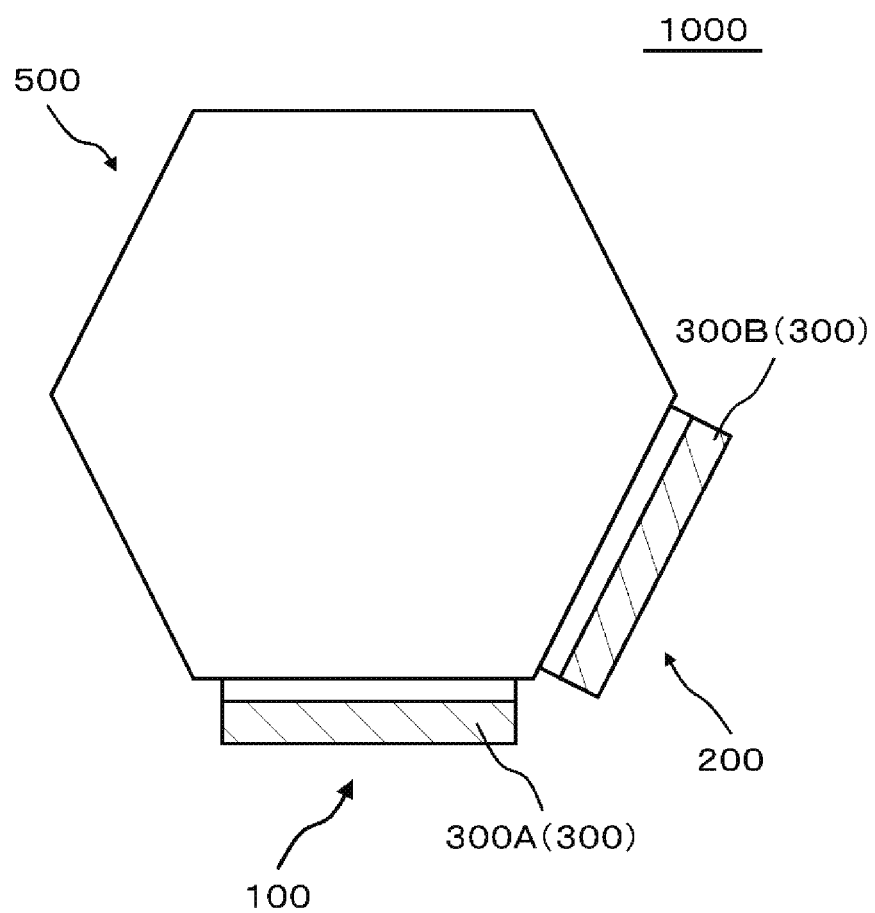
FIG. 50 is a diagram showing a second modification example of FIG. 48.

FIG. 50 is a diagram showing a second modification example of FIG. 48. In the example shown in this drawing, the base 500 has six side surfaces which face in different directions. More specifically, when viewed from the direction perpendicular to the horizontal plane (that is, in the vertical direction), the shape of the base 500 is a hexagon. In the example shown in this drawing, the first checkout machine 100 is provided on one of the side surfaces, and the second checkout machine 200 is provided on another of the side surfaces which is located next to the one of the side surfaces.

Figure 51:
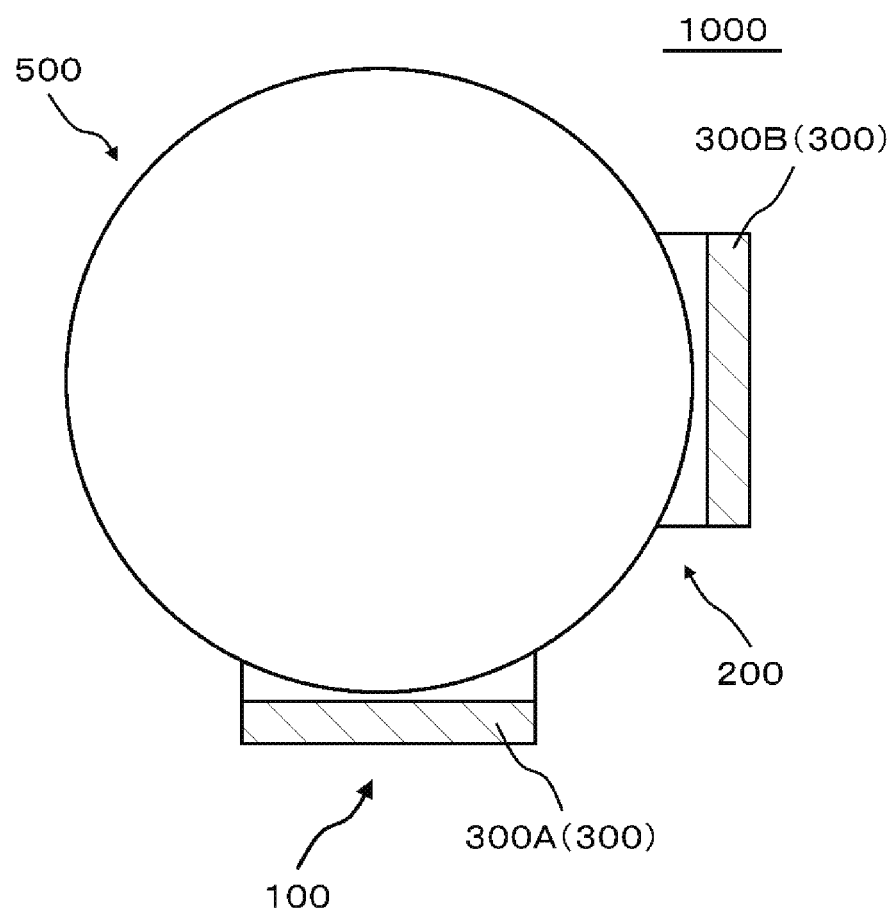
FIG. 51 is a diagram showing a third modification example of FIG. 48.

FIG. 51 is a diagram showing a third modification example of FIG. 48. In the example shown in this drawing, the base 500 has an outwardly-protruding curved side surface. More specifically, when viewed from the direction perpendicular to the horizontal plane (that is, in the vertical direction), the shape of the base 500 is a circle. In the example shown in this drawing, the first checkout machine 100 and the second checkout machine 200 are provided on the side surface of the base 500 such that the first checkout machine 100 and the second checkout machine 200 face in different directions.

Tenth Embodiment

Figure 52:
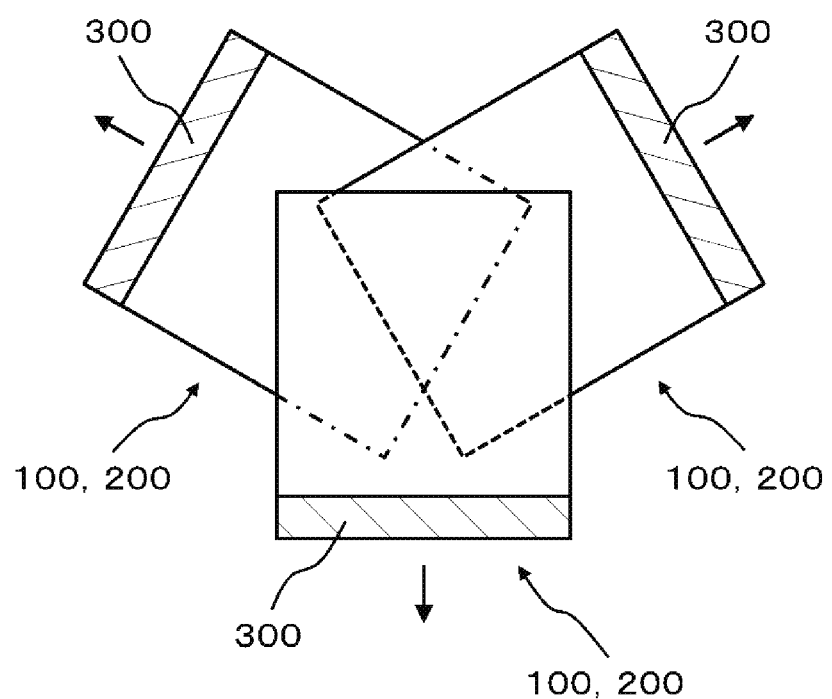
FIG. 52 is a diagram showing an example of a layout of a plurality of first checkout machines (second checkout machines) which are used in a checkout device according to a tenth embodiment.

FIG. 52 is a diagram showing an example of a layout of a plurality of first checkout machines 100 (second checkout machines 200) which are used in a checkout device 1000 according to a tenth embodiment. This drawing is a diagram showing the first checkout machines 100 (the second checkout machines 200) as viewed from above the checkout device 1000. As shown in this drawing, the checkout device 1000 may have three first checkout machines 100 (second checkout machines 200) which face in different directions. In the example shown in this drawing, three user interface portions 300 are disposed at equal intervals in the circle-circumferential direction. The checkout device 1000 may have four or more first checkout machines 100 (second checkout machines 200).

Eleventh Embodiment

Figure 53A:
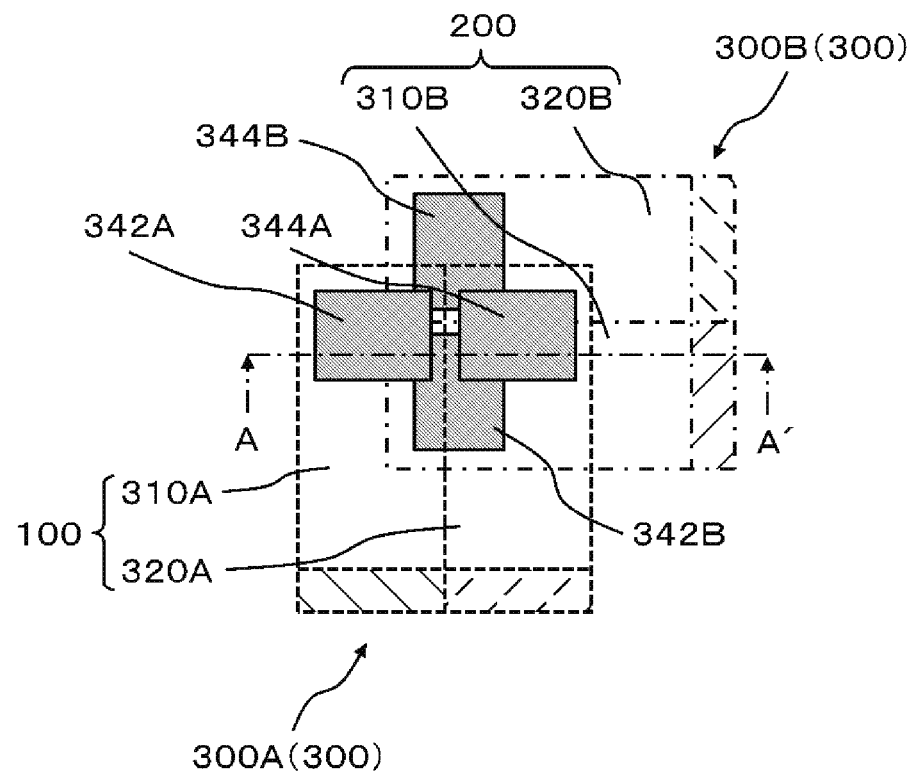
FIGS. 53A and 53B are diagrams showing a first example of a layout of a first checkout machine and a second checkout machine which are used in a checkout device according to an eleventh embodiment.
Figure 53B:
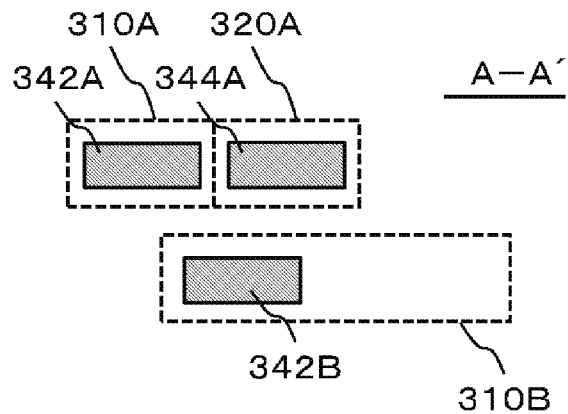

FIGS. 53A and 53B are diagrams showing a first example of a layout of a first checkout machine 100 and a second checkout machine 200 which are used in a checkout device 1000 according to an eleventh embodiment. FIG. 53A is a diagram showing the first checkout machine 100 and the second checkout machine 200 as viewed from above the checkout device 1000. FIG. 53B is a sectional view taken along line A-A' in FIG. 53A.

In the example shown in this drawing, the coin checkout machine 310A has a control part 342A, and the banknote checkout machine 320A has a control part 344A. The control part 342A controls the checkout by the coin checkout machine 310A, for example, calculates coins inserted into the coin receiving opening 311 (FIG. 1), and further controls the amount of coins which are dispensed from the coin dispensing opening 313 (FIG. 1). Similarly, the control part 344A controls the checkout by the banknote checkout machine 320A, for example, calculates banknotes inserted into the banknote receiving and dispensing opening 321 (FIG. 1), and further controls the amount of banknotes which are dispensed from the banknote receiving and dispensing opening 321 (FIG. 1).

The coin checkout machine 310B has a control part 342B, and the banknote checkout machine 320B has a control part 344B. The control part 342B controls the checkout by the coin checkout machine 310B, similar to the control part 342A. The control part 344B controls the checkout by the banknote checkout machine 320B, similar to the control part 344A.

In the example shown in this drawing, in the first checkout machine 100, the coin checkout machine 310A and the banknote checkout machine 320A are adjacent to each other in the horizontal direction, and in the second checkout machine 200, the coin checkout machine 310B and the banknote checkout machine 320B are adjacent to each other in the horizontal direction. The first checkout machine 100 is located above the second checkout machine 200. The first checkout machine 100 and the second checkout machine 200 face in different directions.

In the example shown in this drawing, when viewed from the direction perpendicular to the horizontal direction (that is, in the vertical direction), at least a part of the control part 342A overlaps at least a part of at least one of the control part 342B and the control part 344B. At least a part of the control part 344A overlaps at least a part of at least one of the control part 342B and the control part 344B.

Figure 54A:
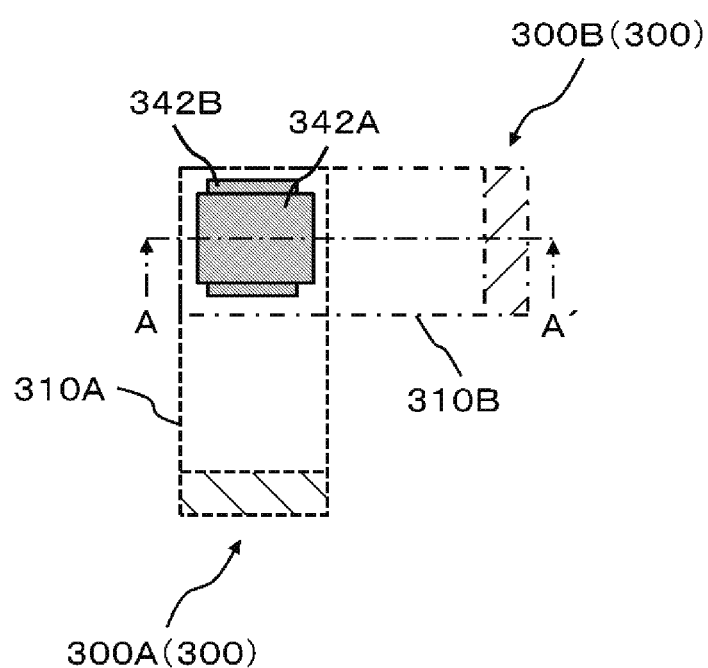
FIGS. 54A and 54B are diagrams showing a second example of the layout of the first checkout machine and the second checkout machine.
Figure 54B:
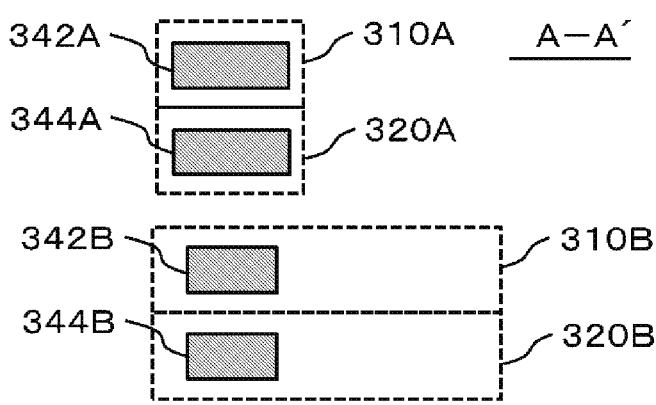

FIGS. 54A and 54B are diagrams showing a second example of the layout of the first checkout machine 100 and the second checkout machine 200. In the example shown in this drawing, in the first checkout machine 100, the coin checkout machine 310A is mounted on the upper surface of the banknote checkout machine 320A, and in the second checkout machine 200, the coin checkout machine 310B is mounted on the upper surface of the banknote checkout machine 320B.

In the example shown in this drawing, when viewed from the direction perpendicular to the horizontal direction (that is, in the vertical direction), at least a part of the control part 342A overlaps at least a part of at least one of the control part 342B and the control part 344B. At least a part of the control part 344A overlaps at least a part of at least one of the control part 342B and the control part 344B.

Twelfth Embodiment

Figure 55:
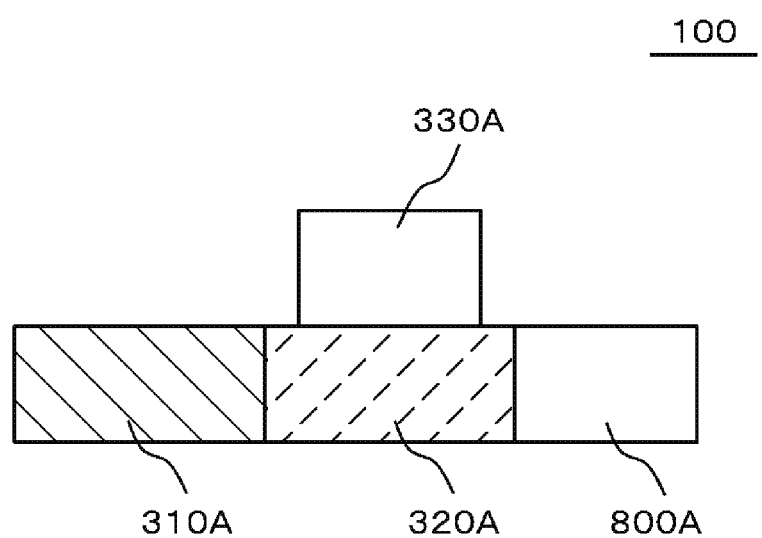
FIG. 55 is a diagram showing a first example of a configuration of a first checkout machine according to a twelfth embodiment.

FIG. 55 is a diagram showing a first example of the configuration of a first checkout machine 100 according to a twelfth embodiment. This drawing is a diagram showing the first checkout machine 100 as viewed from the front of the user interface portion 300 (FIG. 1). In the example shown in this drawing, the first checkout machine 100 has the coin checkout machine 310A, the banknote checkout machine 320A, the first card payment processor part 330A, and the first receipt printer 800A. The coin checkout machine 310A and the banknote checkout machine 320A are adjacent to each other in the horizontal direction. As shown in this drawing, the first card payment processor part 330A may be provided above the banknote checkout machine 320A (or the coin checkout machine 310A). The first receipt printer 800A may be provided on the side of the banknote checkout machine 320A (or the coin checkout machine 310A).

Figure 56:
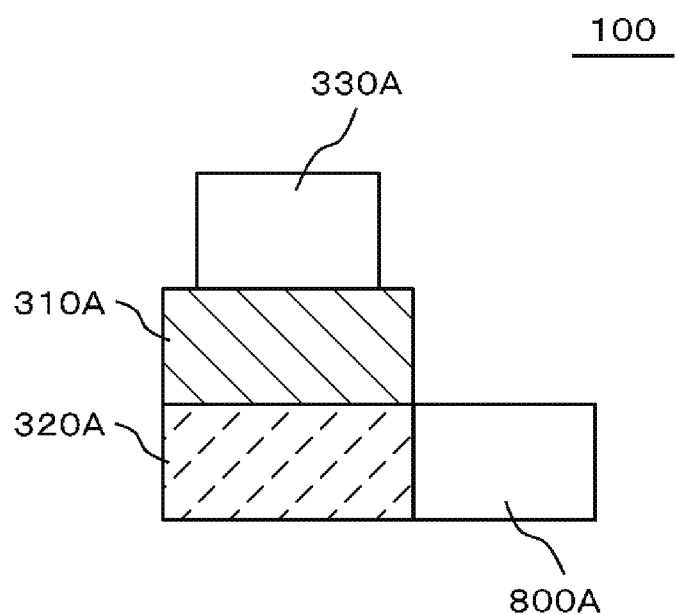
FIG. 56 is a diagram showing a second example of the configuration of the first checkout machine.

FIG. 56 is a diagram showing a second example of the configuration of the first checkout machine 100. In the example shown in this drawing, the coin checkout machine 310A is mounted on the upper surface of the banknote checkout machine 320A. As shown in this drawing, the first card payment processor part 330A may be provided above the coin checkout machine 310A. The first receipt printer 800A may be provided on the side of the banknote checkout machine 320A.

In this embodiment, also the configuration of the second checkout machine 200 may be any of the examples shown in FIGS. 55 to 56.

Thirteenth Embodiment

Figure 57:
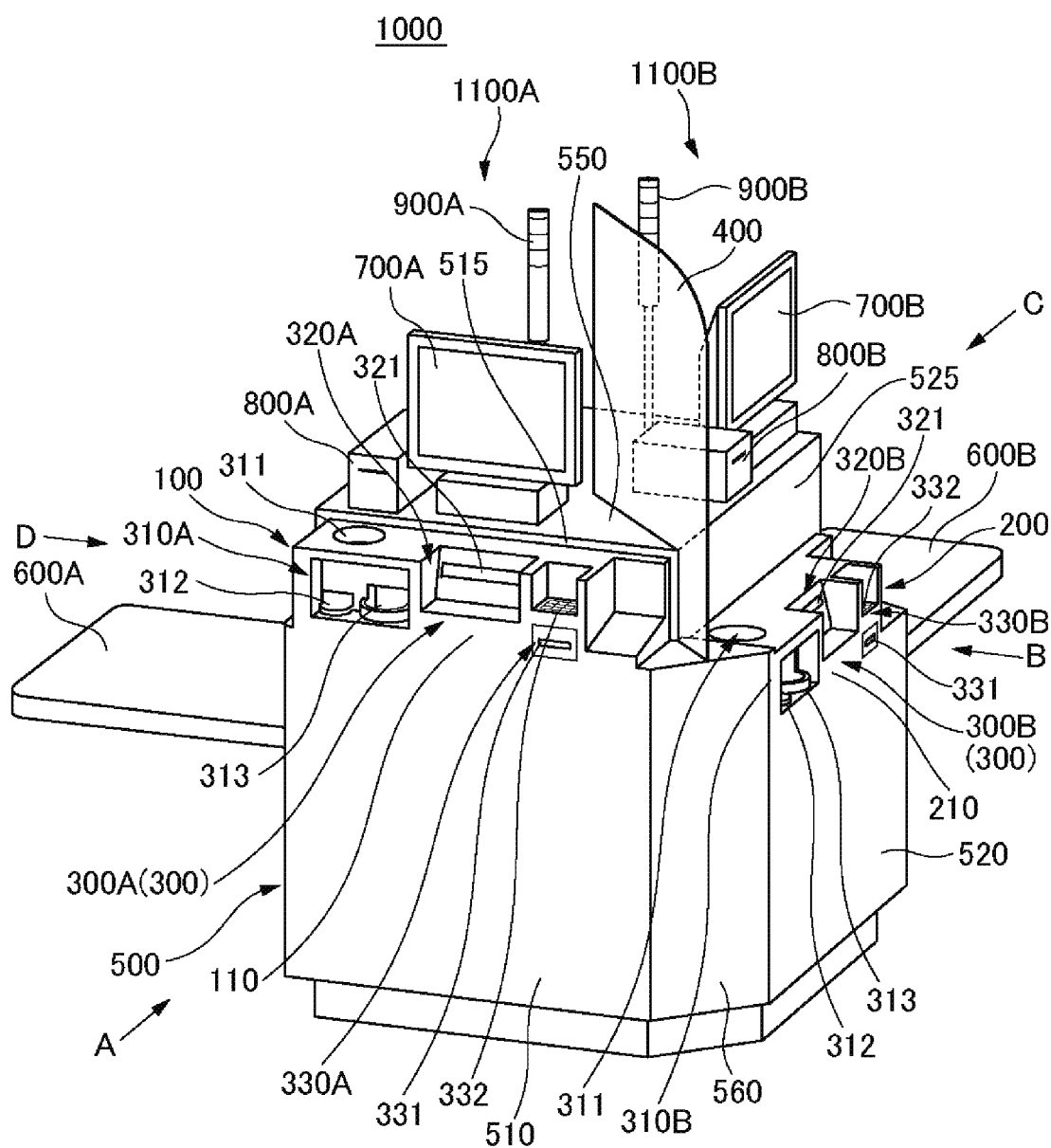
FIG. 57 is a perspective view of a checkout device according to a thirteenth embodiment.

FIG. 57 is a perspective view of a checkout device 1000 according to a thirteenth embodiment and corresponds to FIG. 1 of the first embodiment. The checkout device 1000 according to this embodiment has the same configuration as the checkout device 1000 according to the first embodiment except for the following respects.

In the example shown in this drawing, the first checkout machine 100 and the second checkout machine 200 are formed integrally with the base 500. In other words, the first checkout machine 100 and the second checkout machine 200 cannot be removed from the base 500. More specifically, the insertion hole 511 (for example, FIG. 8) and the insertion hole 521 (for example, FIG. 8) are not formed in the base 500. The first checkout machine 100 and the second checkout machine 200 become a part of the base 500.

Only one of the first checkout machine 100 and the second checkout machine 200 may be formed integrally with the base 500. In this case, the other of the first checkout machine 100 and the second checkout machine 200 is removable from the base 500 in the same manner as in the first embodiment.

Fourteenth Embodiment

Figure 58A:
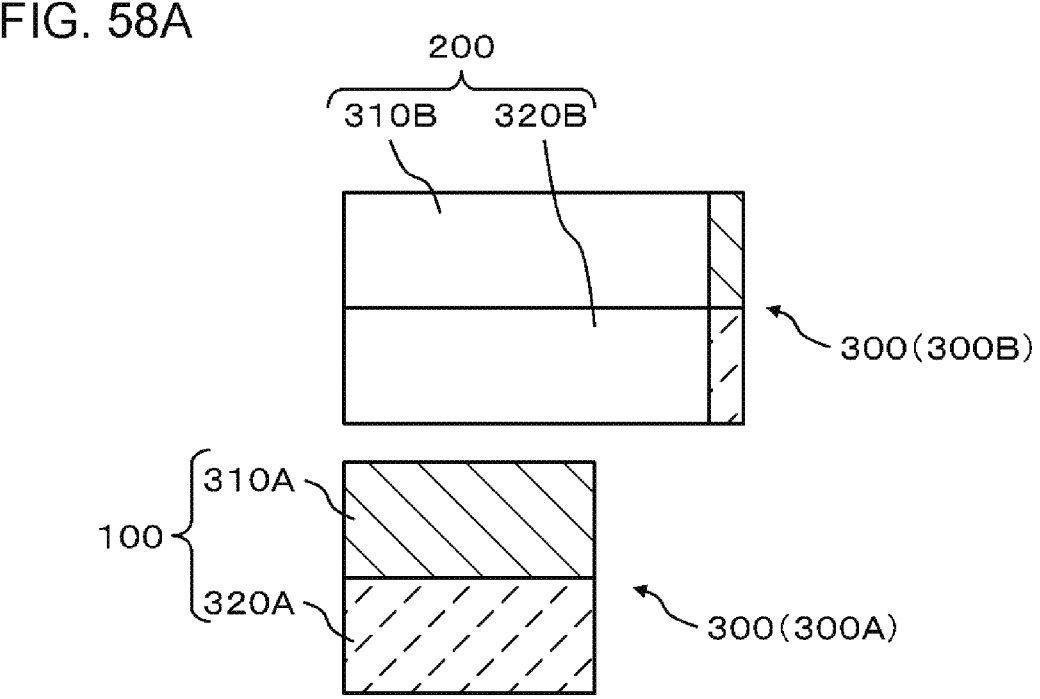
FIGS. 58A and 58B are diagrams showing a layout of a first checkout machine and a second checkout machine which are used in a checkout device according to a fourteenth embodiment.
Figure 58B:
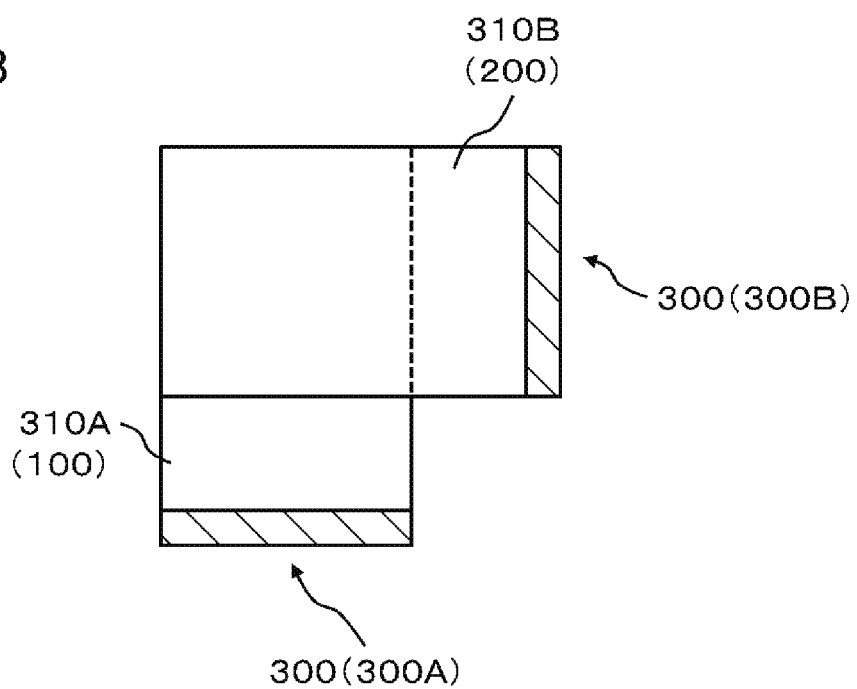

FIGS. 58A and 58B are diagrams showing a layout of a first checkout machine 100 and a second checkout machine 200 which are used in a checkout device 1000 according to a fourteenth embodiment. FIG. 58A is a diagram showing the first checkout machine 100 and the second checkout machine 200 as viewed from the front of the first user interface portion 300A. FIG. 58B is a diagram showing the first checkout machine 100 and the second checkout machine 200 as viewed from above the checkout device 1000. The fourteenth embodiment and FIGS. 58A and 58B are an examples of a specific example of a combination of the first checkout machine 100 and the second checkout machine 200 configuring the checkout device 1000.

In the example shown in this drawing, in the first checkout machine 100, the coin checkout machine 310A is mounted on the upper surface of the banknote checkout machine 320A. Also in the second checkout machine 200, similar to the first checkout machine 100, the coin checkout machine 310B is mounted on the upper surface of the banknote checkout machine 320B.

The second checkout machine 200 is located above the first checkout machine 100. When viewed from the direction perpendicular to the horizontal plane (that is, in the vertical direction), the first checkout machine 100 and the second checkout machine 200 face in different directions. Specifically, in the example shown in this drawing, the difference between the direction in which the first checkout machine 100 faces and the direction in which the second checkout machine 200 faces is 90°. However, the difference is not limited to 90° and may be 30° or more and 150° or less, for example. The first checkout machine 100 and the second checkout machine 200 may face opposite to each other.

Figure 63A:
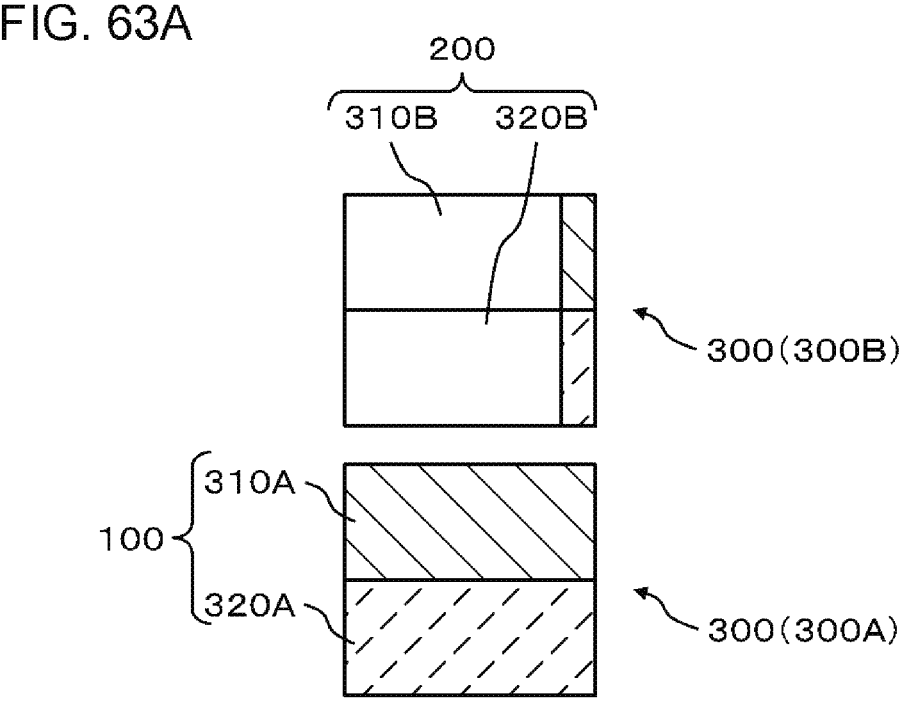
FIGS. 63A and 63B are diagrams showing a fifth modification example of FIGS. 58A and 58B.
Figure 63B:
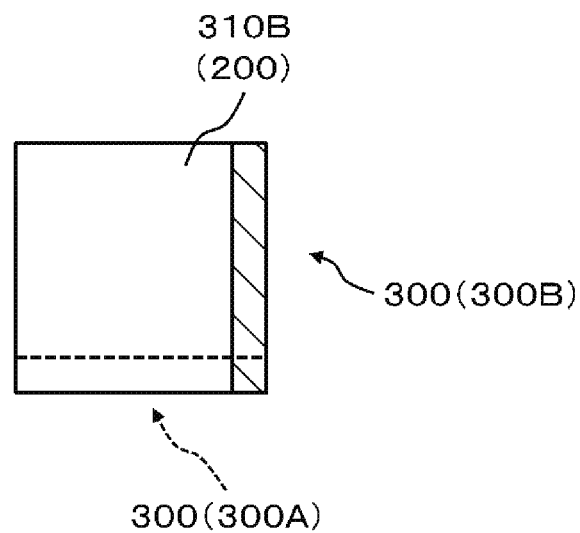

When viewed from the direction perpendicular to the horizontal plane (that is, in the vertical direction), both the shape of the first checkout machine 100 and the shape of the second checkout machine 200 are rectangular. In the example shown in this drawing, a part of the side of the first checkout machine 100 (a rectangle) and a part of the side of the second checkout machine 200 (a rectangle) are aligned with each other. In FIG. 58B, the shape of the first checkout machine 100 and the shape of the second checkout machine 200 are rectangular. However, the shape of the first checkout machine 100 and the shape of the second checkout machine 200 may be square, as shown in FIGS. 63A and 63B.

Figure 59A:
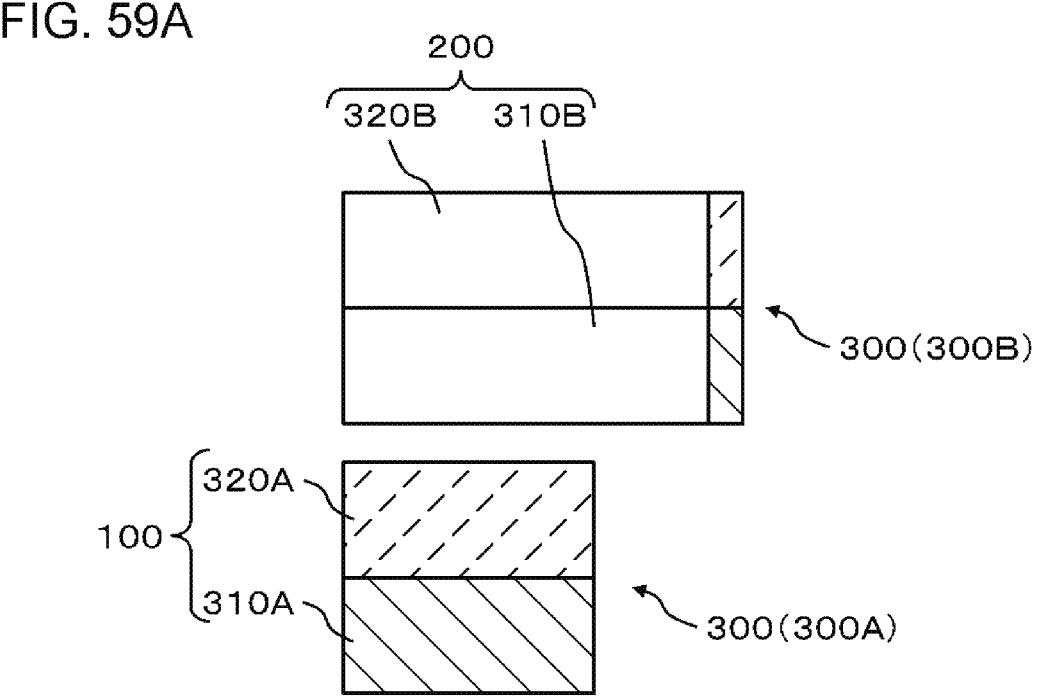
FIGS. 59A and 59B are diagrams showing a first modification example of FIGS. 58A and 58B.
Figure 59B:
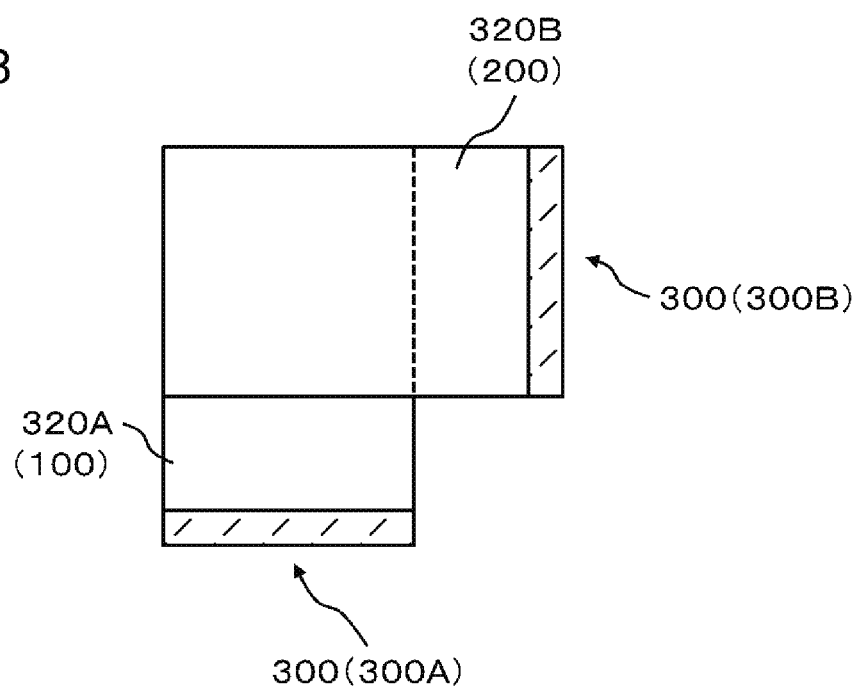

FIGS. 59A and 59B are diagrams showing a first modification example of FIGS. 58A and 58B. The example shown in this drawing is the same as the example shown in FIGS. 58A and 58B except that in the first checkout machine 100, the position of the coin checkout machine 310A and the position of the banknote checkout machine 320A are opposite and in the second checkout machine 200, the position of the coin checkout machine 310B and the position of the banknote checkout machine 320B are opposite. Specifically, in the example shown in this drawing, in the first checkout machine 100, the banknote checkout machine 320A is mounted on the upper surface of the coin checkout machine 310A. Also in the second checkout machine 200, similar to the first checkout machine 100, the banknote checkout machine 320B is mounted on the upper surface of the coin checkout machine 310B.

Figure 60A:
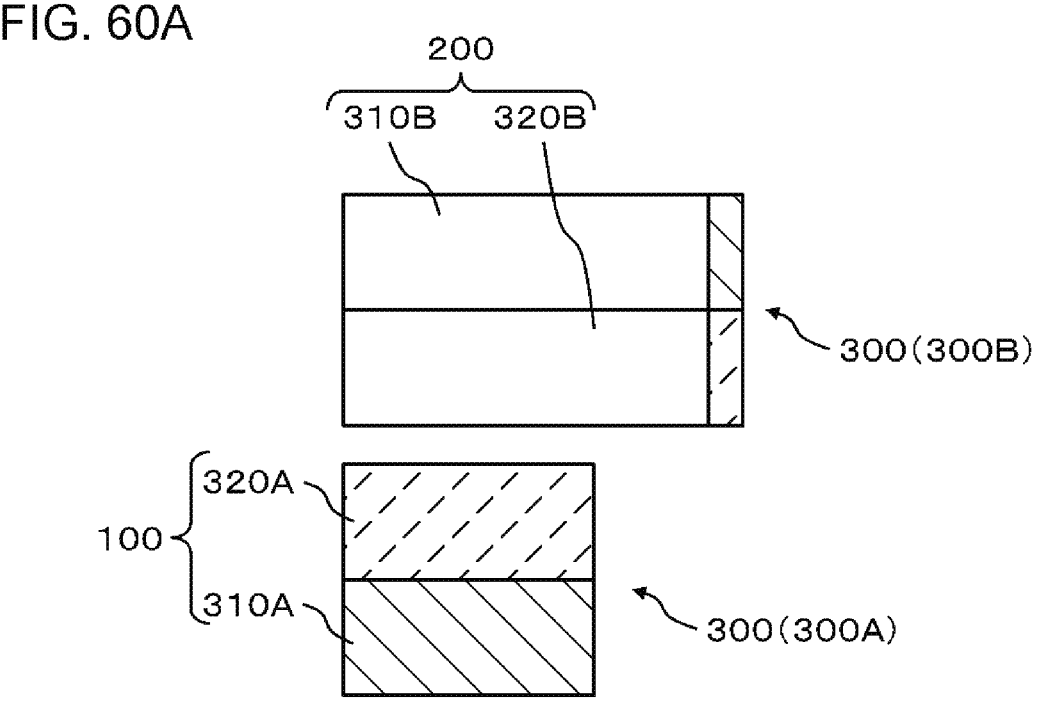
FIGS. 60A and 60B are diagrams showing a second modification example of FIGS. 58A and 58B.
Figure 60B:
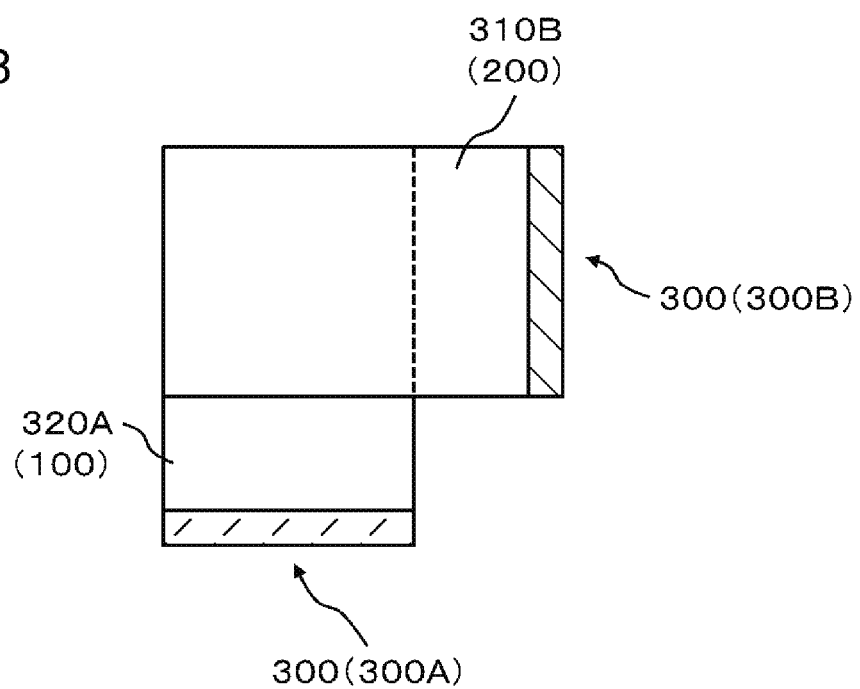

FIGS. 60A and 60B are diagrams showing a second modification example of FIGS. 58A and 58B. The example shown in this drawing is the same as the example shown in FIGS. 58A and 58B except that an order in which in the first checkout machine 100, the coin checkout machine 310A and the banknote checkout machine 320A are arranged from the bottom toward the top and an order in which in the second checkout machine 200, the coin checkout machine 310B and the banknote checkout machine 320B are arranged from the bottom toward the top are opposite to each other. Specifically, in the example shown in this drawing, in the first checkout machine 100, the banknote checkout machine 320A is mounted on the upper surface of the coin checkout machine 310A. In contrast, in the second checkout machine 200, the coin checkout machine 310B is mounted on the upper surface of the banknote checkout machine 320B.

Figure 61A:
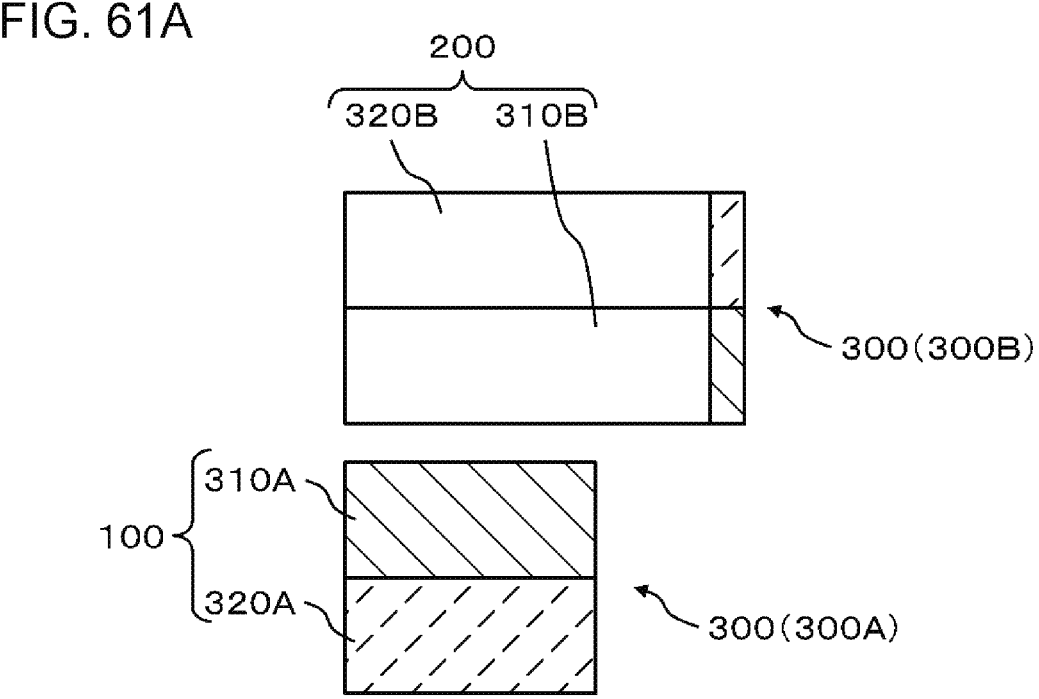
FIGS. 61A and 61B are diagrams showing a third modification example of FIGS. 58A and 58B.
Figure 61B:
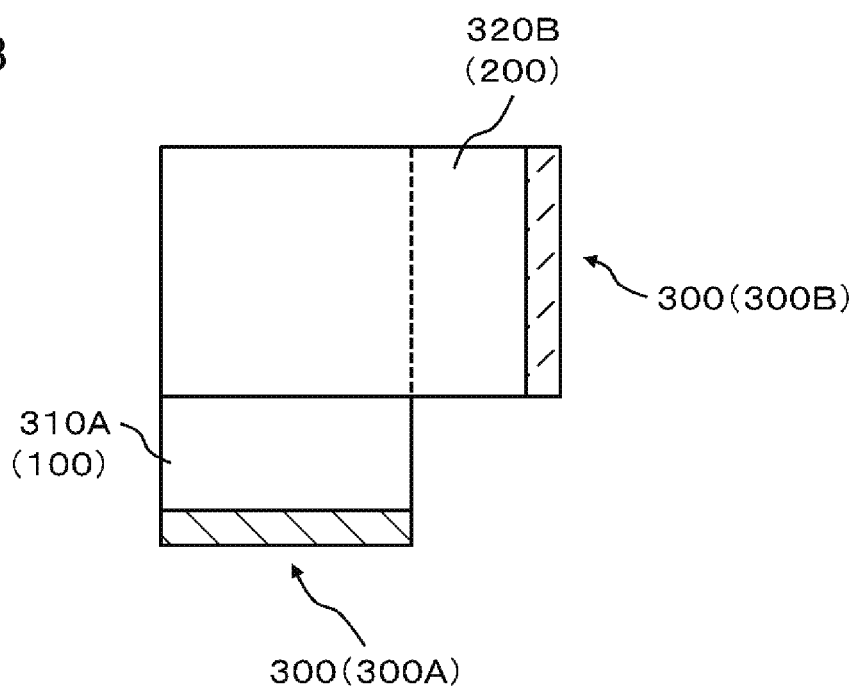

FIGS. 61A and 61B are diagrams showing a third modification example of FIGS. 58A and 58B. The example shown in this drawing is the same as the example shown in FIGS. 58A and 58B except that an order in which in the first checkout machine 100, the coin checkout machine 310A and the banknote checkout machine 320A are arranged from the bottom toward the top and an order in which in the second checkout machine 200, the coin checkout machine 310B and the banknote checkout machine 320B are arranged from the bottom toward the top are opposite to each other. Specifically, in the example shown in this drawing, in the first checkout machine 100, the coin checkout machine 310A is mounted on the upper surface of the banknote checkout machine 320A. In contrast, in the second checkout machine 200, the banknote checkout machine 320B is mounted on the upper surface of the coin checkout machine 310B.

Figure 62A:
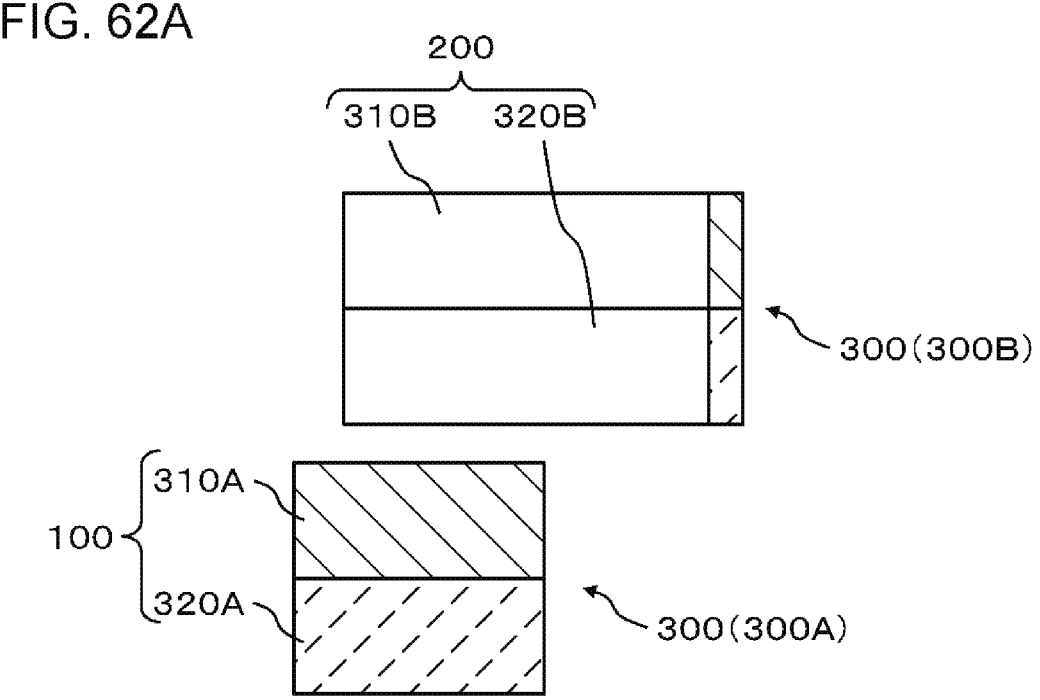
FIGS. 62A and 62B are diagrams showing a fourth modification example of FIGS. 58A and 58B.
Figure 62B:
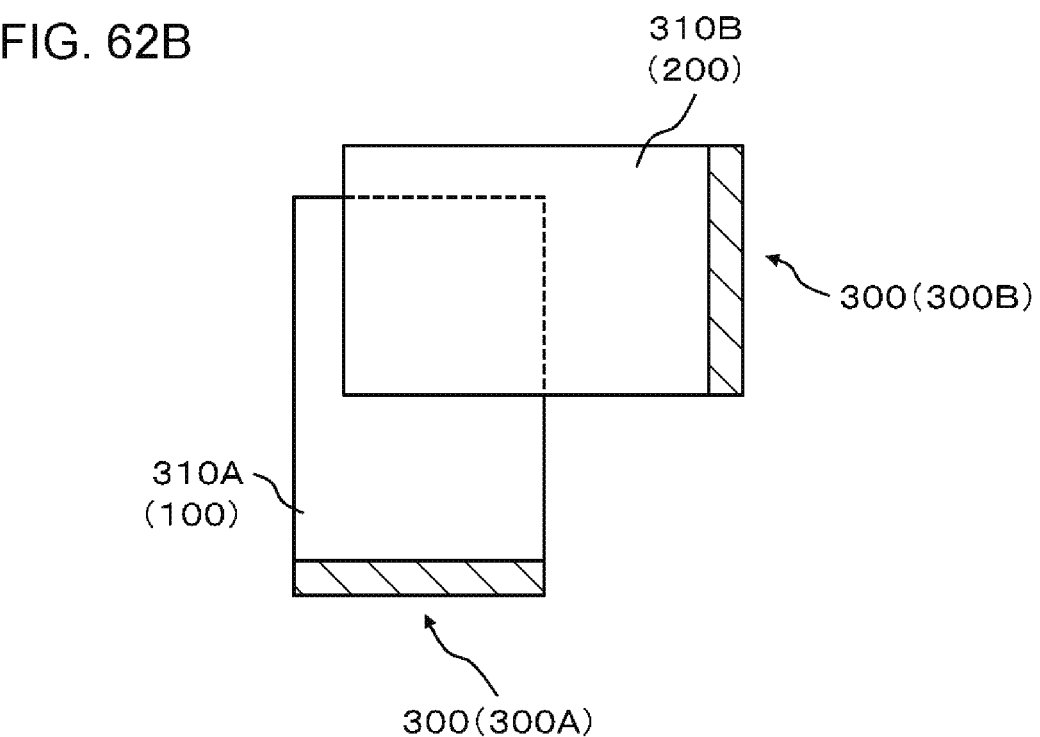

FIGS. 62A and 62B are diagrams showing a fourth modification example of FIGS. 58A and 58B. Also in the example shown in this drawing, when viewed from the direction perpendicular to the horizontal plane (that is, in the vertical direction), both the shape of the first checkout machine 100 and the shape of the second checkout machine 200 are rectangular. In the example shown in this drawing, the sides of the first checkout machine 100 (a rectangle) and the sides of the second checkout machine 200 (a rectangle) are not aligned with each other in any area.

The embodiments of the present invention have been described above with reference to the drawings. However, these embodiments are for exemplifying the present invention, and it is also possible to adopt various configurations other than the above.

The invention claimed is:

1. A checkout device comprising:
   a first checkout machine comprising a first coin checkout machine and a first banknote checkout machine; and
   a second checkout machine comprising a second coin checkout machine and a second banknote checkout machine,
   wherein the first checkout machine and the second checkout machine at least partially overlap each other when viewed from a direction perpendicular to an installation surface of the first checkout machine and the second checkout machine, and
   wherein in the direction perpendicular to the installation surface of the first checkout machine and the second checkout machine, a lower surface of one of the first coin checkout machine and the first banknote checkout machine is located equal to or lower than an upper surface of the other of the first coin checkout machine and the first banknote checkout machine and equal to or higher than a lower surface of the other of the first coin checkout machine and the first banknote checkout machine.

2. The checkout device according to claim 1,
   wherein the first checkout machine and the second checkout machine are arranged offset from each other when viewed from the direction perpendicular to the installation surface of the first checkout machine and the second checkout machine.

3. The checkout device according to claim 1,
   wherein an entirety of one of the first checkout machine and the second checkout machine overlaps the other of the first checkout machine and the second checkout machine when viewed from the direction perpendicular to the installation surface of the first checkout machine and the second checkout machine.

4. The checkout device according to claim 1,
   wherein a base on which the first checkout machine and the second checkout machine are installed has a first surface and a second surface that face in different directions when viewed from the direction perpendicular to the installation surface of the first checkout machine and the second checkout machine,
   the first checkout machine is provided to the first surface, and
   the second checkout machine is provided to the second surface.

5. The checkout device according to claim 1,
   wherein a base on which the first checkout machine and the second checkout machine are mounted has a first surface curved when viewed from the direction perpendicular to the installation surface of the first checkout machine and the second checkout machine,
   the first checkout machine is provided to the first surface, and
   the second checkout machine is provided to an area of the first surface different from an area to which the first checkout machine is provided.

6. The checkout device according to claim 1,
   wherein at least a part of one of the first coin checkout machine and the first banknote checkout machine overlaps at least a part of the other of the first coin checkout machine and the first banknote checkout machine when viewed from the direction perpendicular to the installation surface of the first checkout machine and the second checkout machine.

7. The checkout device according to claim 1,
   wherein an upper surface of one of the first coin checkout machine and the first banknote checkout machine and an upper surface of the other of the first coin checkout machine and the first banknote checkout machine are aligned with each other, and
   the lower surface of the one of the first coin checkout machine and the first banknote checkout machine and the lower surface of the other of the first coin checkout machine and the first banknote checkout machine are aligned with each other.

8. The checkout device according to claim 1,
wherein the first coin checkout machine and the first banknote checkout machine face in different directions.

9. The checkout device according to claim 1,
wherein the first checkout machine has a first coin receiving opening into which a coin can be inserted,
the second checkout machine has a second coin receiving opening into which the coin can be inserted, and
the first coin receiving opening and the second coin receiving opening are arranged offset from each other when viewed from the direction perpendicular to the installation surface of the first checkout machine and the second checkout machine.

10. The checkout device according to claim 1,
wherein the first checkout machine has a first banknote receiving opening into which a banknote can be inserted,
the second checkout machine has a second banknote receiving opening into which the banknote can be inserted, and
the first banknote receiving opening and the second banknote receiving opening are arranged offset from each other when viewed from the direction perpendicular to the installation surface of the first checkout machine and the second checkout machine.

11. The checkout device according to claim 1,
wherein the first checkout machine has a first money receiving opening into which both a coin and a banknote can be inserted,
the second checkout machine has a second money receiving opening into which both the coin and the banknote can be inserted, and
the first money receiving opening and the second money receiving opening are arranged offset from each other when viewed from the direction perpendicular to the installation surface of the first checkout machine and the second checkout machine.

12. A The checkout device comprising:
a first checkout machine comprising a first coin checkout machine and a first banknote checkout machine; and
a second checkout machine comprising a second coin checkout machine and a second banknote checkout machine,
wherein the first checkout machine and the second checkout machine at least partially overlap each other when viewed front a direction perpendicular to an installation surface of the first checkout machine and the second checkout machine,
wherein any part of one of the first coin checkout machine and the first banknote checkout machine does not overlap the other of the first coin checkout machine and the first banknote checkout machine when viewed from the direction perpendicular to the installation surface of the first checkout machine and the second checkout machine, and
in the direction perpendicular to the installation surface of the first checkout machine and the second checkout machine, a lower surface of the one of the first coin checkout machine and the first banknote checkout machine is located higher than an upper surface of the other of the first coin checkout machine and the first banknote checkout machine.

13. The checkout device according to claim 12,
wherein the first checkout machine and the second checkout machine are arranged offset from each other when viewed from the direction perpendicular to the installation surface of the first checkout machine and the second checkout machine.

14. The checkout device according to claim 12,
wherein an entirety of one of the first checkout machine and the second checkout machine overlaps the other of the first checkout machine and the second checkout machine when viewed from the direction perpendicular to the installation surface of the first checkout machine and the second checkout machine.

15. The checkout device according to claim 12,
wherein a base on which the first checkout machine and the second checkout machine are installed has a first surface and a second surface that face in different directions when viewed from the direction perpendicular to the installation surface of the first checkout machine and the second checkout machine,
the first checkout machine is provided to the first surface, and
the second checkout machine is provided to the second surface.

16. The checkout device according to claim 12,
wherein a base on which the first checkout machine and the second checkout machine are mounted has a first surface curved when viewed from the direction perpendicular to the installation surface of the first checkout machine and the second checkout machine,
the first checkout machine is provided to the first surface, and
the second checkout machine is provided to an area of the first surface different from an area to which the first checkout machine is provided.

17. The checkout device according to claim 12,
wherein the first coin checkout machine and the first banknote checkout machine face in different directions.

18. The checkout device according to claim 12,
wherein the first checkout machine has a first coin receiving opening into which a coin can be inserted,
the second checkout machine has a second coin receiving opening into which the coin can be inserted, and
the first coin receiving opening and the second coin receiving opening are arranged offset from each other when viewed from the direction perpendicular to the installation surface of the first checkout machine and the second checkout machine.

19. The checkout device according to claim 12,
wherein the first checkout machine has a first banknote receiving opening into which a banknote can be inserted,
the second checkout machine has a second banknote receiving opening into which the banknote can be inserted, and
the first banknote receiving opening and the second banknote receiving opening are arranged offset from each other when viewed from the direction perpendicular to the installation surface of the first checkout machine and the second checkout machine.

20. The checkout device according to claim 12,
wherein the first checkout machine has a first money receiving opening into which both a coin and a banknote can be inserted,
the second checkout machine has a second money receiving opening into which both the coin and the banknote can be inserted, and
the first money receiving opening and the second money receiving opening are arranged offset from each other when viewed from the direction perpendicular to the installation surface of the first checkout machine and the second checkout machine.

* * * * *

UNITED STATES PATENT AND TRADEMARK OFFICE
CERTIFICATE OF CORRECTION

PATENT NO. : 10,588,432 B2  
APPLICATION NO. : 15/771771  
DATED : March 17, 2020  
INVENTOR(S) : Jun Nishio Page 1 of 1

It is certified that error appears in the above-identified patent and that said Letters Patent is hereby corrected as shown below:

In the Claims

Column 35, Line 40; In Claim 12, after "A", delete "The"

Column 35, Line 48; In Claim 12, delete "front" and insert --from-- therefor

Signed and Sealed this  
Fourteenth Day of July, 2020

Andrei Iancu  
*Director of the United States Patent and Trademark Office*